United States Patent [19]
Takahashi et al.

[11] Patent Number: 6,031,693
[45] Date of Patent: *Feb. 29, 2000

[54] SLIDING-TYPE MAGNETIC HEAD FOR MAGNETOOPTICAL RECORDING

[75] Inventors: Tomoyuki Takahashi; Kazuhiro Kimura; Tadao Nishii; Kenji Yazawa; Kazutoshi Asada; Hideo Tanaka; Michiaki Takeshi, all of Miyagi, Japan

[73] Assignee: Sony Corporation, Tokyo, Japan

[ * ] Notice: This patent is subject to a terminal disclaimer.

[21] Appl. No.: 08/868,643

[22] Filed: Jun. 4, 1997

Related U.S. Application Data

[62] Division of application No. 08/336,741, Nov. 4, 1994, Pat. No. 5,682,280, which is a division of application No. 08/048,895, Apr. 20, 1993, Pat. No. 5,535,075.

[30] Foreign Application Priority Data

| Apr. 20, 1992 | [JP] | Japan | P4-099999 |
| Jun. 16, 1992 | [JP] | Japan | P4-157041 |
| Oct. 28, 1992 | [JP] | Japan | P4-290415 |
| Feb. 17, 1993 | [JP] | Japan | P5-028239 |

[51] Int. Cl.[7] .................................................. G11B 5/127
[52] U.S. Cl. ............................................................ 360/114
[58] Field of Search ..................................... 360/104, 108, 360/114

[56] References Cited

U.S. PATENT DOCUMENTS

| 3,349,384 | 10/1967 | Kohn | 360/104 |
| 4,926,275 | 5/1990 | Kuno et al. | 360/106 |
| 5,014,146 | 5/1991 | Takatsuka et al. | 360/106 |
| 5,103,359 | 4/1992 | Marazzo | 360/104 |
| 5,166,846 | 11/1992 | Shigemoto | 360/104 |
| 5,285,338 | 2/1994 | Sughura et al. | 360/104 |
| 5,299,080 | 3/1994 | Mizuno et al. | 360/104 |
| 5,463,513 | 10/1995 | Hoshino | 360/104 |
| 5,467,237 | 11/1995 | Takahashi | 360/104 |

FOREIGN PATENT DOCUMENTS

| 0 278 506 | 8/1988 | European Pat. Off. . |
| 0 570 008 A2 | 11/1993 | European Pat. Off. . |

OTHER PUBLICATIONS

Patent Abstracts of Japan: No. 63281285 published Nov. 17, 1988.
Patent Abstracts of Japan: No. 01236412 published Sep. 21, 1989.
Patent Abstracts of Japan: No. 01298584 published Dec. 01, 1989.
Patent Abstracts of Japan: No. 03209614 published Sep. 12, 1991.

*Primary Examiner*—George J. Letscher
*Attorney, Agent, or Firm*—Hill & Simpson

[57] ABSTRACT

A magnetic head for recording information on a recording disk which has a head body that has a sliding sole which contacts the recording disk. The head body is supported by a three-piece leaf spring which has one end connected to a support and the other end connected to the head body. The support member includes a stopper which engages the end of the second portion of the leaf spring so as to control the position of the head body.

12 Claims, 62 Drawing Sheets

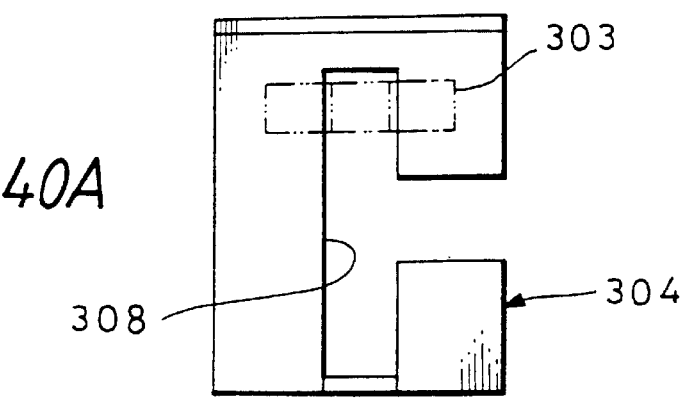
FIG. 40A
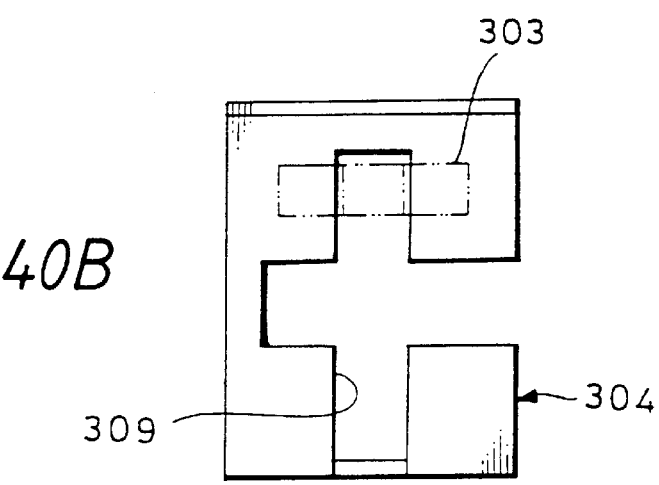
FIG. 40B
FIG. 41
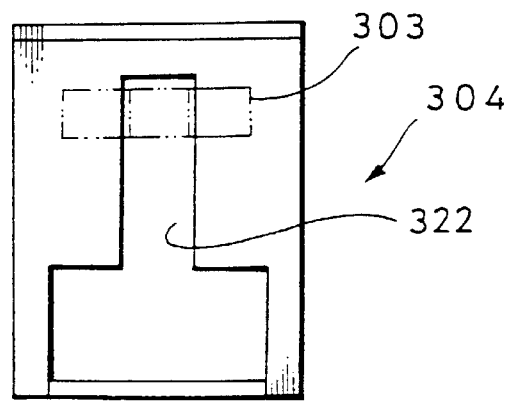

SLIDING-TYPE MAGNETIC HEAD FOR MAGNETOOPTICAL RECORDING

This application is a Divisional of Ser. No. 08/336,741 filed Nov. 4, 1994, U.S. Pat. No. 5,682,280 which is a Div. of Ser. No. 08/048,895 filed Apr. 20, 1993 U.S. Pat. No. 5,535,075.

CROSS-REFERENCES TO RELATED APPLICATIONS

This application is related to copending application Ser. No. 08/026,020 filed Mar. 4, 1993 entitled "Magnetic Head For Magneto-Optical Recording" in which the inventors are Nagaki and Hasegawa, assigned to the assignee of the present application.

BACKGROUND OF THE INVENTION

1. Field of the Invention

The present invention relates to a sliding-type magnetic head for magnetooptically recording information on a magnetooptical recording medium in sliding contact therewith.

2. Description of the Relevant Art

One of optical disks for storing, erasing, and retrieving information with a light beam is known as a magnetooptical disk.

As shown in FIG. 1 of the accompanying drawings, a conventional magnetooptical disk 1 comprises a transparent substrate 2, a magnetooptical recording layer 3 in the form of a perpendicularly magnetizable film disposed on the transparent substrate 2 with an SiN protective film 8 interposed therebetween, a reflecting film 4 in the form of a thin metal film such as an aluminum film disposed on the magnetooptical recording layer 3 with another SiN protective film 8 interposed therebetween, and a protective film 5 as of an ultraviolet-curing resin disposed on the reflecting film 4.

Field- and beam-modulating recording processes are known for recording information on magnetooptical disks.

The field-modulating recording process is capable of recording information in an overwrite mode in which a new signal is recorded over an old signal on the magnetooptical disk. The field-modulating recording process will be described below with reference to FIG. 2 of the accompanying drawings. An optical pickup for applying a laser beam 6 is disposed on one side of a magnetooptical disk 1 with a magnetooptical recording layer in the form of a perpendicularly magnetizable film, i.e., on the substrate side of the magnetooptical disk 1, and a magnetic field generator, i.e., a magnetic head 7, is disposed on the other side of the magnetooptical disk 1, i.e., on the protective film side, for movement in synchronism with the laser spot. The direction of the magnetic field generated by the magnetic head 7 is varied by varying the direction of an electric current supplied to the magnetic head 7.

In operation, the magnetooptical disk 1 is rotated about its own center at a predetermined speed.

It is assumed that a magnetic field representing a recording signal is generated in the vicinity of a laser spot 6a on the magnetooptical disk 1. A region 1A of the magnetooptical disk 1, in which recorded information is to be rewritten, is heated to the Curie temperature by the laser spot 6a and hence demagnetized. When the region 1A is moved out of the laser spot 6a on rotation of the magnetooptical disk 1, the temperature of the region 1A drops below the Curie temperature, and the region 1A is magnetized in the direction of the applied magnetic field, thus recording the signal.

The magnetooptical disk 1 is a non-contact recording medium, i.e., the magnetic head 7 is spaced from the magnetooptical disk 1 by a predetermined distance $d_0$.

The applicant has developed an ultra-small-size digital recording and reproducing apparatus for digitally recording information on and reproducing information from a small-size magnetooptical disk.

Since the conventional magnetic head 7 is held out of contact with a magnetooptical disk 1 when recording information thereon, the magnetic head 7 is associated with an electromagnetic servomechanism for causing the magnetic head 7 to follow disk surface displacements that occur due to any inclination of the magnetooptical disk 1, thickness irregularities thereof, etc., when the magnetooptical disk 1 rotates. The presence of the electromagnetic servomechanism has posed limitations on a recording and reproducing apparatus with respect to efforts to reduce power consumption and apparatus size (particularly apparatus thickness).

If a magnetic head is held in sliding contact with a magnetooptical disk, then the magnetic head can be supported by a simple support structure, dispensing with an electromagnetic servomechanism which takes up a large space. Therefore, a recording and reproducing apparatus with a magnetic head designed to held in sliding contact with a magnetooptical disk may be reduced in power requirements and size.

The magnetooptical disk 1 has surface irregularities such as bumps or the like. When a magnetic head held in sliding contact with the magnetooptical disk 1 passes a bump, the magnetic head jumps away from the disk surface by a distance corresponding to the height of the bump, resulting in a reduction in recording capability. To maintain a desired level of recording capability, the magnetic head is required to have a higher power output.

Shocks that are applied to the magnetooptical disk by the sliding-type magnetic head are proportional in magnitude to the weight of the magnetic head. When such shocks are imposed on the magnetooptical disk, the magnetooptical disk vibrates, causing an optical system coupled to the magnetic head to be defocused. In order to reduce shocks applied to the magnetooptical disk, the magnetic head should be reduced in weight and hence size. However, inasmuch as smaller-size magnetic heads produce lower output levels, they fail to meet the requirement for higher power output.

OBJECTS AND SUMMARY OF THE INVENTION

It is therefore an object of the present invention to provide a sliding-type magnetic head for recording information on a magnetooptical disk, which magnetic head is capable of sufficiently follow disk surface displacements or vertical undulations, and surface irregularities, and of absorbing vibrations and shocks, and is relatively small in weight and size.

According to the present invention, there is provided a magnetic head for magnetooptically recording information on a magnetooptical recording medium in sliding contact therewith, comprising a head body having a sliding sole for sliding contact with a magnetooptical recording medium, a leaf spring, the head body being supported by the leaf spring, and a support member, the leaf spring having an end fixed to the support member, the leaf spring comprising a first spring system joined to the support member, a second spring system extending from the first spring system, and a third spring system extending from a distal end of the second spring system toward the support member, the head body being supported by the third spring system, the support member having a stopper which holds the distal end of the second spring system in a position to store a predetermined amount of recovery energy in the leaf spring.

According to the present invention, there is also provided a magnetic head for magnetooptically recording information on a magnetooptical recording medium in sliding contact therewith, comprising a head body having a sliding sole for sliding contact with a magnetooptical recording medium, a leaf spring, the head body being supported by the leaf spring, and a support member, the leaf spring having an end fixed to the support member, the leaf spring comprising a first spring system joined to the support member, a second spring system extending from the first spring system, and a third spring system extending from a distal end of the second spring system toward the support member, the head body being supported by the third spring system, the support member having a stopper which holds the third spring system in a position to store a predetermined amount of recovery energy in the leaf spring.

According to the present invention, there is further provided a magnetic head for magnetooptically recording information on a magnetooptical recording medium in sliding contact therewith, comprising a head body having a sliding sole for sliding contact with a magnetooptical recording medium, a leaf spring, the head body being supported by the leaf spring, a support member, the leaf spring having an end fixed to the support member, and a stopper mounted on the support member and holding the leaf spring in a position to store a predetermined amount of recovery energy in the leaf spring, the leaf spring having a locking member, the stopper being inserted in and engaged by the locking member.

According to the present invention, there is also provided a magnetic head for magnetooptically recording information on a magnetooptical recording medium in sliding contact therewith, comprising a magnetic head element, and a sliding sole disposed on one side of the magnetic head element for sliding contact with a magnetooptical recording medium, the sliding sole being positioned radially inwardly of the magnetic head element with respect to the magnetooptical recording medium, and having a sliding surface having a longitudinal direction, the sliding sole being inclined to a direction in which the magnetic head element runs with respect to the magnetooptical recording medium, such that the longitudinal direction extends along the direction of travel of the magnetooptical recording medium with respect to the magnetic head element.

According to the present invention, there is also provided a magnetic head for magnetooptically recording information on a magnetooptical recording medium in sliding contact therewith, comprising a head body having a sliding sole for sliding contact with a magnetooptical recording medium, a leaf spring, the head body being supported by the leaf spring out of alignment with a central axis of the leaf spring, the leaf spring having a pair of spaced springy arms sandwiching the head body therebetween, the springy arms having different widths, respectively.

According to the present invention, there is also provided a magnetic bead for magnetooptically recording information on a magnetooptical recording medium in sliding contact therewith, comprising a magnetic head element including a coil having terminals, a sliding sole disposed on one side of the magnetic head element for sliding contact with a magnetooptical recording medium, and a flexible wire cable having a connector connected to the terminals of the coil, the connector being of a bifurcated shape.

According to the present invention, there is also provided a magnetic head for magnetooptically recording information on a magnetooptical recording medium in sliding contact therewith, comprising a magnetic head element including a coil having terminals, a sliding sole disposed on one side of the magnetic head element for sliding contact with a magnetooptical recording medium, and a flexible wire cable having a connector connected to the terminals of the coil, the connector having an oblong hole defined therein.

According to the present invention, there is also provided a magnetic head for magnetooptically recording information on a magnetooptical recording medium in sliding contact therewith, comprising a magnetic head element including a coil having terminals, and a sliding sole disposed on one side of the magnetic head element for sliding contact with a magnetooptical recording medium, the sliding sole being made of a plastic material.

According to the present invention, there is also provided a magnetic head for magnetooptically recording information on a magnetooptical recording medium in sliding contact therewith, comprising a head body having a sliding sole for sliding contact with a magnetooptical recording medium and a magnetic head element including a coil having terminals, a leaf spring, the head body being supported by the leaf spring, a support member, the leaf spring having an end fixed to the support member, and a flexible wire cable having one end connected to the terminals of the coil and an opposite end fixed to the support member, the support member having positioning means for positioning the opposite end of the flexible wire cable.

According to the present invention, there is also provided a magnetic head for magnetooptically recording information on a magnetooptical recording medium in sliding contact therewith, comprising a head body having a sliding sole for sliding contact with a magnetooptical recording medium and a magnetic head element including a coil having terminals, a leaf spring, the head body being supported by the leaf spring, a support member, the leaf spring having an end fixed to the support member, and a flexible wire cable having one end connected to the terminals of the coil and an opposite end fixed to the support member, the flexible wire cable having an extension disposed in confronting relationship to the leaf spring for engaging the leaf spring to limit displacement of the head body.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 40A and 40B are front elevational views of other locking structures;

FIG. 41 is a front elevational view of still another locking structure;

DETAILED DESCRIPTION OF THE PREFERRED EMBODIMENTS

Figure 1:
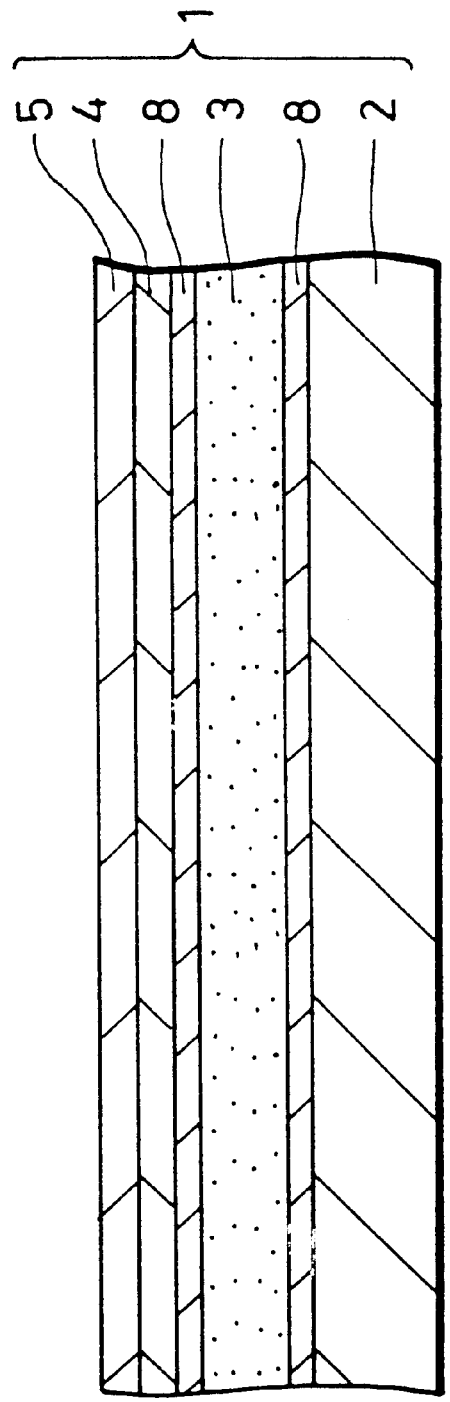
FIG. 1 is a fragmentary cross-sectional view of a magnetooptical disk.
Figure 2:
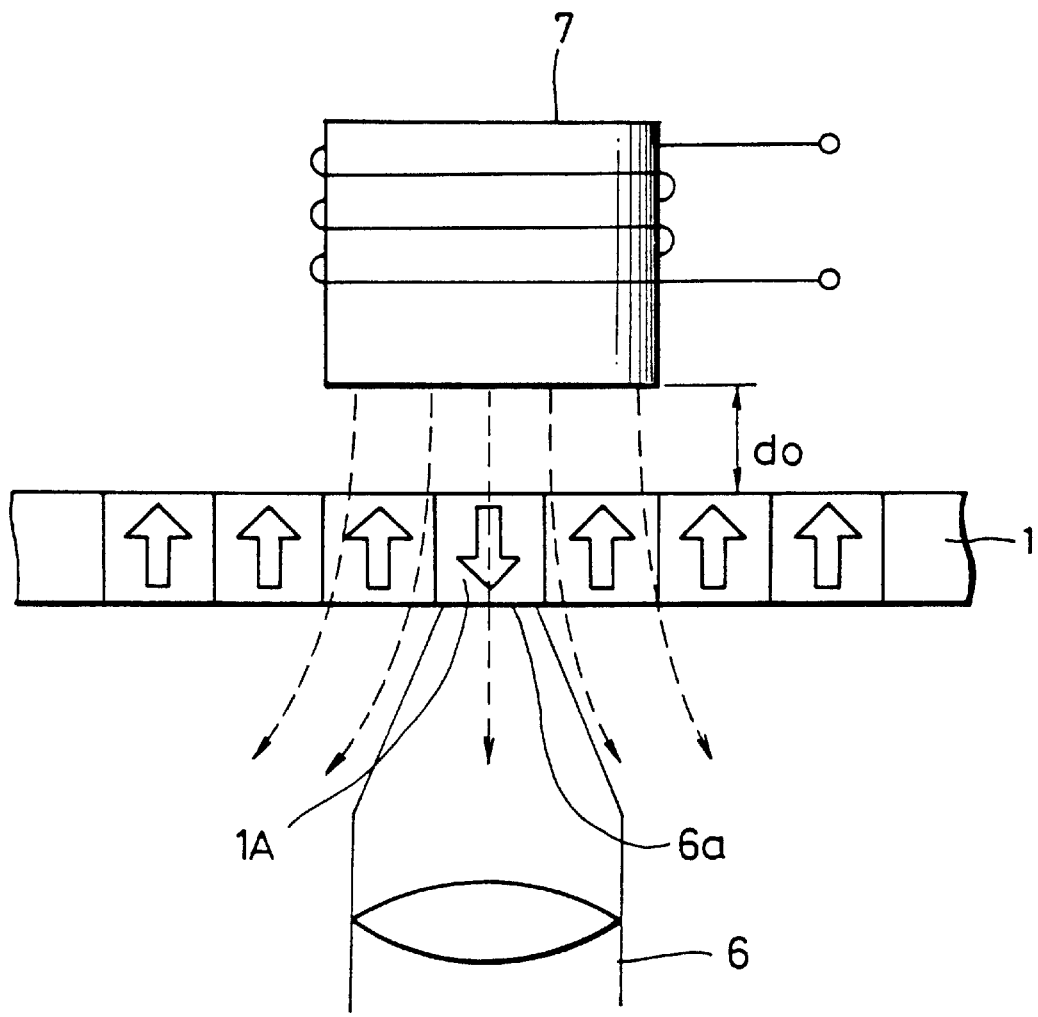
FIG. 2 is a diagram illustrative of a field-modulating recording process that is being carried out on the magnetooptical disk.

Like or corresponding parts are denoted by like or corresponding reference numerals throughout views.

Figure 3:
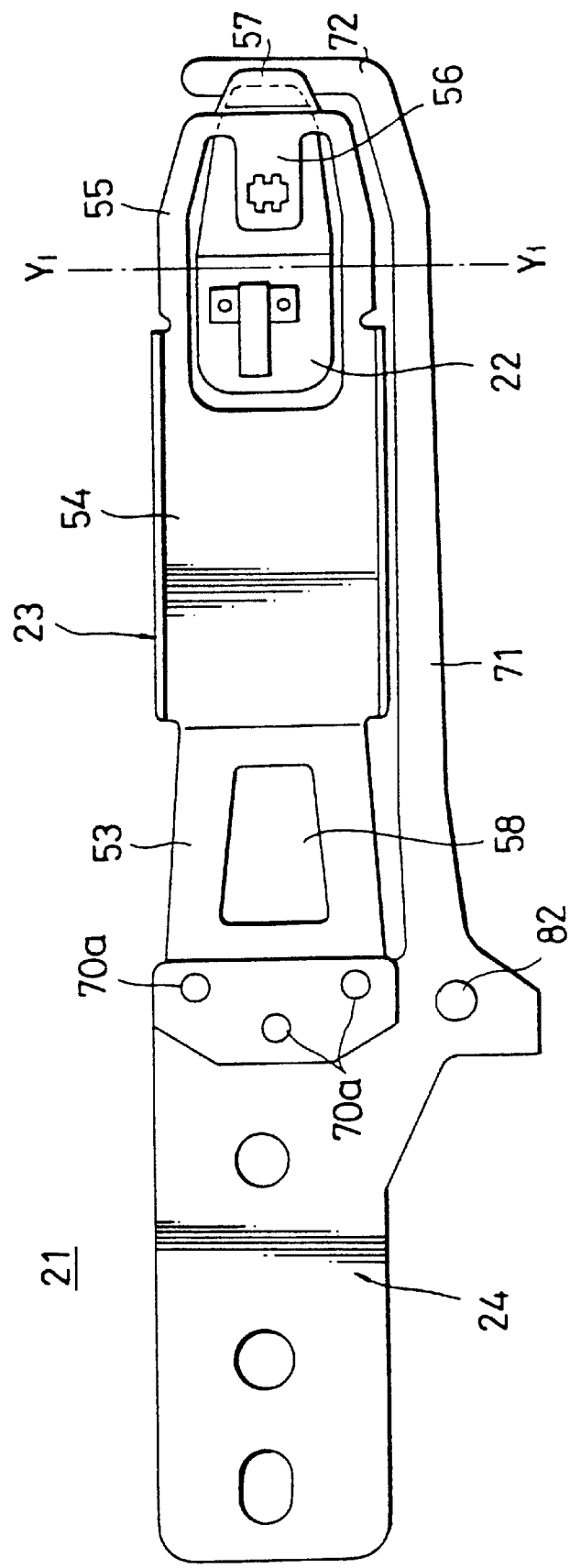
FIG. 3 is a plan view of a sliding-type magnetic head according to an embodiment of the present invention.
Figure 4:
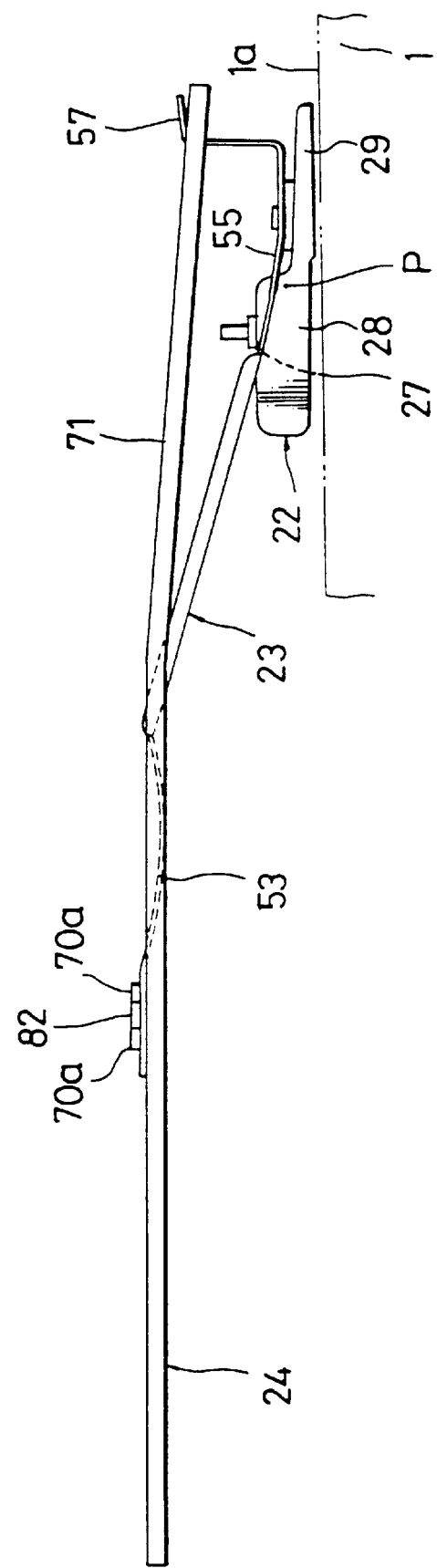
FIG. 4 is a side elevational view of the sliding-type magnetic head shown in FIG. 3.

Referring to FIGS. 3 and 4, a sliding-type magnetic head according to an embodiment of the present invention, which is generally designated by the reference numeral 21, comprises a head body 22, a thin leaf spring 23 for pressing a sliding sole 29 thereof against a surface 1a of a magnetooptical disk 1, and a support member or head arm 24 to which the leaf spring 23 is attached. The leaf spring 23 has one end fixedly joined to the support member 24, and the head body 22 is mounted on the other end of the support member 24.

Figure 6:
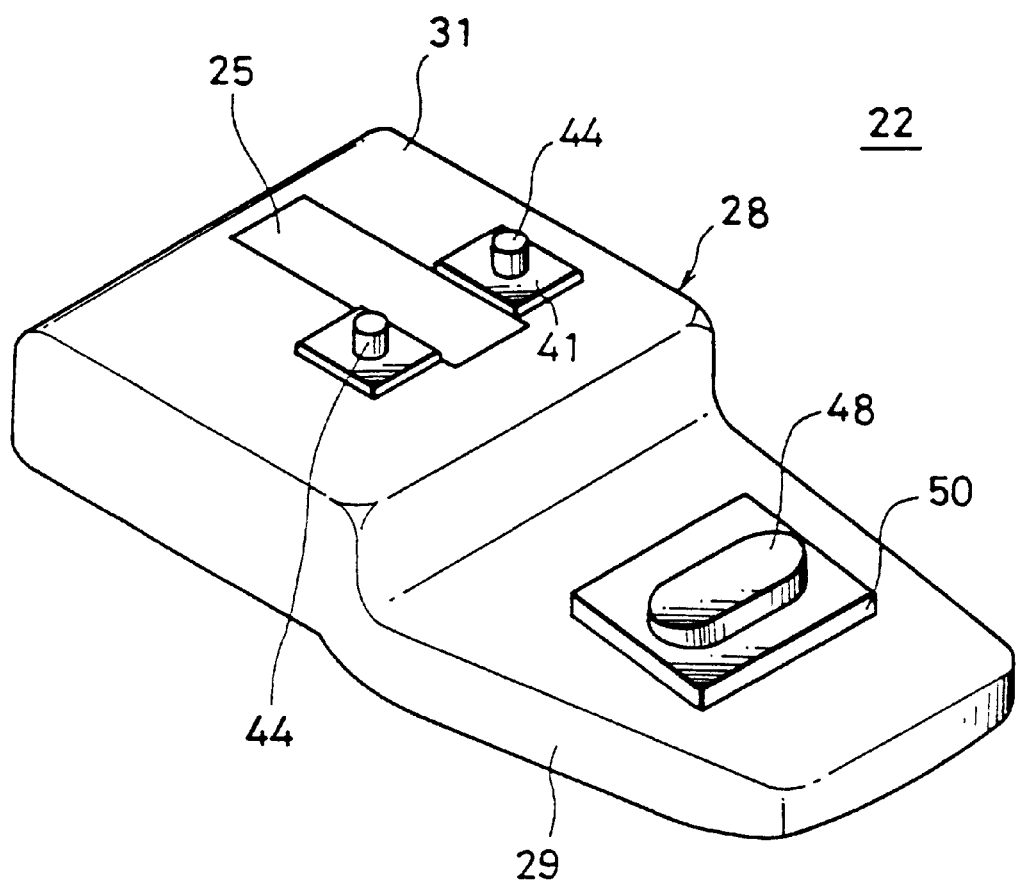
FIG. 6 is a perspective view of a head body of the sliding-type magnetic head shown in FIG. 3.
Figure 7:
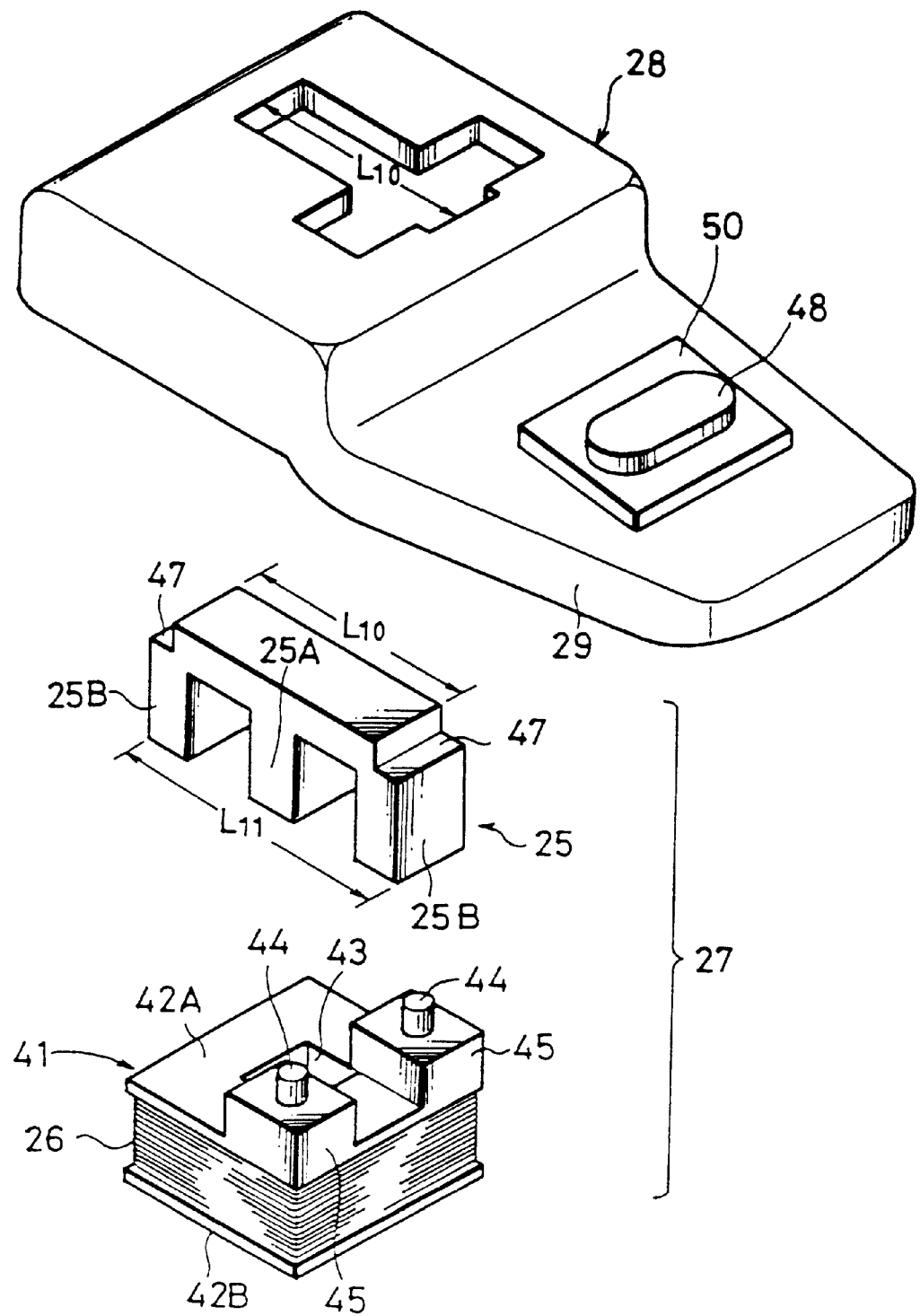
FIG. 7 is an exploded perspective view of the head body shown in FIG. 6.

As shown in FIGS. 6 and 7, the head body 22 has a magnetic head element 27 comprising a substantially E-shaped magnetic core 25 of ferrite and a coil bobbin 41 with a coil 26 wound therearound. The magnetic core 25 comprises a central magnetic core 25A and a pair of side magnetic cores 25B disposed one on each side of the central magnetic core 25A. The magnetic head element 27 is mounted on a slider 28, which includes the sliding sole 29 that is held in sliding contact with the magnetooptical disk 1.

The coil bobbin 41 has a pair of spaced flanges 42A, 42B as of liquid crystal polymer or the like on respective upper and lower ends thereof. The coil bobbin 41 has a vertical through hole 43 extending through the flanges 42A, 42B, with the central magnetic core 25A being inserted in the through hole 43. The upper flange 42A has an integral terminal support 45 mounted thereon on one side of the through hole 43, the terminal support 45 having a pair of terminal pins 44 as of nickel silver that are spaced from each other across the through hole 43.

Figure 8A:
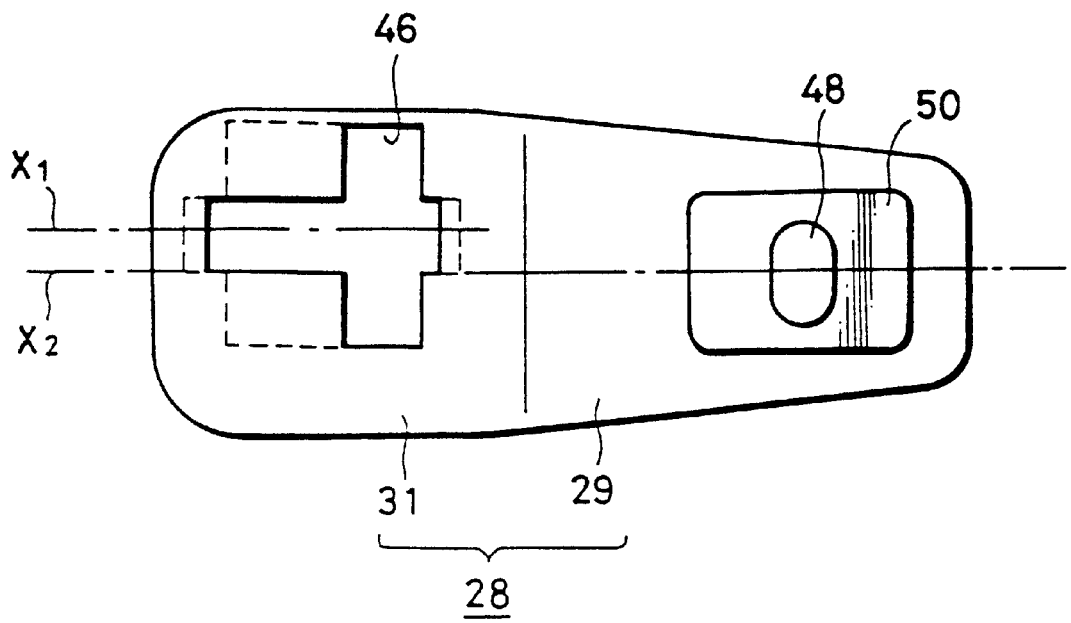
FIG. 8A is a plan view of a slider of the head body shown in FIG. 6.
Figure 8B:
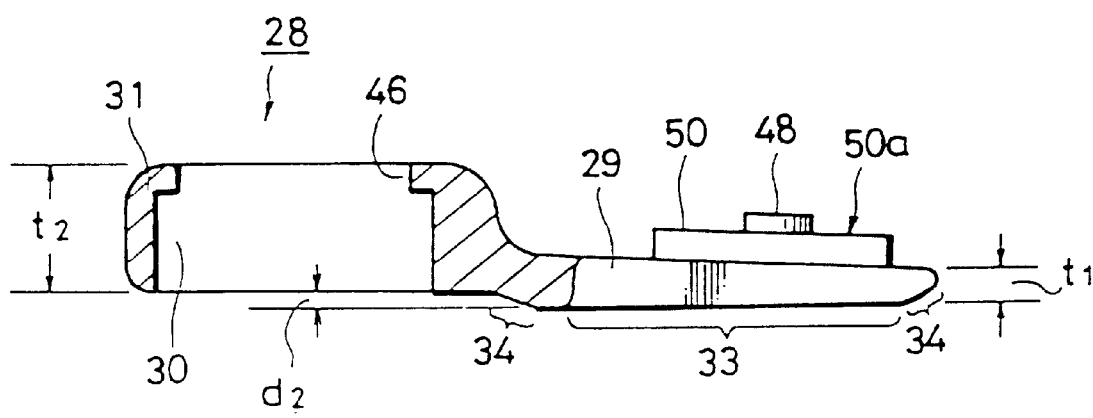
FIG. 8B is a cross-sectional view of the slider.

As shown in FIGS. 8A and 8B, the slider 28, which is injection-molded of a synthetic resin having a low coefficient of friction, has the sliding sole 29 and a mount 31 integrally joined to one side of the sliding sole 29, the mount 31 having a recess 30 defined therein for receiving the magnetic head element 27. The sliding sole 29 has a thickness $t_1$ that is smaller than the thickness $t_2$ of the mount 31. The lower surface of the mount 31 which supports the magnetic head element 27 is displaced a small distance $d_2$ from the lower surface of the sliding sole 29 which lies for sliding contact with the magnetooptical disk 1.

The lower sliding surface of the sliding sole 29 is arcuate in shape along the transverse direction (normal to the sheet FIG. 8B), and has a flat surface 33 and a pair of opposite curved end surfaces 34 along the longitudinal direction. Therefore, when the sliding sole 29 is held against the disk surface 1a, it is in linear contact with the disk surface 1a.

The recess 30, which is positioned on one side of the sliding sole 29, includes an upper opening 46 of a substantially crisscross shape which receives an upper surface of the magnetic core 25 and the terminal pins 44.

When the magnetic head element 27 is placed in the recess 30 of the slider 28, they jointly make up the head body 22.

Since the slider 28 is required to be highly slidable with respect to the magnetooptical disk 1, not to be electrically charged, and to be lightweight, the slider 28 is made of polymeric polyethylene with or without a carbon content (e.g., 8 weight % of carbon), or any of various plastic materials described later on.

The magnetic core 25 has a pair of steps or shoulders 47 on opposite ends of the upper surface thereof. The opening 46 of the slider 28 has a length $L_{10}$ which is the same as the length of the upper surface of the magnetic core 25 between the steps 47 and which is shorter than the length $L_{11}$ of the magnetic core 25 by a distance equal to the sum of the lengths of the steps 47. When the upper surface of the magnetic core 25 is snugly received in the opening 46, therefore, the magnetic head element 27 is easily positioned with respect to the slider 28. The depth of the steps 27 is selected such that when the upper surface of the magnetic core 25 is received in the opening 46, the upper surface of the slider 28 and the upper surface of the magnetic core 25 lie flush with each other.

As shown in FIG. 8A, the recess 30 has its longitudinal central axis $X_1$ extending out of alignment with the longitudinal central axis $X_2$ of the slider 28 for reasons described later on.

The sliding sole 29 has an attachment 48 integrally mounted on its upper surface for attaching the head body 22 to a distal end portion of the leaf spring 23. The attachment 48 projects upwardly from a base 50 on the upper surface of the sliding sole 29, which base 50 serves to contact the lower surface of the distal end portion of the leaf spring 23.

With the sliding sole 29 held in contact with the magnetooptical disk 1, the magnetic core 25 of the magnetic head element 27 has its lower end surface spaced from the disk surface 1a by the distance $d_2$.

Figure 9:
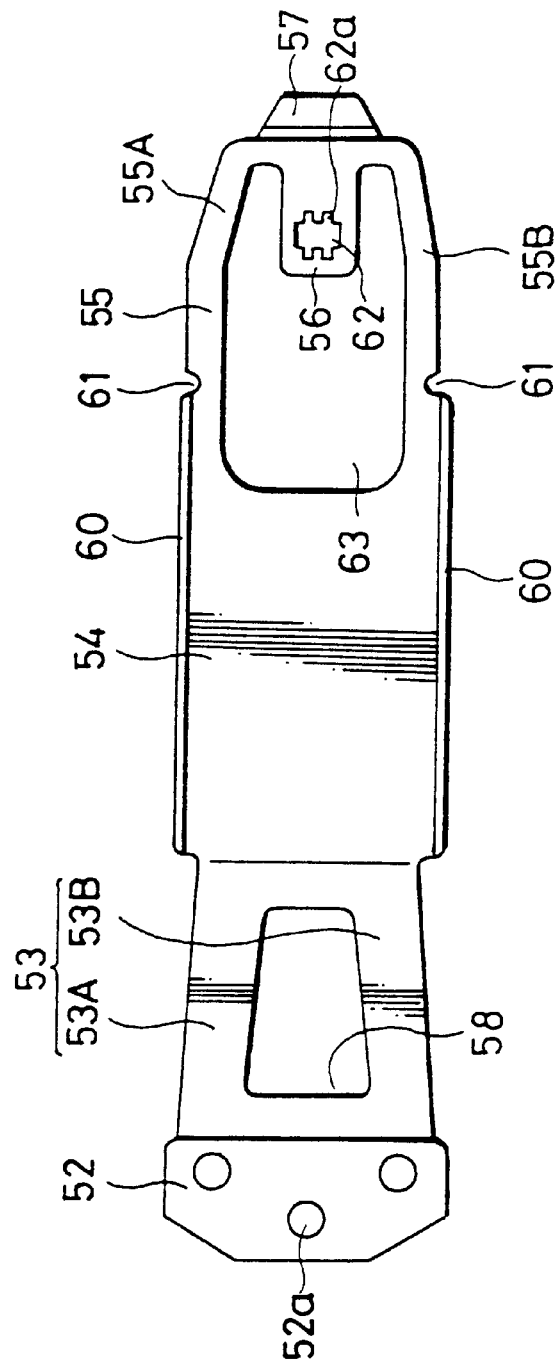
FIG. 9 is a plan view of a leaf spring of the sliding-type magnetic head shown in FIG. 3.
Figure 10:
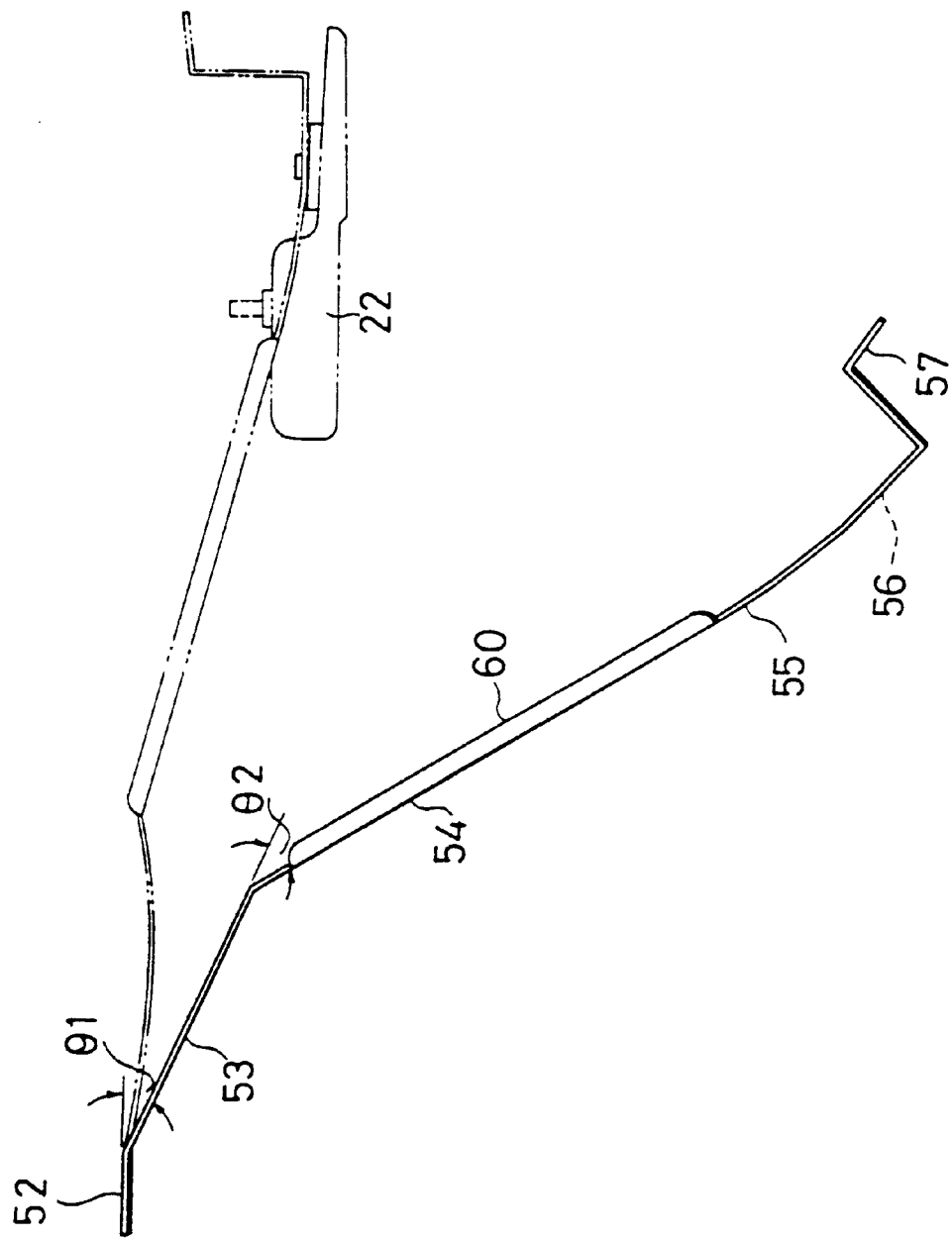
FIG. 10 is a side elevational view of the leaf spring shown in FIG. 9.

The leaf spring 23 is in the form of a thin sheet which may be made of SUS304, BeCu, or tension-annealed materials thereof. As shown in FIGS. 9 and 10, the leaf spring 23 comprises a joint 52 to be coupled to the support member 24, a first spring system (springy portion) 53 extending from the joint 52 obliquely downwardly at an angle $\theta_1$ for enabling the magnetic head 21 to follow surface displacements of the magnetooptical disk 1 and applying biasing forces to the magnetic head 21, an inclined portion 54 extending from the first spring system 53 obliquely downwardly at an angle $\theta_2$, a second spring system (springy portion) 55 extending from the inclined portion 54 for enabling the magnetic head 21 to follow surface irregularities such as bumps of the magnetooptical disk 1, a third spring system 56 extending as a gimbal from the second spring system 55 back toward the joint 52, and a locking hook bent upwardly at a substantially right angle or a similar angle from the distal end of the second spring system 55 and having a hook end 57 bent outwardly at a substantially right angle or a similar angle from the distal end of the locking hook. The portion of the locking hook which vertically extends has an opening (not shown) which makes itself lightweight.

The joint 52 is of a flat shape having a plurality of positioning holes 52a. The first spring system 53 is in the form of a substantially flat plate having a central opening 58 and includes a pair of laterally spaced side arms 53A, 53B which exert spring forces. The first spring system 53 is slightly curved as a whole when the leaf spring 24 is attached to the support member 24.

The inclined portion 24 has a pair of ribs 60 extending along its opposite sides, respectively, and bent upwardly at a right angle. The second spring system 55 comprises a pair of laterally spaced parallel flat springy arms 55A, 55B extending from the respective opposite sides of the inclined portion 24 through constrictions portions 61 positioned between the inclined portion 54 and the second spring system 55. The springy arms 55A, 55B are disposed one on each side of a space 63 and lie in the same plane. The third spring system 56 extends from an inner side of the distal end of the second spring system 55 into the space 63 between the springy arms 55A, 55B. The third spring system 56 has a positioning hole 62 defined in its distal portion to be fitted over the attachment 48 of the head body 22.

The first and second spring systems 53, 55 are operatively separate from each other by the inclined portion 54 stiffened by the ribs 60, and the second and third spring systems 55, 56 are also operatively separate from each other. Therefore, the first, second, and third spring systems 53, 55, 56 are operable independently of each other.

Figure 11:
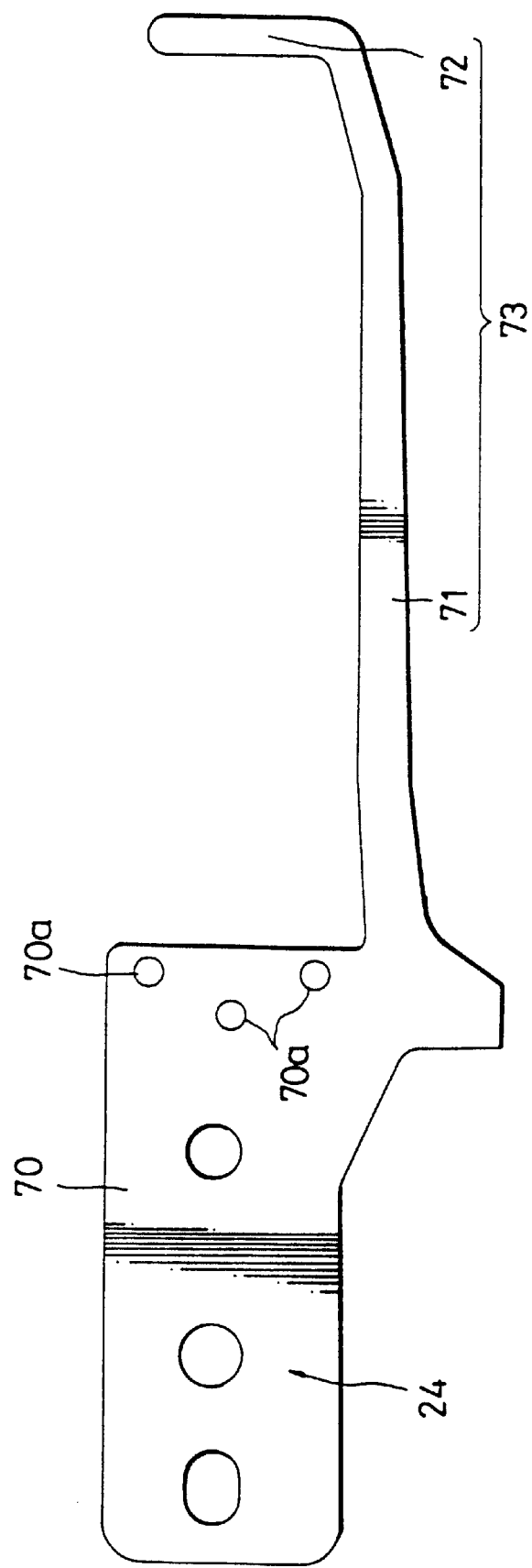
FIG. 11 is a plan view of a support member of the sliding-type magnetic head shown in FIG. 3.
Figure 12:
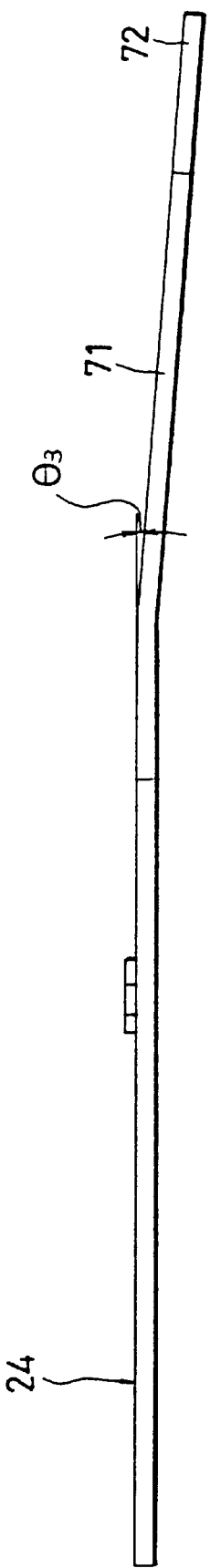
FIG. 12 is a side elevational view of the support member shown in FIG. 11.

As shown in FIGS. 11 and 12, the support member 24, which may be made of iron, steel, SUS304, aluminum, or the like, has an attachment base 70 to which the joint 52 of the leaf spring 23 is to be attached, and a stopper 73 extending from the attachment base 70 in an asymmetrical fashion. The stopper 73 has an arm 71 extending from one side of the attachment base 70, which side is positioned radially inwardly with respect to the magnetooptical disk 1, the arm 71 including a first portion corresponding to the length of the leaf spring 23 from the joint 52 to an intermediate position of the inclined portion 54, and a second portion corresponding to the length of the leaf spring 23 from the intermediate position of the inclined portion 54 to the locking hook and inclined at an angle $\theta_3$ with respect to the second portion. The stopper 73 also has a stop 72 integrally extending perpendicularly from the distal end of the arm 71 in spaced confronting relationship to the attachment base 70.

The angle $\theta_3$ is selected to be smaller than the angle $\theta_2$ that is smaller than the angle $\theta_1$ ($\theta_3 < \theta_2 < \theta_1$).

The support member 24 may be blanked out of sheet of iron, steel, SUS304, aluminum, or the like.

Alternatively, the support member 24 may be injection-molded of polyphenylene sulfide (PPS), polyacetal (POM), polyarylate (PAR), acrylonitrile-butadiene-styrene copolymer with or without a carbon content.

The joint 92 of the leaf spring 23 is joined to the attachment base 70 of the support member 24 by laser beam welding, spot welding, or the like with the positioning holes 52 fitted over respective positioning pins 70a on the support member 24.

The hook end 57 bent from the distal end of the second spring system 55 engages the stop 72 on the distal end of the arm 71. Since the angles $\theta_1$, $\theta_2$ of the leaf spring 23 are different from the angle $\Theta_3$ of the arm 71, the leaf spring 23 is engaged by the stop 72 with the first and second spring systems 53, 55 tending to recover their initial shapes. Stated otherwise, the first and second spring systems 53, 55 are pre-charged with predetermined spring forces.

Then, the attachment 48 of the head body 22 is inserted in the positioning hole 62 of the third spring system 56, and fused to attach the head body 22 to the leaf spring 23. The positioning hole 62 includes a plurality of slits 62a which enable the attachment 48 to be securely joined to the leaf spring 23.

The head body 22 is formed such that its center P of gravity (see FIG. 4) is positioned between the sliding sole 29, particularly a position where it is in direct contact with the magnetooptical disk 1, and the magnetic head element 27, particularly the central magnetic core 25A.

With the head body 22 installed on the end of the third spring system 56, the magnetic head element 27 is positioned in the space 63 defined between the springy arms 55A, 55B of the second spring system 55. The head body 22 should preferably be supported such that in use, the springy arms 55A, 55B extend through or in the vicinity of an axis $Y_1$ (see FIG. 3) which extends through the center P of gravity of the head body 22 and about which the head body 22 is angularly movable when it hits a bump 16 (see FIG. 14) of the magnetooptical disk 1. Therefore, the head body 22 is supported vertically across a plane in which the springy arms 55A, 55B lie.

The frequency of natural vibration of the head body 22 including the leaf spring 23 is lower than the equivalent frequency of bumps on the disk surface 1a when the magnetic head 21 slides against the magnetooptical disk 1 and also lower than the frequency of natural vibration of the magnetooptical disk 1.

The resonant frequencies of the three independent spring systems 53, 55, 56 are selected to meet the above frequency requirement.

The equivalent frequency of bumps on the disk surface 1a is defined as a maximum-amplitude frequency component caused by a bump when changes in the height of the magnetooptical disk 1 that moves at a linear speed used are expressed by a frequency.

Figure 5:
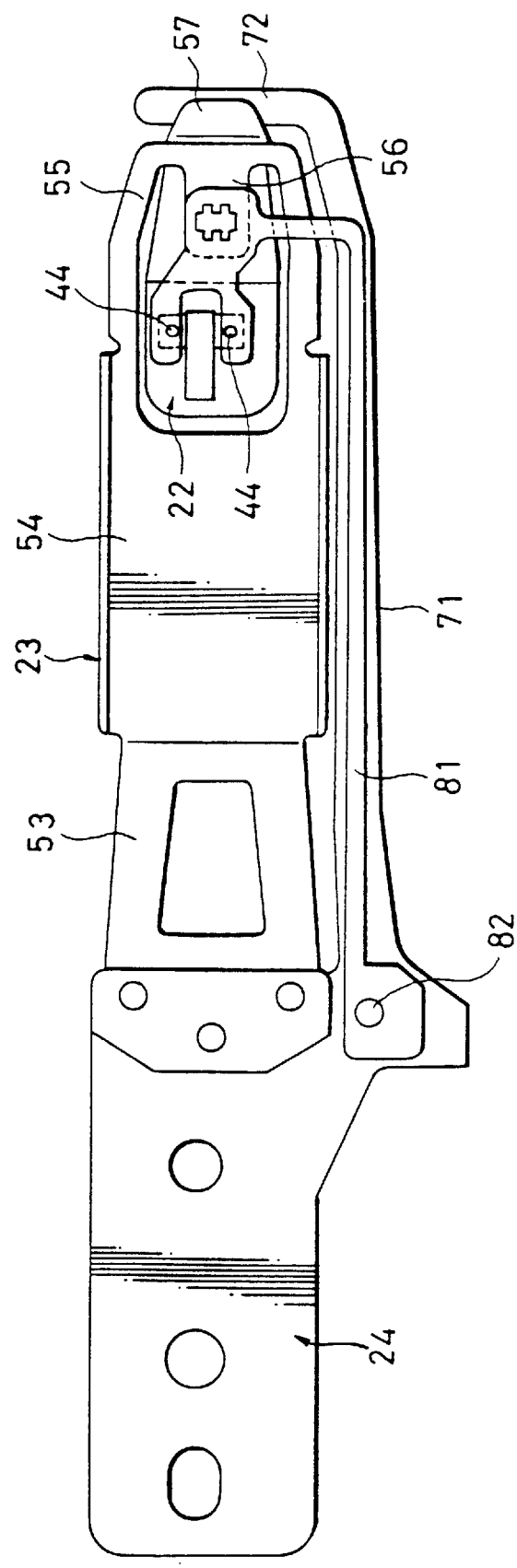
FIG. 5 is a plan view of the sliding-type magnetic head shown in FIG. 3 with a flexible wire cable.

As shown in FIG. 5, a flexible wire cable 81 connected to coil terminals has two wires (not shown) which have end connectors, i.e., round connectors, inserted into and connected to the terminal pins 44 that project upwardly from the slider 28. The flexible wire cable 81 extends on and along the arm 71 of the support member 24, and has an engaging hole defined in one end thereof which is fitted over an engaging pin 82 on the proximal end of the arm 71.

Figure 13A:
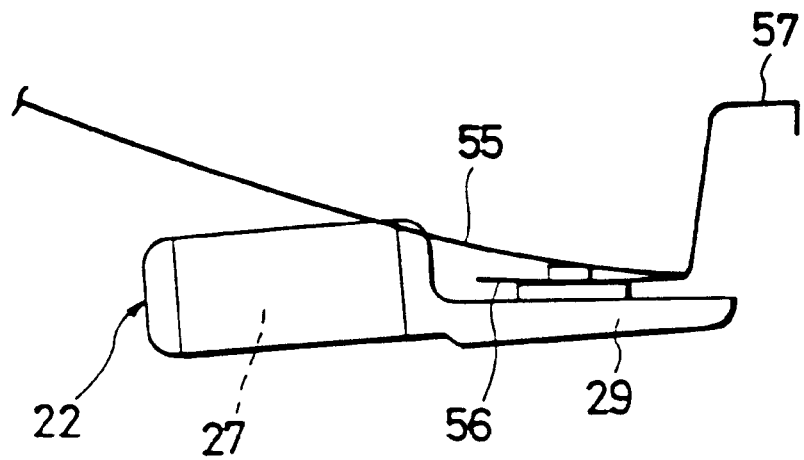
FIGS. 13A and 13B are side elevational views showing the manner in which the magnetic head shown in FIG. 3 operates.
Figure 13B:
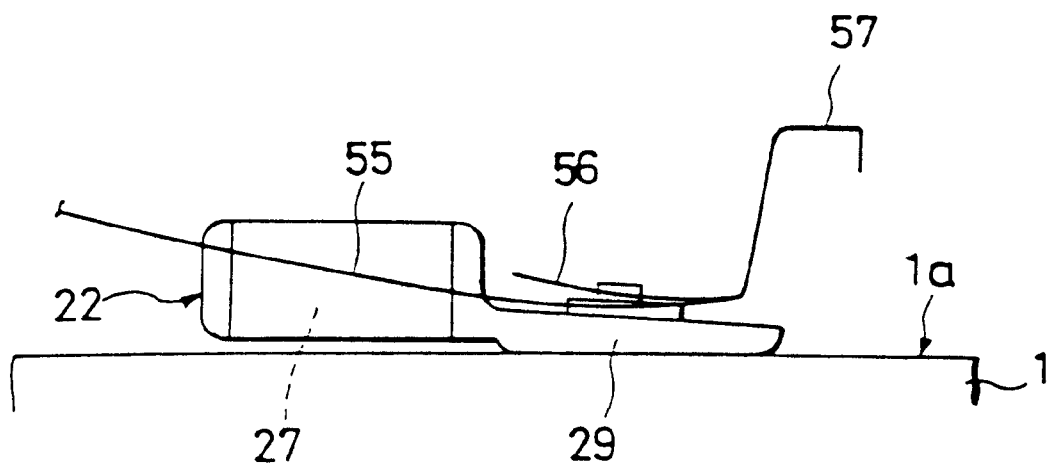

The magnetic head 21 operates as follows:

When the magnetic head 21 is in its free state prior to contact with the disk surface 1a, the head body 22 is held on the leaf spring 23 such that the third spring system 56 is lower than the second spring system 55, as shown in FIG. 13A. When the head body 22 is brought toward the disk surface 1a, the sliding sole 29 first abuts against the disk surface 1a and lies parallel to the disk surface 1a with the third spring system 56 moving in unison with the sliding sole 29, and thereafter the locking hook end 57 is released from the stop 72. Now, the head body 22 is held in slidable contact with the disk surface 1a under a predetermined load.

The head body 22 is movable within an allowable range of surface displacements of the disk surface 1a under the bias of the first spring system 53. For example, if the magnetooptical disk 1 is an ultrasmall magnetooptical disk having a diameter of 64 mm, then the allowable range of surface displacements of the disk surface thereof is ±0.7. The head body 22 is also movable to follow the bump 16 (FIG. 14) under the bias of the second spring system 55. The third spring 56 functions as a gimbal to allow the head body 22 to follow surface displacements of the disk surface 1a.

Since the leaf spring 23 is pre-loaded by the locking hook 72 engaged by and extending from the support member 24, any fluctuations in the pressure applied to the disk surface 1a by the head body 22 are small, i.e., the pressure applied to the disk surface 1a by the head body 22 is substantially constant, even when the head body 22 is vertically displaced by surface displacements of the disk surface 1a.

In this embodiment, because the magnetic head element 27 is retracted from the sliding surface of the sliding sole 29 by the distance $d_2$, the bump 16 on the disk surface 1a passes through a clearance between the magnetic head element 27 and the magnetooptical disk 1.

Figure 14:
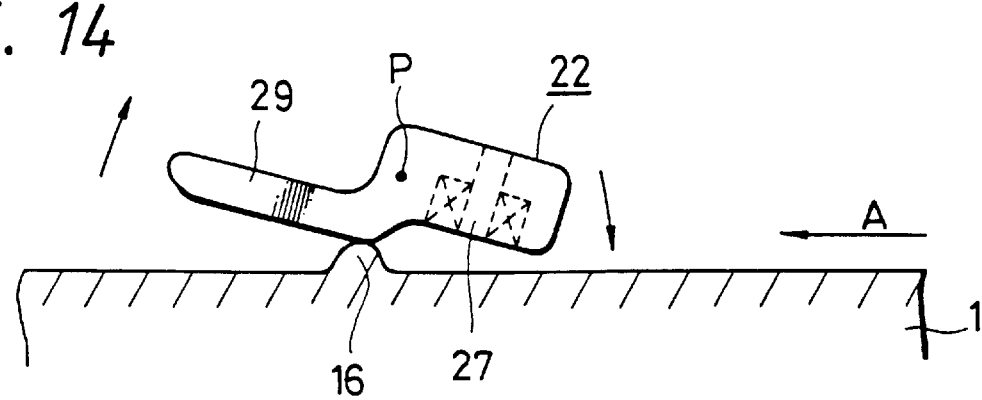
FIG. 14 is a side elevational view showing the manner in which the magnetic head shown in FIG. 3 operates.

As shown in FIG. 14, the center P of gravity of the head body 22 is located between the magnetic head element 27 and the sliding sole 29. When the head body 22 encounters a surface irregularity such as the bump 16, the bump 16 passes between the magnetic head element 27 and the disk surface 1a into abutment against the end of the sliding sole 29. Upon the bump 16 abutting against the end of the sliding sole 29, the magnetic head 22 turns clockwise relative to the center P of gravity as shown in FIG. 14, causing the magnetic head element 27 to move closer to the disk surface 1a. As a result, the recording capability of the magnetic head 21 is increased.

At the same time, the equivalent weight of the head body 22 as it is seen from the bump 16 is reduced. Therefore, the shock applied to the magnetooptical disk 1 by the head body 22 is relatively small, lessening adverse effects on an optical pickup system associated with the magnetic head 21.

Inasmuch as the magnetic head element 27 does not jump, but moves closer to the disk surface 1a even when the head body 22 encounters a surface irregularity of the disk surface 1a, the magnetic head 21 is not required to have a high recording capability, and may hence be relatively be small in mass and weight. Even when subjected to external shocks, the magnetic head 21 applies relatively small shocks to the magnetooptical disk 1. The magnetic head 21 can sufficiently withstand external shocks imposed thereon. In this embodiment, the weight of the head body 22 may be reduced to about 30 mg to 40 mg, and it can withstand external forces of 10 G (gravitational forces).

As described above, the frequency of natural vibration of the head body 22 including the leaf spring systems 53, 55, 56 is lower than the equivalent frequency of bumps on the disk surface 1a when the magnetic head 21 slides against the magnetooptical disk 1 and also lower than the frequency of natural vibration of the magnetooptical disk 1. Thus, the head body 22 is prevented from resonating, and the magnetic head 21 is operable stably.

The protective film 5 of the magnetooptical disk 1 is formed by spin coating. The spin coating process is however liable to produce a raised film portion on the outer circumferential edge of the magnetooptical disk 1. For higher recording density on the magnetooptical disk 1, information should preferably be recorded on the magnetooptical disk 1 as closely to its outer circumferential edge as possible.

As shown in FIG. 8A, the central axis $X_1$ of the magnetic head element 27 is displaced out of alignment with the central axis $X_2$ of the slider 28, as described above. Therefore, even when the magnetic head element 27 moves closer to the raised film portion on the outer circumferential edge of the magnetooptical disk 1, the slider 29 slides in linear contact with a flat area of the disk 1 which is spaced from the raised film portion. As a result, the magnetic head 21 is able to record information with high density on the magnetooptical disk 1.

As the second spring system 55 which enables the magnetic head 21 to follow surface irregularities such as bumps of the magnetooptical disk 1 is operable independently of the first spring system 56 which enables magnetic head 21 to follow surface displacements of the magnetooptical disk 1, any adverse effects imposed on the magnetooptical disk 1 at the time the magnetic head 21 hits a bump 16 are minimized.

The second spring system 55 extends through or in the vicinity of the axis $Y_1$ that extends through the center P of gravity of the head body 22. Thus, when the magnetic head 21 hits a bump 16, the head body 22 turns about the center P of gravity or the axis $Y_1$ that is aligned with the axis about which the second spring system 55 operates. Therefore, the head body 22 can operate in a perfect mode.

Stresses developed in the leaf spring 23 concentrate on the constricted portions 61 positioned between the inclined portion 54 and the second spring system 55. Therefore, the leaf spring 23 is prevented from resonating during operation.

The magnetic head 21 offers the following advantages as compared with a prior sliding-type magnetic head for magnetooptically recording information on a magnetooptical recording medium in sliding contact therewith as proposed in Japanese patent application No. 4-23964.

Figure 15A:
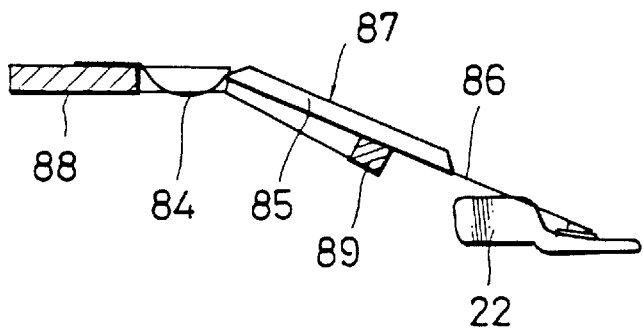
FIG. 15A is a side elevational view of a comparative magnetic head.

The prior comparative magnetic head, which is denoted at 83 in FIG. 15A, has a leaf spring 87 that comprises a first spring system 84, an inclined portion 85 extending obliquely at a certain angle from the first spring system 84 and having ribs, and a second spring system 86 extending from the inclined portion 85. The leaf spring 87 is fixed at one end thereof to a support member 88, which has a stopper 89 held against the inclined portion 85 to pre-charge the first spring system 84 with a predetermined spring force. The magnetic head also has a head body 22 supported on the distal end of the second spring system 86 through a gimbal. The first spring system 84 enables the magnetic head 83 to follow surface displacements of a magnetooptical disk 1 within an allowable range and applies biasing forces to the magnetic head 83, and the second spring system 86 enables the magnetic head 83 to follow surface irregularities such as bumps of the magnetooptical disk 1.

Figure 15B:
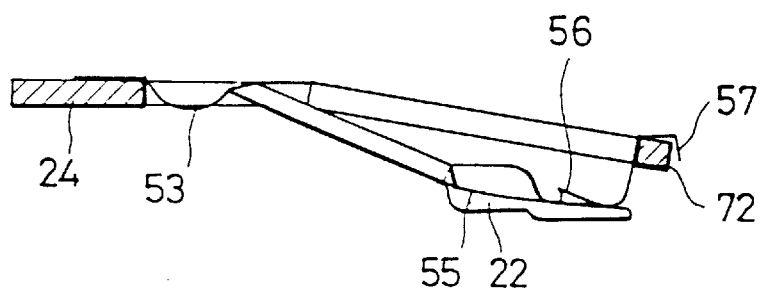
FIG. 15B is a side elevational view of an inventive magnetic head.

FIG. 15B shows an inventive magnetic head 21 which is identical to the magnetic head 21 shown in FIG. 3. Comparison between the magnetic heads 21, 83 shows that when a disk cartridge housing a magnetooptical disk is ejected from a recording and reproducing apparatus, the proximal portion of the support member 24, for example, is turned to space the head body 22 away from the disk cartridge, i.e., from an operating position to a nonoperating position, by a distance that is smaller than the distance of the comparative magnetic disk 83.

More specifically, with the magnetic head 83 shown in FIG. 15A, only the first spring system 84 is pre-stressed, and the second spring system 86 is in a free state. In use, after the sliding sole 29 of the head body 22 contacts the magnetooptical disk 1, the magnetic head 83 is pressed downwardly to achieve a desired pressure against the magnetooptical disk 1. The distance that the head body 22 traverses at this time with respect to the support member 88 until the instant the second spring system 86 disengages from the stopper 89 is larger than the distance traversed by the head body 22 of the inventive magnetic head 21. When the magnetic head 83 is depressed, the spring pressure exerted by the leaf spring 87 progressively increases until the inclined portion 85 is released from the stopper 89. After the inclined portion 85 is released from the stopper 89, the spring pressure of the leaf spring 87 changes a little, i.e., increases slightly, even when the magnetic head 83 is further depressed.

With the inventive magnetic head 21, however, because the first and second spring systems 53, 55 are pre-charged, the distance that the head body 22 traverses with respect to the support member 24 after the slider 29 contacts the magnetooptical disk 1 until the second spring system 55 disengages from the stop 72, i.e., the distance by which the magnetic head 21 is depressed to achieve a desired pressure against the magnetooptical disk 1, is relatively small. As a consequence, the distance by which the magnetic head 21 is lifted when the disk cartridge is ejected is relatively small.

Figure 16:
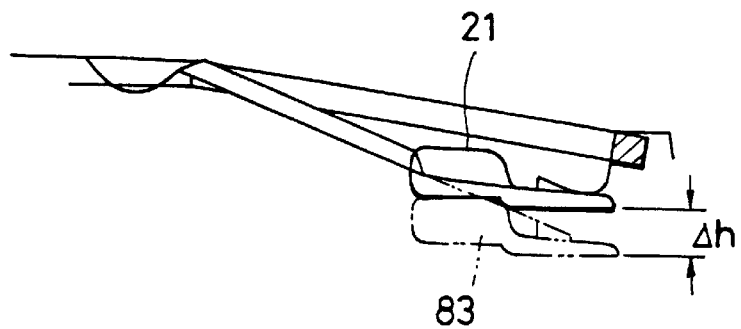
FIG. 16 is a side elevational view showing the heights of the inventive and comparative magnetic heads.

FIG. 16 shows, for comparison, the height of the inventive magnetic head 21 and the height of the comparative magnetic head 83. As shown in FIG. 16, the inventive magnetic head 21 is higher than the comparative magnetic head 83 by a distance which is equal to the difference $\Delta h$ between the height of the inventive magnetic head 21 and the height of the comparative magnetic head 83. When the magnetic heads are incorporated in the proposed ultrasmall-size digital recording and reproducing apparatus, the difference $\Delta h$ is approximately 1 mm. Accordingly, the ultrasmall-size digital recording and reproducing apparatus with the inventive magnetic head 21 may be reduced in thickness.

Inasmuch as only the first spring system 84 is pre-stressed in the comparative magnetic head 83, the head body 22 fixed to the second spring system 86 tends to wobble when it is lifted. Therefore, the distance to be traversed by the head body 22 when it is lifted should be increased to accommodate such wobbling movement of the head body 22. According to this embodiment, however, since the distal end of the second spring system 55 near the head body 22 is engaged by the stop 72 through the locking hook end 57, the head body 22 is prevented from wobbling when it is lifted. As the distance to be traversed by the head body 22 when it is lifted does not need to be increased to accommodate wobbling movement of the head body 22, that distance may be relatively small.

Figure 17A:
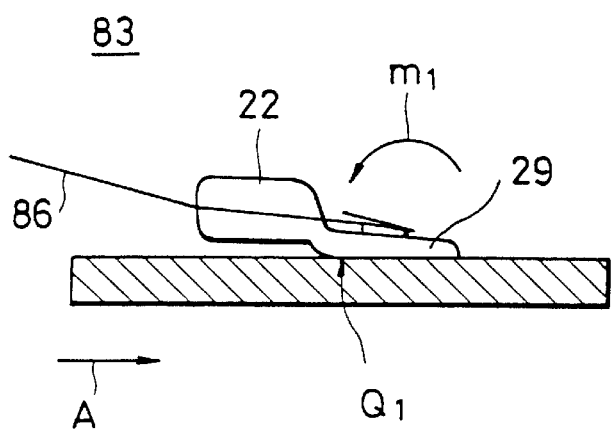
FIGS. 17A and 17B are side elevational views showing the manner in which the comparative and inventive magnetic heads operate.
Figure 17B:
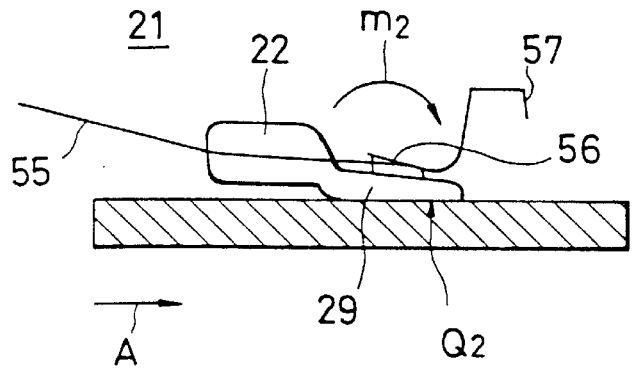

When the head body 22 of the comparative magnetic head 83 is brought into contact with the magnetooptical disk 1 and the magnetic head 83 is thereafter depressed, a moment $m_1$ (see FIG. 17A) acts in the vicinity of a region where a gimbal mechanism supporting the head body 22 is attached to the second spring system 86 in order to match the angle of the second spring system 86 alongside of the gimbal mechanism. Therefore, stresses are applied to the magnetooptical disk 1 by the head body 22 concentrate in a point $Q_1$ positioned on the sliding sole 29 near the magnetic head element. Consequently, as the magnetooptical disc 1 moves in the direction indicated by the arrow A, the sliding sole 29 of the head body 22 tends to stick to the surface of the magnetooptical disk 1.

On the other hand, when the inventive magnetic head 21 is depressed, the third spring system 56 shifts a stress concentration point $Q_2$ toward the distal end of the sliding sole 29, and a moment $m_2$ which is opposite in direction to the moment $m_1$ is exerted. Therefore, when the magnetooptical disc 1 moves in the direction indicated by the arrow A, the front end of the head body 22 tends to float away from the magnetooptical disk 1, preventing the head body 22 from sticking to the magnetooptical disk 1 while slipping thereon.

In operation, the sliding-type magnetic head 21 is held in contact with the magnetooptical disk 1 through a window 92 (see FIGS. 18 and 19) defined in a disk cartridge 91 without contacting the disk cartridge 91 itself. If the magnetooptical disk 1 has a diameter of 65 mm, then the head body 22 moves within the window 92 by a radial distance from a position that is spaced from the cartridge center by 14.5 mm to a position that is spaced from the cartridge center by 31.0 mm. The margin between the core center and the edge of the window 92 is $x_1$=1.5 mm on an outer circumferential side and $x_2$=4.0 mm on an inner circumferential side. The disk cartridge 91 has a step 94 on the inner circumferential side of the window 92. The arm 71 of the magnetic head 21 has a marginal dimension $x_3$ of 5.5 mm. As the arm 71 is positioned on one side of the magnetic head 21, i.e., a radially inner side thereof with respect to the magnetooptical disk 1, the head body 22 can move by the above radial distance within the window 92 without undue limitations.

The spring characteristics of the leaf spring 23 are not modified by the flexible wire cable 81 because the flexible wire cable 81 is placed on and along the arm 71.

Figure 20:
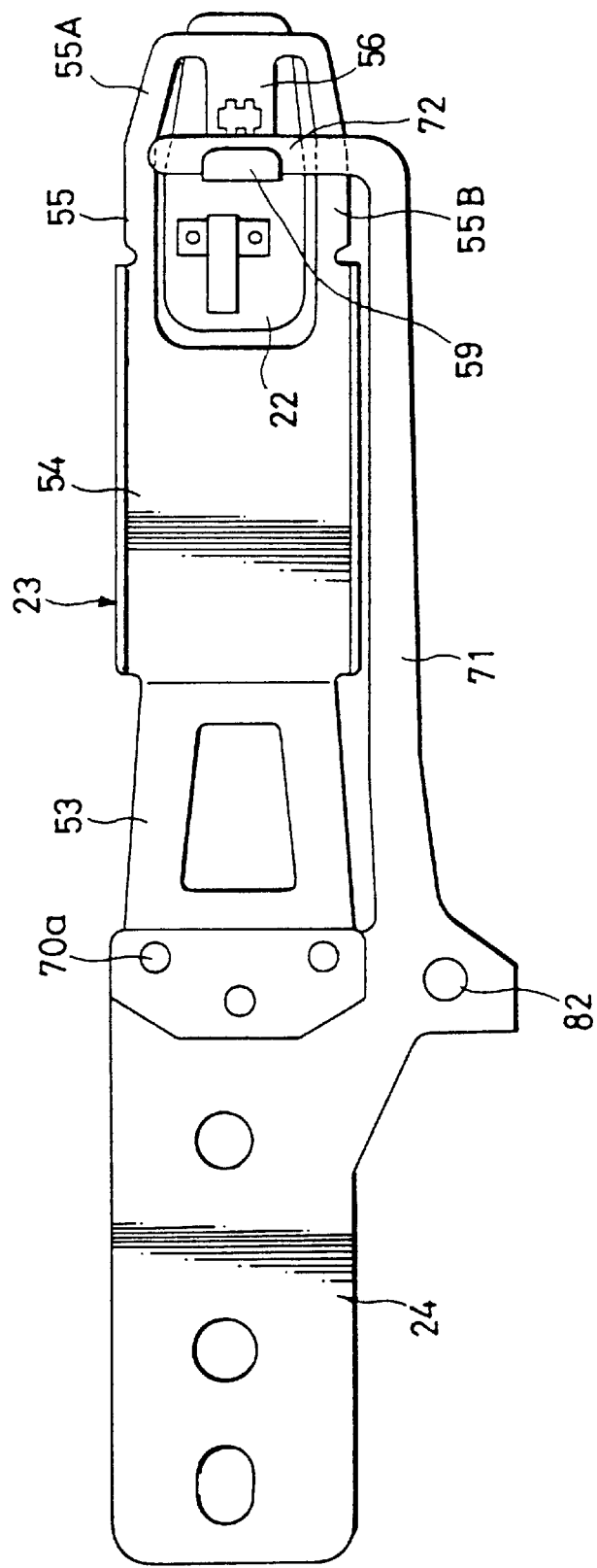
FIG. 20 is a plan view of a sliding-type magnetic head according to another embodiment of the present invention.
Figure 21:
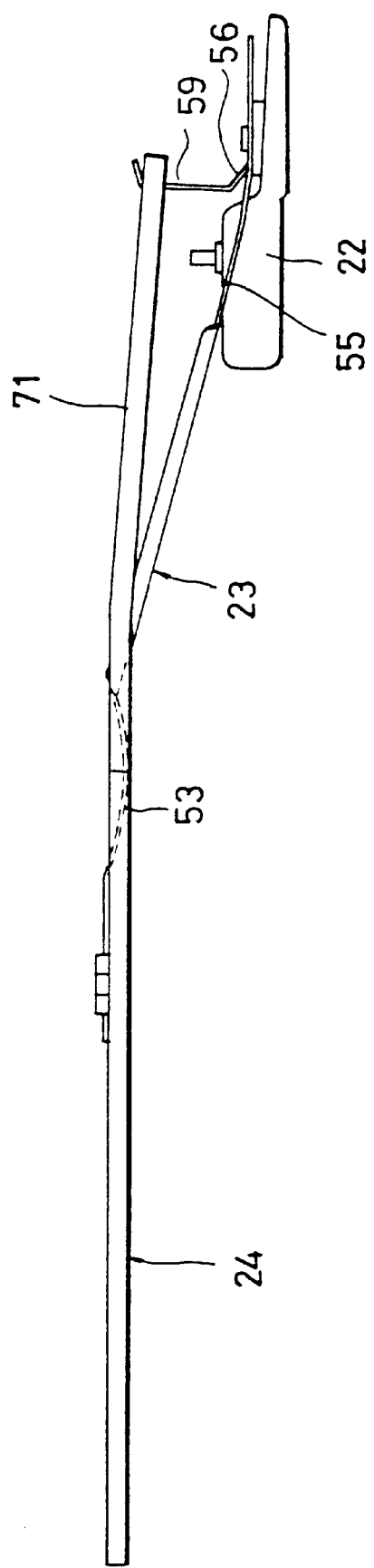
FIG. 21 is a side elevational view of the sliding-type magnetic head shown in FIG. 20.

FIGS. 20 and 21 show a sliding-type magnetic head according to another embodiment of the present invention.

According to this embodiment, the sliding-type magnetic head, which is generally denoted at 96, has a locking hook 59 formed on the distal end of the third spring system 56 and engageable with the stop 72 to lock the leaf spring 23 on the support member 24. The other structural details are the same as those of the embodiment shown in FIGS. 3 and 4, and will not be described in detail below.

In the magnetic head 96, the third spring system 56 as well as the first and second spring systems 53, 55 is pre-stressed by locking engagement with the stop 72. In principle, the instant the head body 22 contacts the magnetooptical disk 1 in use, the head body 22 exerts a predetermined pressure on the magnetooptical disk 1. Therefore, the distance that the magnetic head 96 is lifted is smaller than the magnetic head 21 shown in FIG. 3, and hence the recording and reproducing apparatus with the magnetic head 96 may be smaller in thickness. The magnetic head 96 also offers the same advantages as those of the magnetic head 21 shown in FIG. 3.

Figure 22:
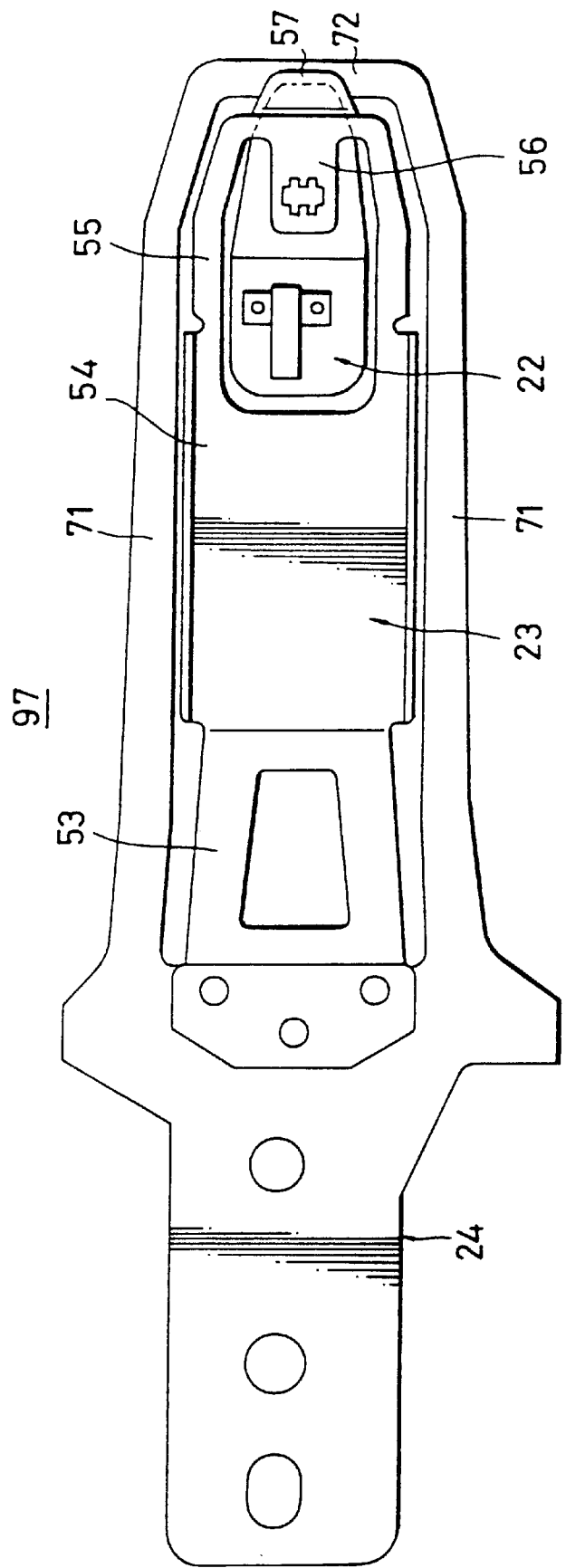
FIG. 22 is a plan view of a sliding-type magnetic head according to still another embodiment of the present invention.

As shown in FIG. 22, a sliding-type magnetic head 97 according to still another embodiment of the present invention has a pair of laterally spaced arms 71 extending from opposite sides of the attachment base of the support member 24 along respective opposite sides of the leaf spring 23. The arms 71 are joined to each other at their distal ends by the stop 72.

To stabilize the attitude of a sliding-type magnetic head for recording information on a magnetooptical disk, it is desirable that the sliding sole 29 be positioned adjacent to the magnetic head element 27 along the direction in which the magnetic head runs with respect to the magnetooptical disk 1 and that the sliding sole 29 have its longitudinal direction close to that direction. In such an arrangement, the sliding sole 29 is held in linear contact with the magnetooptical disk 1 or in point contact therewith through a linear array of points.

Since the magnetic head element 27 is positioned on a radius of the magnetooptical disk 1, the sliding sole 29 is slightly displaced from the radius of the magnetooptical disk 1. In the case where the longitudinal direction of the sliding sole 29 is aligned with the direction in which the magnetic head runs with respect to the magnetooptical disk 1, frictional forces applied to the head body 22 by the magnetooptical disk 1 when the magnetic head slides against the magnetooptical disk 1, and shocks imposed on the head body 22 by an obstacle on the magnetooptical disk 1 have a relatively large component across the longitudinal direction of the sliding sole 29. Such frictional forces and shocks pose the following problems:

(1) The probability that an obstacle such as a bump 16 or the like on the disk surface 1a hits the head body 22 is large.

(2) Particularly, shocks imposed on the head body 22 when an obstacle on the magnetooptical disk 1 hits the head body 22 have a relatively large component perpendicular to the longitudinal direction of the sliding sole 29. This makes the magnetic head less stable in attitude.

(3) Frictional forces that act on the sliding sole 29 at all times also have a relatively large component perpendicular to the longitudinal direction of the sliding sole 29, tending to apply large torsional forces to the head body 22. The magnetic head element 27 is thus positionable with less accuracy.

Figure 23:
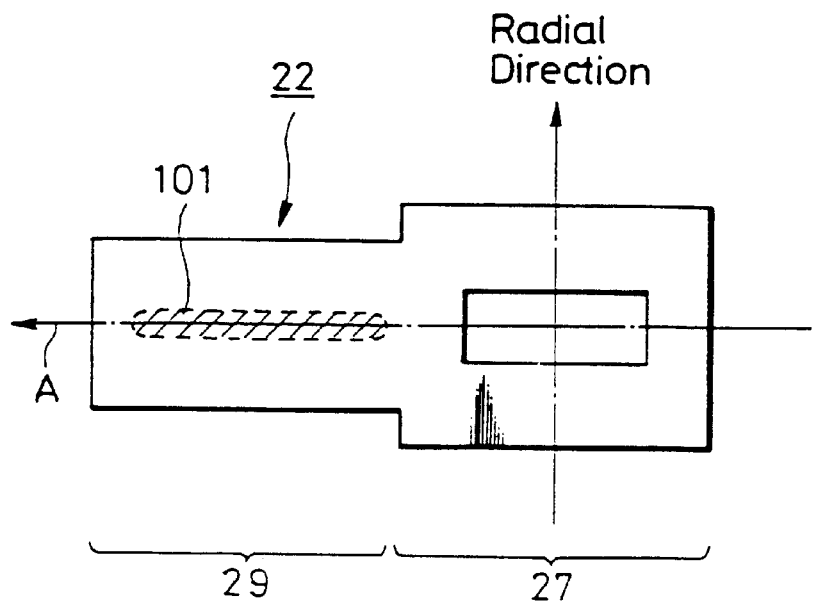
FIG. 23 is a schematic view of the head body of a magnetic head according to the present invention.

The above drawbacks will be described below with reference to the drawings. FIG. 23 schematically shows the head body 22 with the sliding sole 29 being positioned adjacent to the magnetic head element 27 along the direction A in which the magnetic head runs with respect to the magnetooptical disk 1, i.e., along the tangential direction of the magnetooptical disk 1 as it rotates. Actually, the sliding sole 29 has a sliding contact region 101 that is actually held in linear contact with the magnetooptical disk 1 or point contact therewith through a linear array of points. In the arrangement shown in FIG. 23, the sliding contact region 101 is held in linear contact with the magnetooptical disk 1, and has its longitudinal direction aligned with the direction in which the magnetic head element 27 positioned on a radius of the magnetooptical disk 1 runs with respect to the magnetooptical disk 1.

Figure 24:
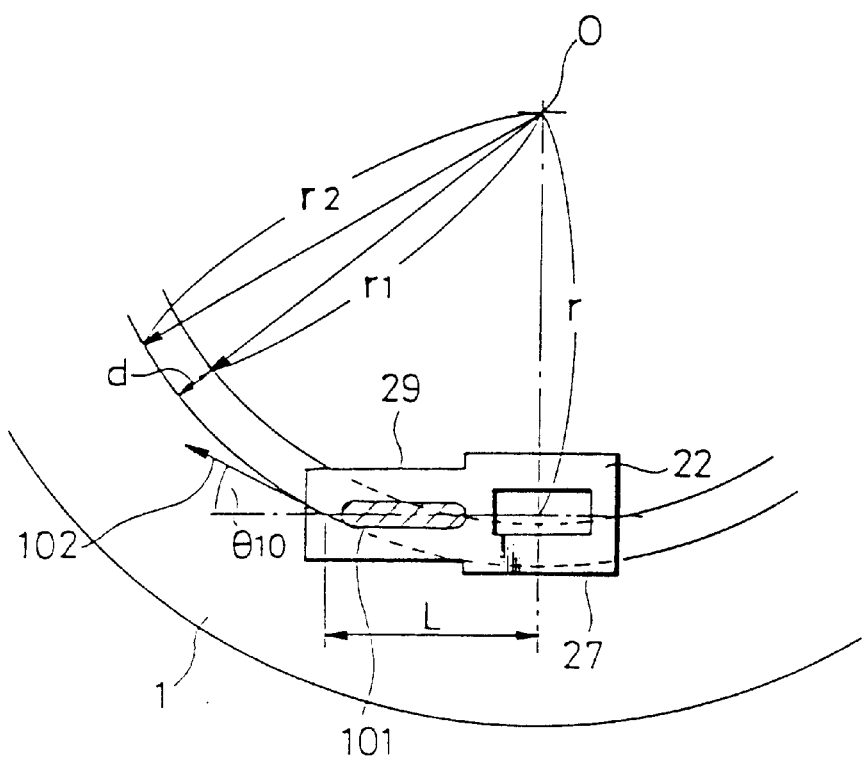
FIG. 24 is a schematic view showing the manner in which the magnetic head shown in FIG. 23 operates.

FIG. 24 illustrates a radial range d in which the sliding contact region 101 of the sliding sole 29 is held in sliding contact with the magnetooptical disk 1 when the magnetic head element 27 is positioned on a radius r of the magnetooptical disk 1. The radial range d is equal to the difference between the distance from the center O of the magnetooptical disk 1 to one end of the sliding contact region 101 and the distance from the center O of the magnetooptical disk 1 to the other end of the sliding contact region 101, i.e., $r_2 - r_1$.

It is clear that if obstacles on the magnetooptical disk 1 which affect the sliding sole 29 have a uniform density, then the probability that the sliding sole 29 is affected by such obstacles is higher as the radial range d is greater.

The direction indicated by the arrow 102 in which the sliding sole 29 actually slides on the magnetooptical disk 1 is angularly spaced from the longitudinal direction of the sliding contact region 101 by an angle $\theta_{10}$. The angle $\theta_{10}$ varies according to the equation $\theta_{10} = \tan^{-1}(L/r)$ depending on the distance L from the center of the magnetic head element 27 to the far end of the sliding contact region 101, as shown in FIG. 25.

Figure 25:
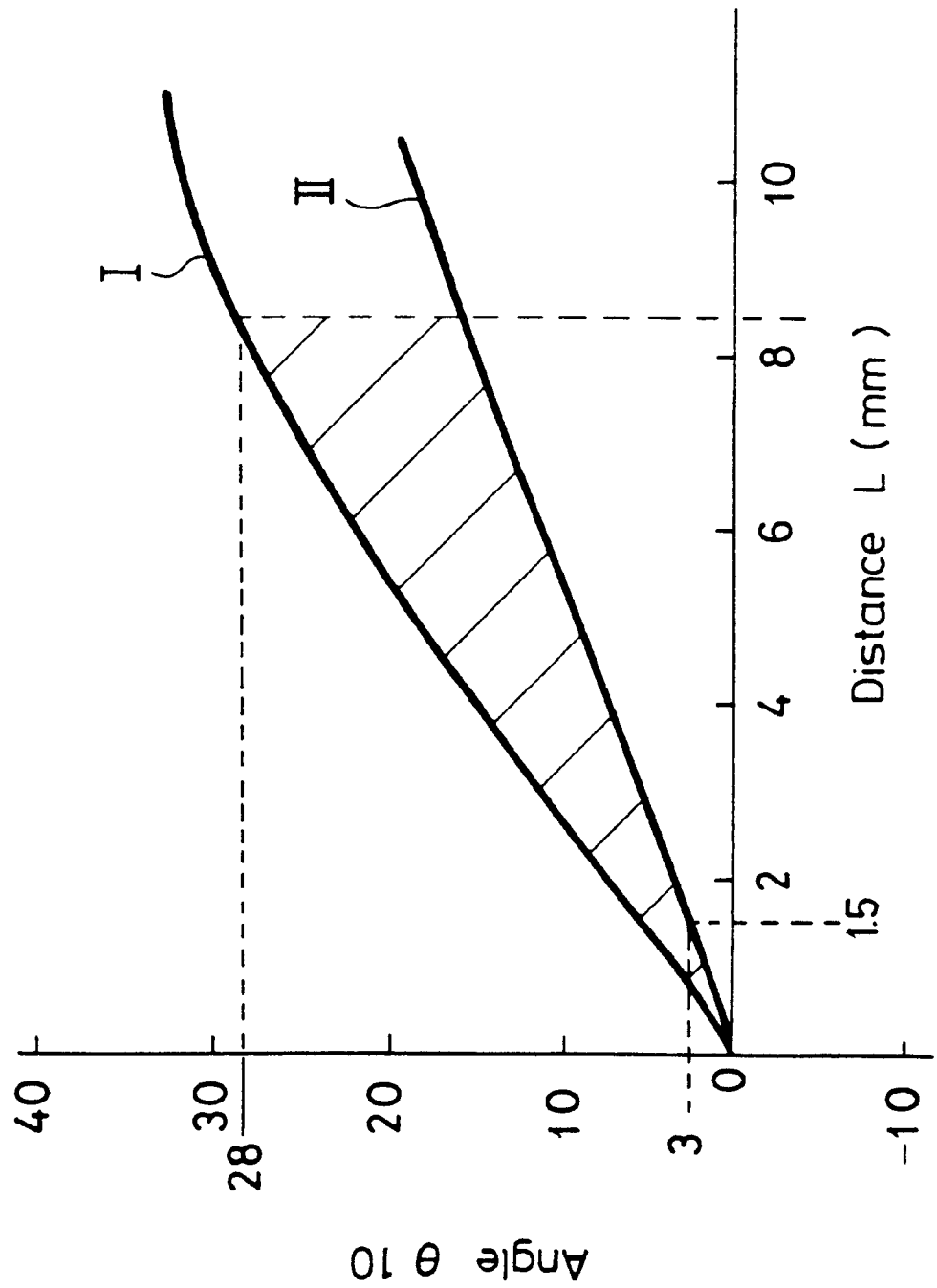
FIG. 25 is a graph showing the relationship between an angle $\theta_{10}$ and a distance L in FIG. 24 at radially opposite ends of a radial area used of a magnetooptical disk on which the magnetic head shown in FIG. 23 operates.

FIG. 25 illustrates the relationship between the angle $\theta_{10}$ and the distance L at radially opposite ends of an actual area used of the magnetooptical disk 1, which actual area extends radially from a radius r=16 mm to a radius r=31 mm. The curve I represents the relationship at the radius r=16 mm, and the curve II represents the relationship at the radius r=31 mm.

Figure 18:
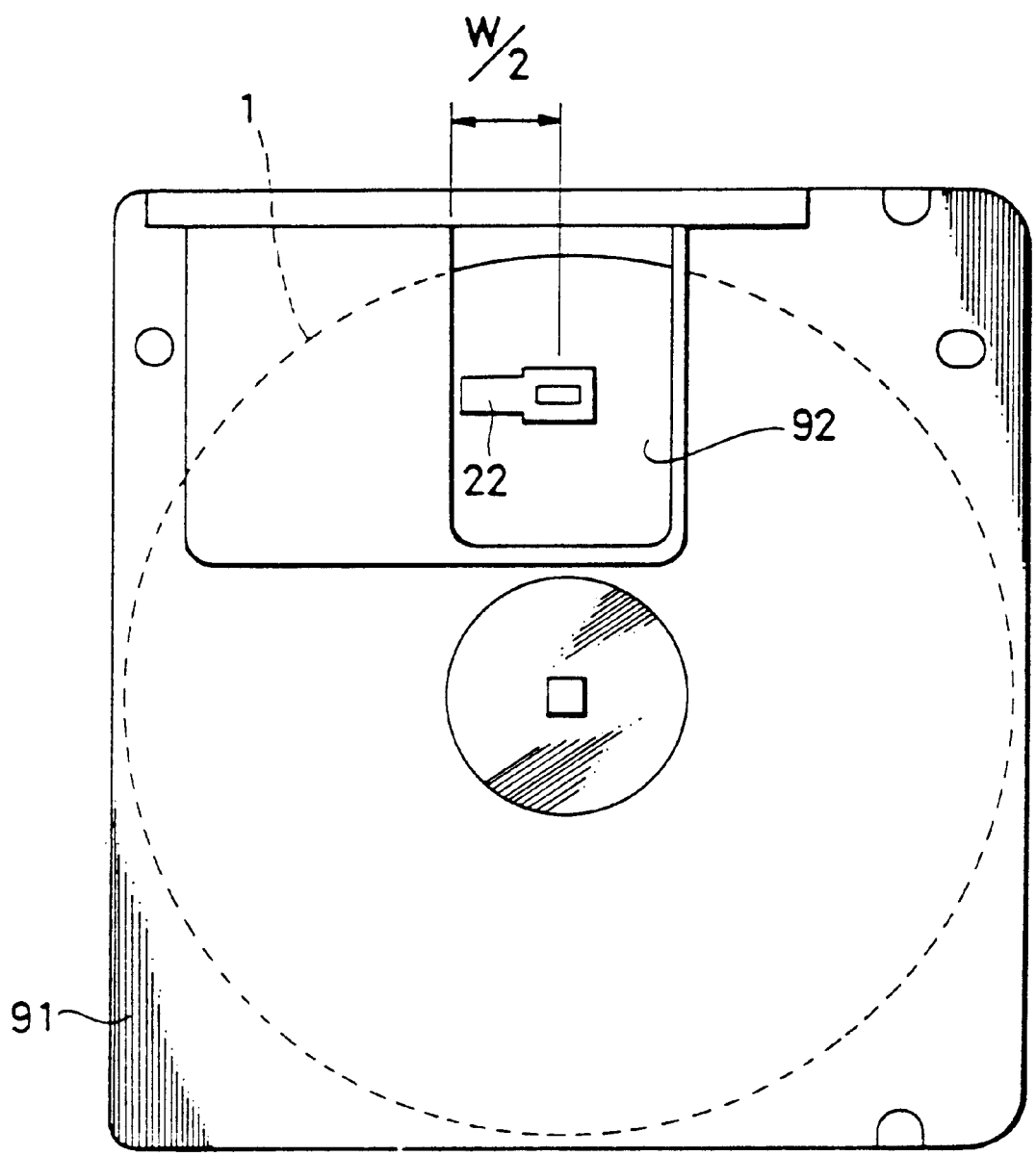
FIG. 18 is a plan view of a disk cartridge of a magnetooptical disk.
Figure 19:
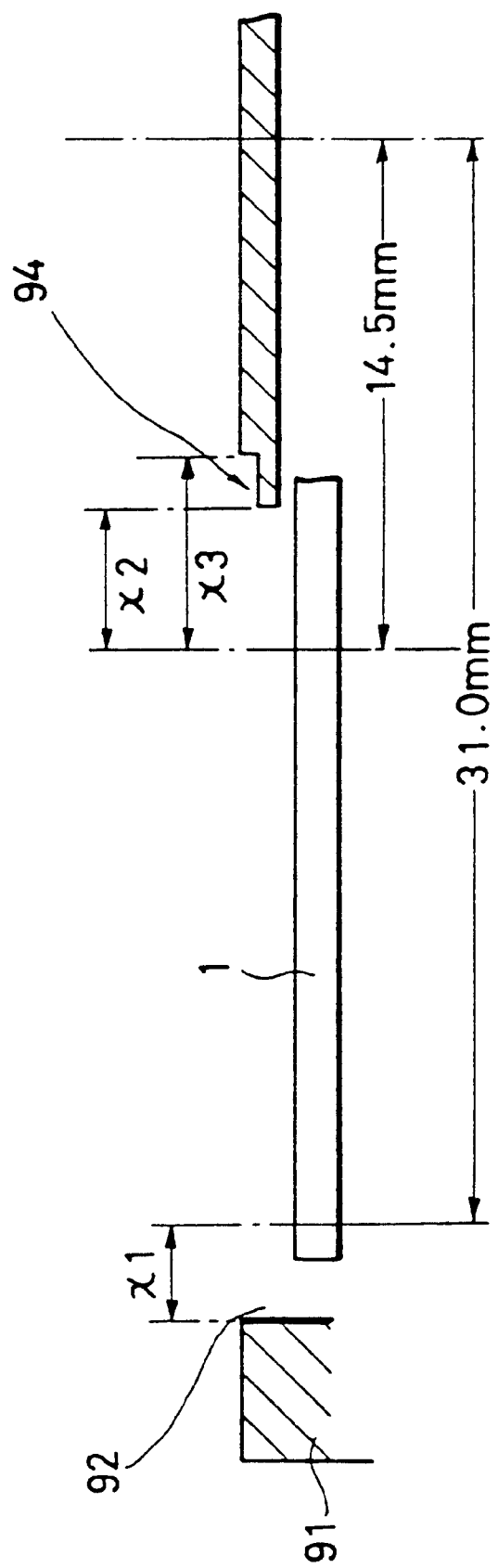
FIG. 19 is a fragmentary cross-sectional view of a window in the disk cartridge shown in FIG. 18.

As shown in FIG. 18, the dimension L is determined by half W/2 of the width of the window 92 of the disk cartridge 91, the dimension W/2 being not greater than 8.5 mm. Since the sliding sole 29 is located adjacent to the magnetic head element 27 along the direction in which the magnetic head runs with respect to the magnetooptical disk 1 as shown in FIG. 23, the dimension L is not smaller than 1.5 mm.

Shocks applied to the head body 22 due to obstacles on the magnetooptical disk 1 or frictional forces applied to the head body 22 upon rotation of the magnetooptical disk 1 have a component, commensurate with $\sin\theta_{10}$, acting perpendicularly to the longitudinal direction of the sliding contact region 101. This component $\sin\theta_{10}$, which is not preferable from the standpoint of attitude stability of the head body 22, becomes greater as the angle $\theta_{10}$ is larger.

Figure 26:
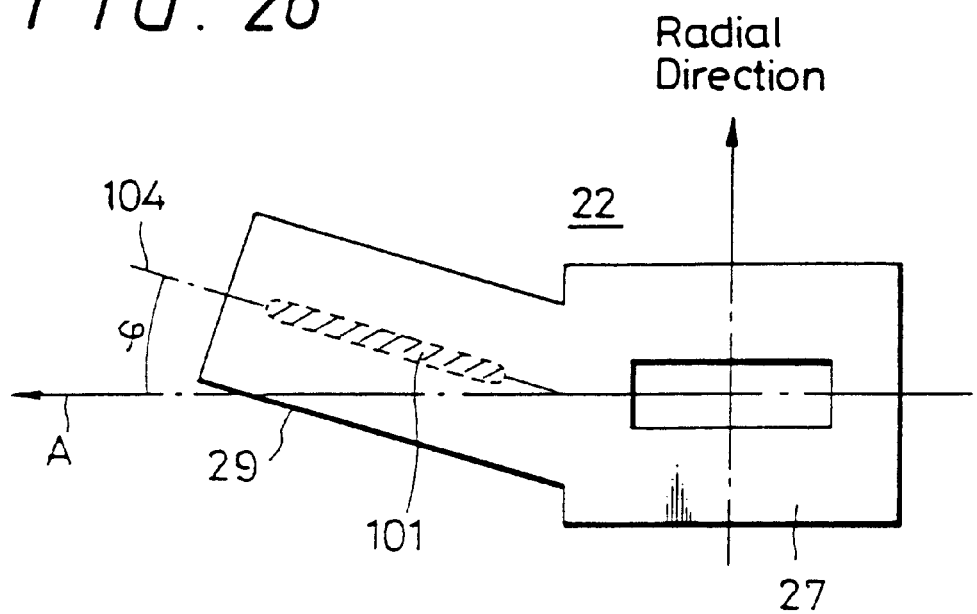
FIG. 26 is a schematic view of the head body of a sliding-type magnetic head according to yet another embodiment of the present invention.

FIG. 26 schematically shows the head body of a sliding-type magnetic head according to yet another embodiment of the present invention, which is designed to solve the above problem.

In FIG. 26, the head body, generally indicated by 22, has a sliding sole 29 for sliding contact with a magnetooptical disk 1, the sliding sole 29 being located adjacent to a magnetic head element 27 that is positioned on a radius of the magnetooptical disk 1 along the direction A in which the magnetic head runs with respect to the magnetooptical disk 1. The sliding sole 29 has a sliding contact region 101 held in linear contact with the magnetooptical disk 1 or in point contact therewith through a linear array of points. In this embodiment, the sliding contact region 101 is held in linear contact with the magnetooptical disk 1, and has its longitudinal direction aligned with the direction 104 in which the sliding contact region 101 slides on the magnetooptical disk 1 and angularly spaced an angle $\phi$ radially inwardly from the direction A in which the magnetic head runs with respect to the magnetooptical disk 1.

Figure 27:
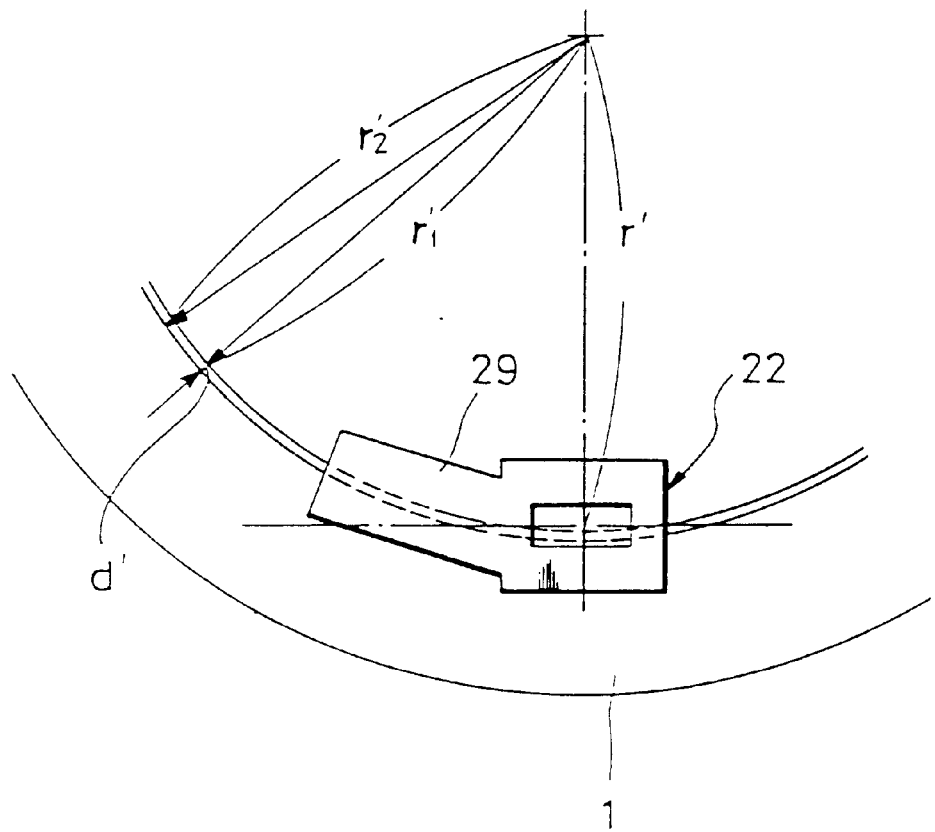
FIG. 27 is a schematic view showing the manner in which the magnetic head shown in FIG. 26 operates.

FIG. 27 shows a radial range d' in which the head body 22 slides on the magnetooptical disk 1 when the magnetic head element 27 is positioned on a radius r' of the magnetooptical disk 1. The radial range d' shown in FIG. 27 is smaller than the radial range d shown in FIG. 24. Therefore, study of FIG. 27 indicates that there is an angle $\phi$ through which the sliding contact region 101 can be inclined to the direction A for reducing the probability that the sliding sole 29 is affected by obstacles on the magnetooptical disk 1.

Inclining the sliding sole 29 into the direction 104 through the angle $\phi$ is equivalent to inclining the vertical axis of the graph of FIG. 25 in the positive direction through the angle $\phi$. Therefore, the component, perpendicular to the longitudinal direction of the sliding sole 29, of the shocks applied to the sliding sole 29 due to obstacles on the magnetooptical disk 1 or frictional forces applied to the sliding sole 29 upon rotation of the magnetooptical disk 1 is commensurate with $\sin(\theta_{10}-\phi)$. Thus, the force imposed perpendicularly to the longitudinal direction of the sliding sole 29 can be reduced by giving a suitable angle $\phi$ with respect to the angle $\theta_{10}$ which has a positive value at all times. This is effective to stabilize the attitude of the magnetic head.

If it is assumed that the radial range used of the magnetooptical disk extends radially from a radius r=16 mm to a radius r=31 mm, and the dimension L or W/2 from the center of the magnetic head element 27 to the sliding sole 29 ranges from 1.5 mm to 8.5 mm, then the angle $\phi$ ranges from 3° to 28° as can be seen from the hatched area in FIG. 25 or according to the equation $\theta_{10}=\tan^{-1}(L/r)$.

As described above, the probability that an obstacle on the magnetooptical disk 1 collides with the head body 22 can be lowered by inclining the sliding sole 29 into alignment with the direction 104 with respect to the magnetic head element 27.

Furthermore, since the component, perpendicular to the longitudinal direction of the sliding sole 29, of shocks applied to the head body 22 when it is hit by obstacles on the magnetooptical disk 1 can be reduced, the head body 22 can be stabilized in attitude while in sliding contact with the magnetooptical disk 1.

Reduction of the above component of shocks is effective in reducing forces tending to twist the head body 22, thereby minimizing any positional displacement of the magnetic head element 27.

Figure 28:
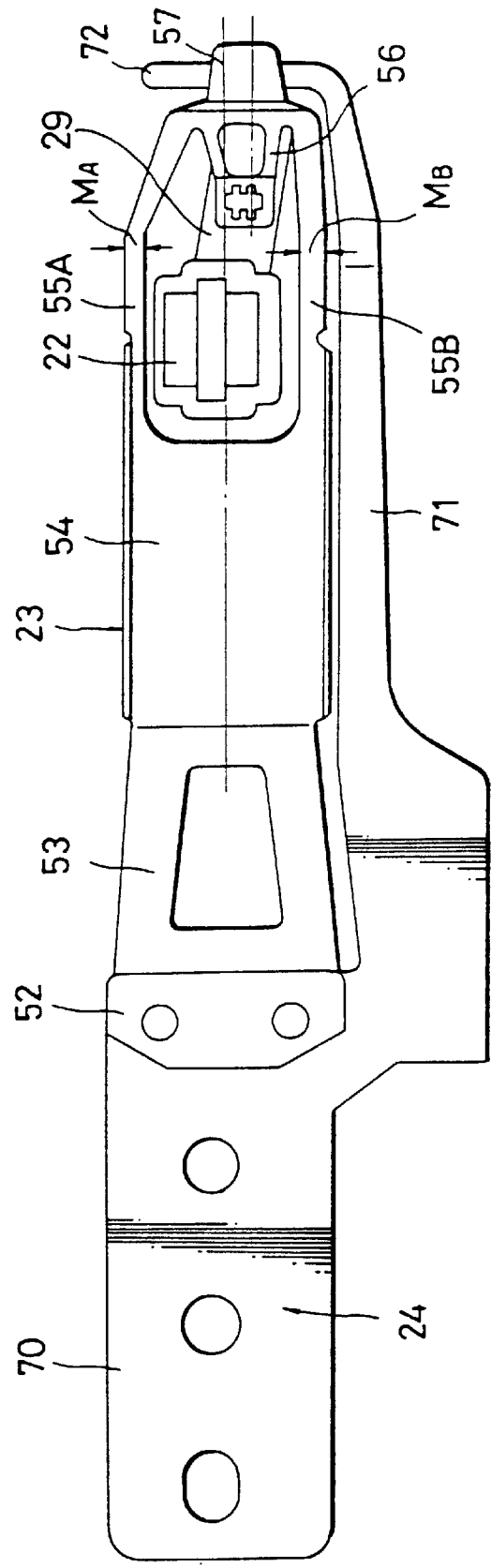
FIG. 28 is a plan view of a sliding-type magnetic head according to yet still another embodiment of the present invention.
Figure 29:
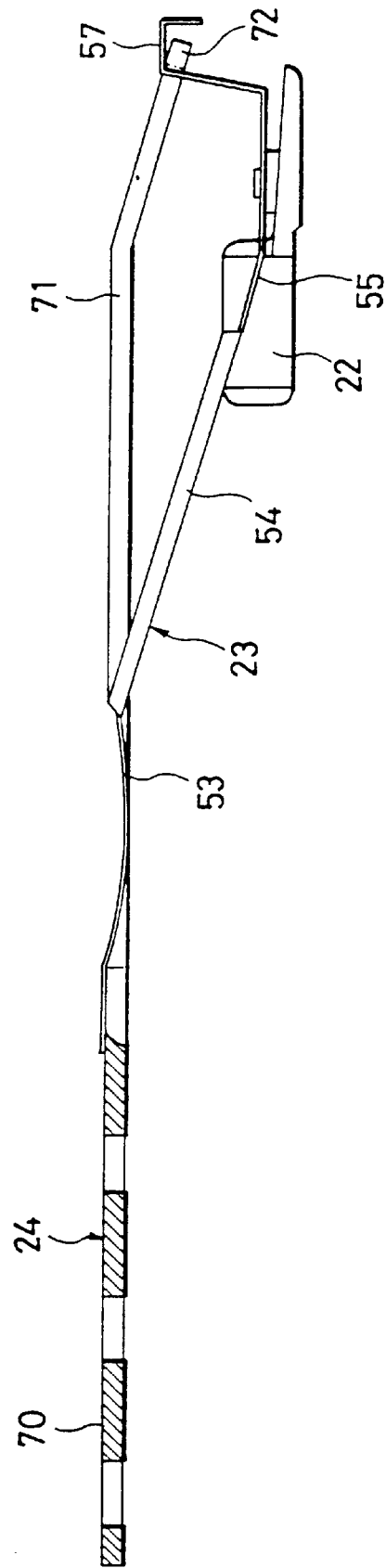
FIG. 29 is a side elevational view of the sliding-type magnetic head shown in FIG. 28.

FIGS. 28 and 29 show a sliding-type magnetic head according to yet still another embodiment of the present invention.

The magnetic head shown in FIGS. 28 and 29 has a head body 22 including a sliding sole 29 that is inclined into alignment with a direction in which it actually slides on a magnetooptical disk, with respect to a magnetic head element 27.

Figure 30A:
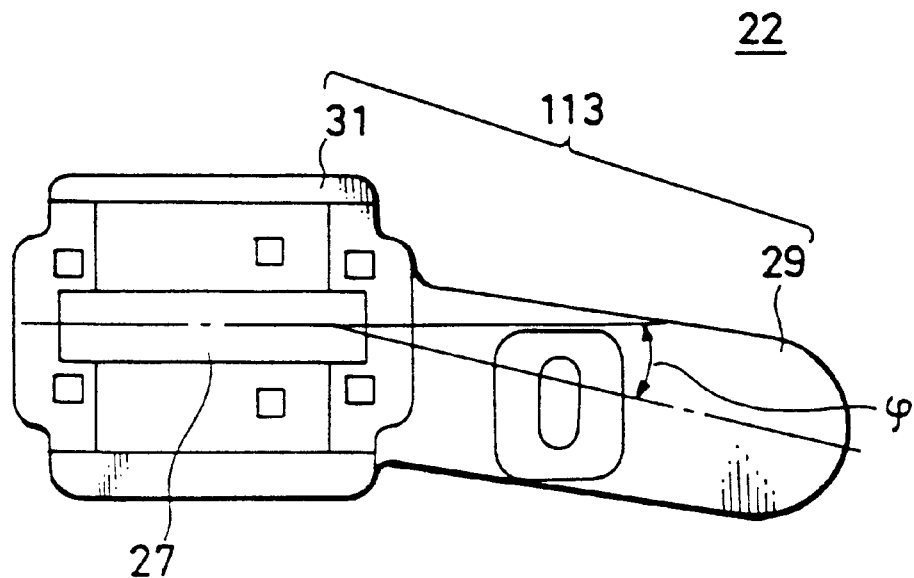
FIG. 30A is a plan view of a head body of the magnetic head shown in FIG. 28.
Figure 30B:
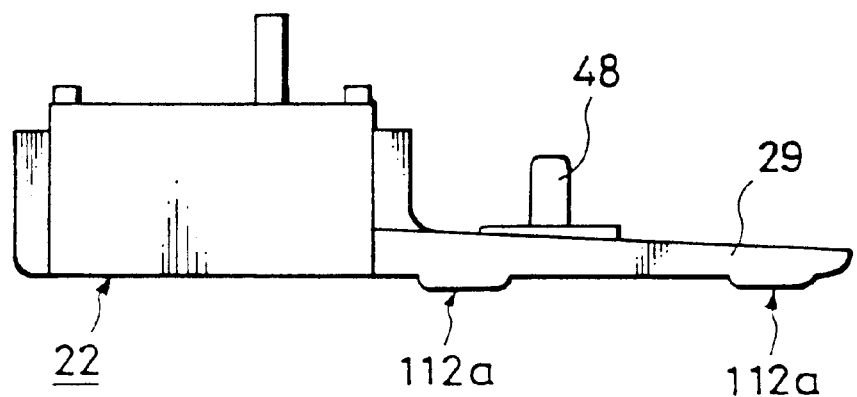
FIG. 30B is a side elevational view of the head body shown in FIG. 30A.

FIGS. 30A and 30B show in detail the head body 22 of the magnetic head shown in FIGS. 28 and 29. The head body 20 comprises a slider 113 including a mount 31 with a magnetic head element 27 mounted thereon and a sliding sole 29 disposed on one side of the mount 31 and inclined an angle $\phi$ with respect thereto. The magnetic head element 27 mounted in the mount 31 comprises a substantially E-shaped magnetic core of ferrite with a coil wound around the central magnetic core thereof.

The sliding sole 29 has a pair of longitudinally spaced lower contact surfaces or lands 112a positioned on respective opposite longitudinal ends for sliding contact with the magnetooptical disk 1. Therefore, the sliding sole 29 is held in point contact with the magnetooptical disk 1 through a plurality of points. The lower surface of the sliding sole 29 between the contact surfaces 112a comprises an upwardly concave flat surface. Each of the contact surfaces 112a may be a cylindrical surface, a spherical surface, or the like.

As illustrated in FIGS. 28 and 29, the magnetic head comprises the head body 22, a thin leaf spring 23 for pressing a sliding sole 29 thereof against the disk surface, and a support member 24 to which the leaf spring 23 is attached. The leaf spring 23 has one end fixedly joined to the support member 24, and the head body 22 is mounted on the other end of the support member 24.

The leaf spring 23 and the support member 24 are identical in structure to those shown in FIGS. 3 and 4.

The support member 24 has an attachment base 70 to which a joint 52 of the leaf spring 23 is to be attached, an arm 71 extending from one side of the attachment base 70 in an asymmetrical fashion, and a stop 72 integrally extending perpendicularly from the distal end of the arm 71 in spaced confronting relationship to the attachment base 70.

The leaf spring 23 comprises a first spring system 53, an inclined portion 54 extending from the first spring system 53 and having ribs, a second spring system 55 extending from the inclined portion 54, a third spring system 56 extending from the second spring system 55 back toward the joint 52, and a locking hook bent upwardly at a substantially right angle from the distal end of the second spring system 55. The head body 22 is fused to the third spring system 56 through its attachment 48. The locking hook has a hook end 57 engaging the stop 72 such that the leaf spring 23 is pre-charged.

Figure 31:
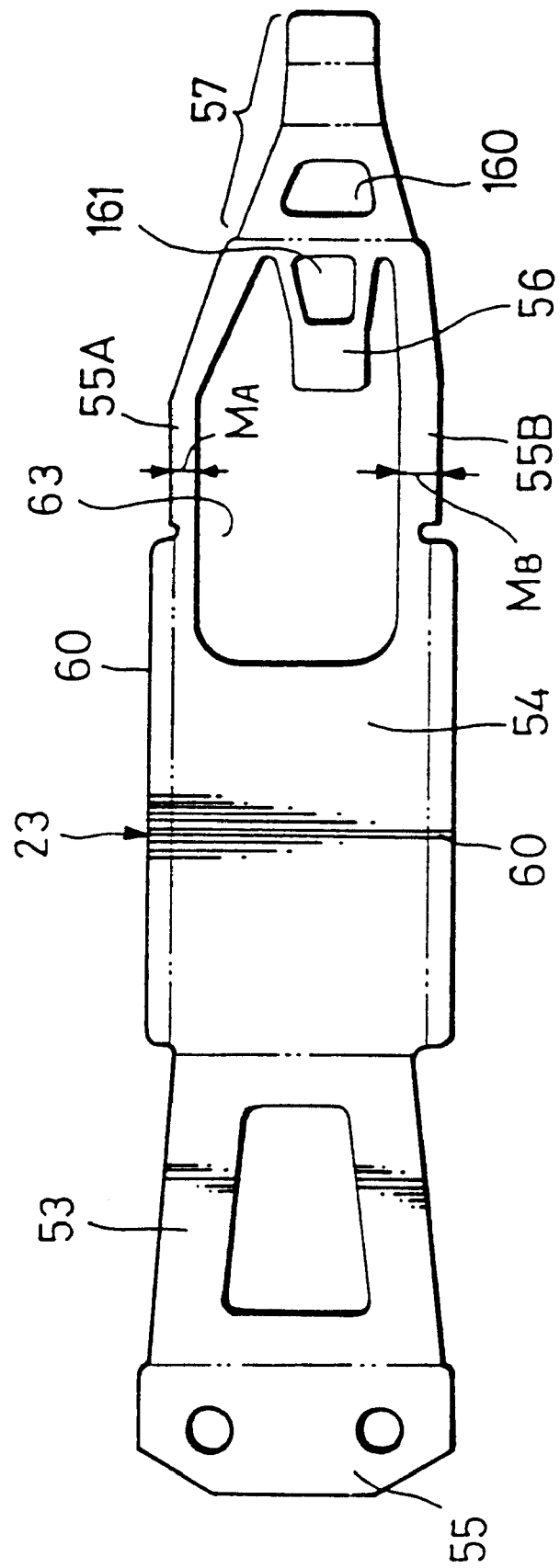
FIG. 31 is a plan view of a blank form of a leaf spring of the magnetic head shown in FIG. 28.

FIG. 31 shows a blank form of the leaf spring 23 in a developed manner. The blank is bent at positioned indicated by chain lines into the leaf spring 23, which has openings 63, 160 defined therein.

The sliding sole 29 of the head body 22 is inclined an angle $\phi$ with respect to the magnetic head element 27. In order to accommodate the head body 22 in the opening or space 63, the sliding sole 29 is positionally displaced from the center of the leaf spring 23 toward the arm 71 as shown in FIG. 28. Therefore, when the sliding sole 29 is in contact with the disk surface, the force applied to a springy arm 55B of the second spring system 55 which is closer to the sliding sole 29 is stronger than the force applied to a springy arm 55A thereof. As a result, the springy arms 55A, 55B would be out of balance or equilibrium, causing the head body 22 to be tilted or otherwise displaced.

To avoid the above shortcoming, the springy arms 55A, 55B have different widths $M_A$, $M_B$, respectively. Specifically, the width $M_B$ of the springy arm 55B that is positioned radially inwardly with respect to the magnetooptical disk is greater than the width $M_A$ of the springy arm 55A that is positioned radially outwardly with respect to the magnetooptical disk. When the sliding sole 29 is in contact with the disk surface, the spring forces exerted by the springy arms 55A, 55B are held in equilibrium, thus allowing the head body 22 to slidingly contact the magnetooptical disk 1 in a stable attitude.

Figure 32:
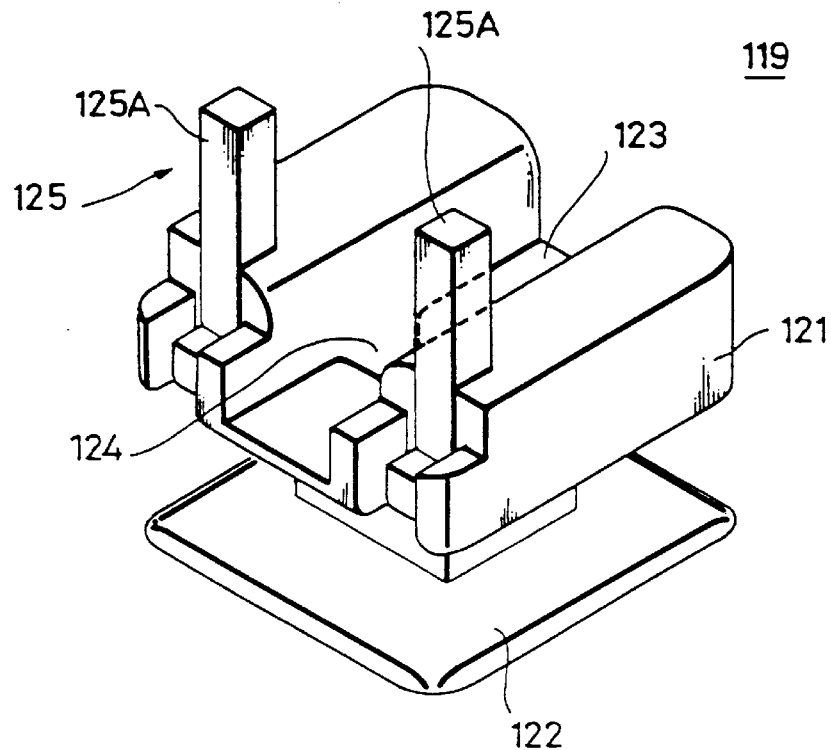
FIGS. 32 and 33 are perspective views of coil bobbins according to other embodiments of the present invention.
Figure 33:
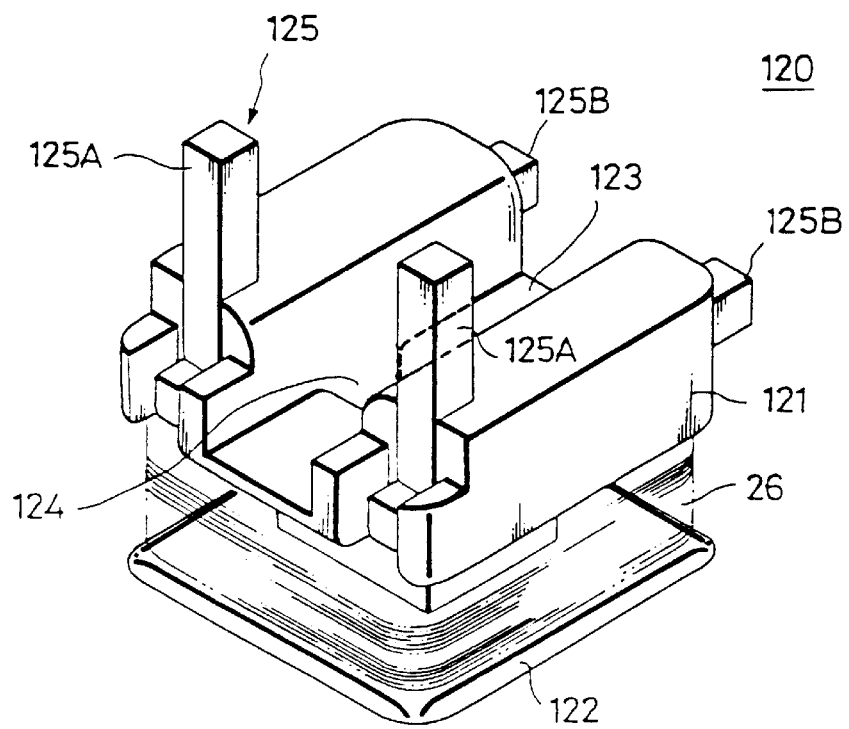

FIGS. 32 and 33 show coil bobbins according to other embodiments of the present invention. In FIG. 32, a coil bobbin 119 has a base 121, a flange 122 connected thereto, and a coil 26 wound between the base 121 and the flange 122. The base 121 has a groove 123 for receiving a substantially E-shaped ferrite core and a central hole 124 for receiving a central core thereof. A pair of L-shaped terminal pins 125A, 125B is mounted on one side of the base 121. Similarly, a coil bobbin 120 shown in FIG. 33 also has a base 121, a flange 122 connected thereto, and a coil 26 wound between the base 121 and the flange 122. The base 121 has a groove 123 for receiving a substantially E-shaped ferrite core and a central hole 124 for receiving a central core thereof. A pair of L-shaped terminal pins 125 is mounted in the base 121.

In FIG. 32, coil terminals are wound around and soldered to respective ends 125A of the terminal pins 125 which project from one side of the base 121, and a flexible wire cable is also soldered to the ends 125A.

In FIG. 33, the terminal pins 125 have respective ends 125A which project from one side of the base 121 and opposite ends 125B projecting from an opposite side of the base 121. Coil terminals are wound around and soldered to the respective ends 125B, and a flexible wire cable is soldered to the ends 125A of the terminal pins 125. Since the coil terminals and the flexible wire cable are soldered at different positions, the solder on the coil terminals does not run when the flexible wire cable is soldered. Therefore, the soldering process is more reliable.

In the magnetic head 21 shown in FIGS. 3 and 4, the locking hook is bent upwardly from the distal end of the second spring system 55 of the leaf spring 23, and has a hook end 57 bent outwardly at a substantially right angle or a similar angle. The hook end 57 engages the stop 72 to lock the leaf spring 23 on the support member 24.

Figure 34:
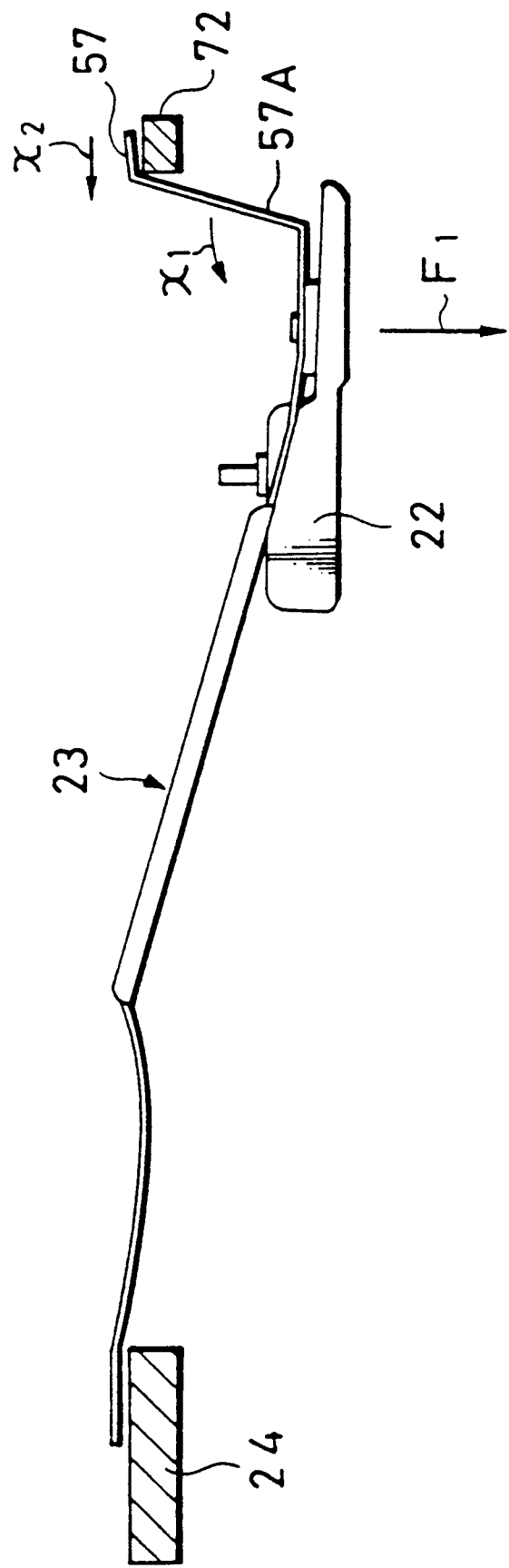
FIG. 34 is a side elevational view illustrative of the condition of the magnetic head when it is subjected to an external shock.

As shown in FIG. 34, when a stroke external shock or external force $F_1$) is applied to the magnetic head 21 shown in FIGS. 3 and 4, the head body 22 and the third spring system 56 supporting the head body 22 are displaced downwardly, causing the second spring system 55 and a bent extension 57A extending therefrom are largely curved in the direction indicated by the arrow $x_1$. The hook end 57 then slides on the stop 72 in the direction indicated by the arrow $x_2$ until it finally disengages from the stop 72.

Once the hood end 57 disengages from the stop 72, the head body 22 dangles downwardly. In use, since the head body 22 is placed in the window 92 of the disk cartridge 91, when the hook end 57 disengages from the stop 72, it is impossible to lift the head body 22 out of the window 92 upon ejecting the disk cartridge. If the disk cartridge is forcibly ejected, it will damage the magnetic head.

Figure 35:
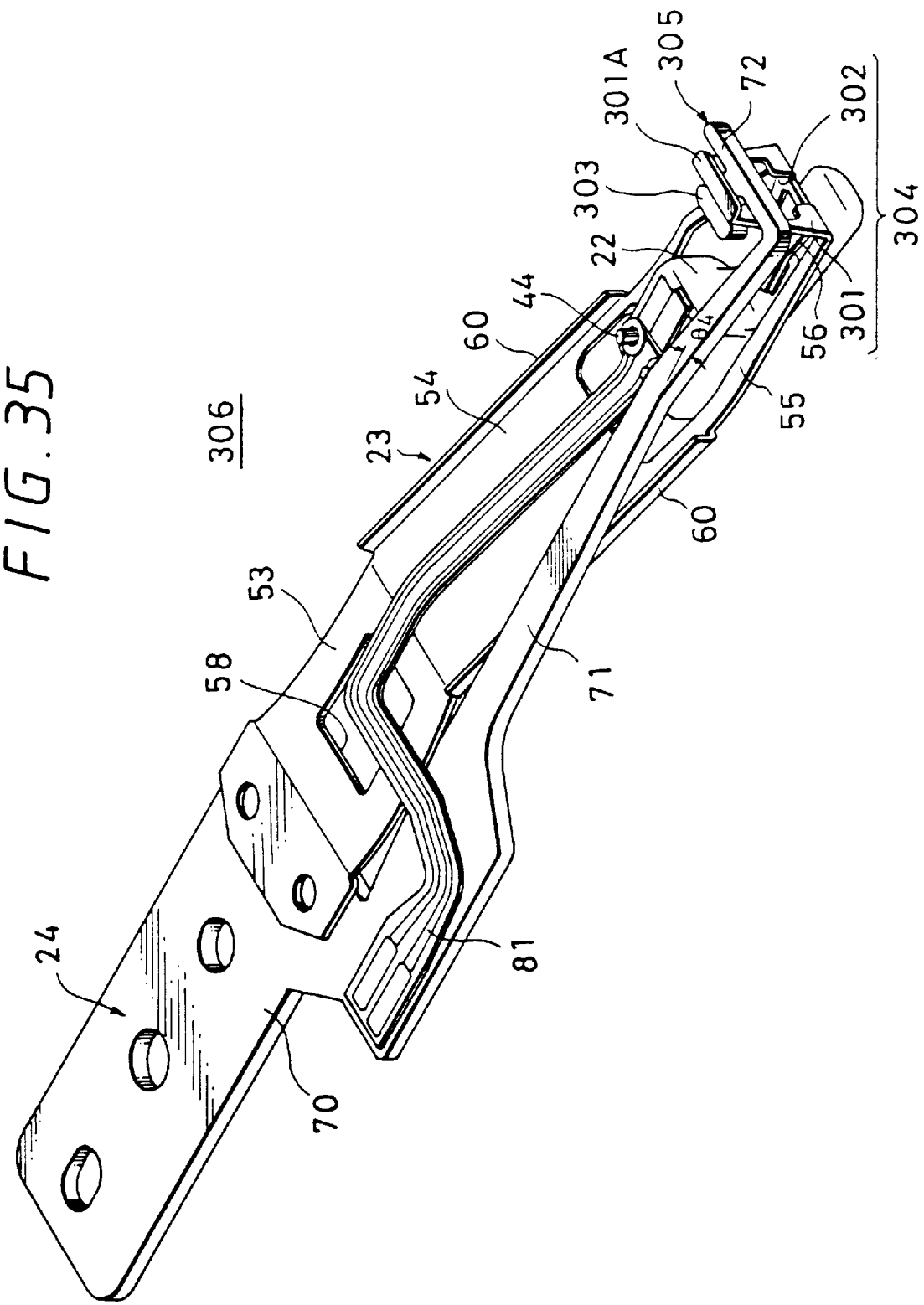
FIG. 35 is a perspective view of a sliding-type magnetic head according to a further embodiment of the present invention.
Figure 36:
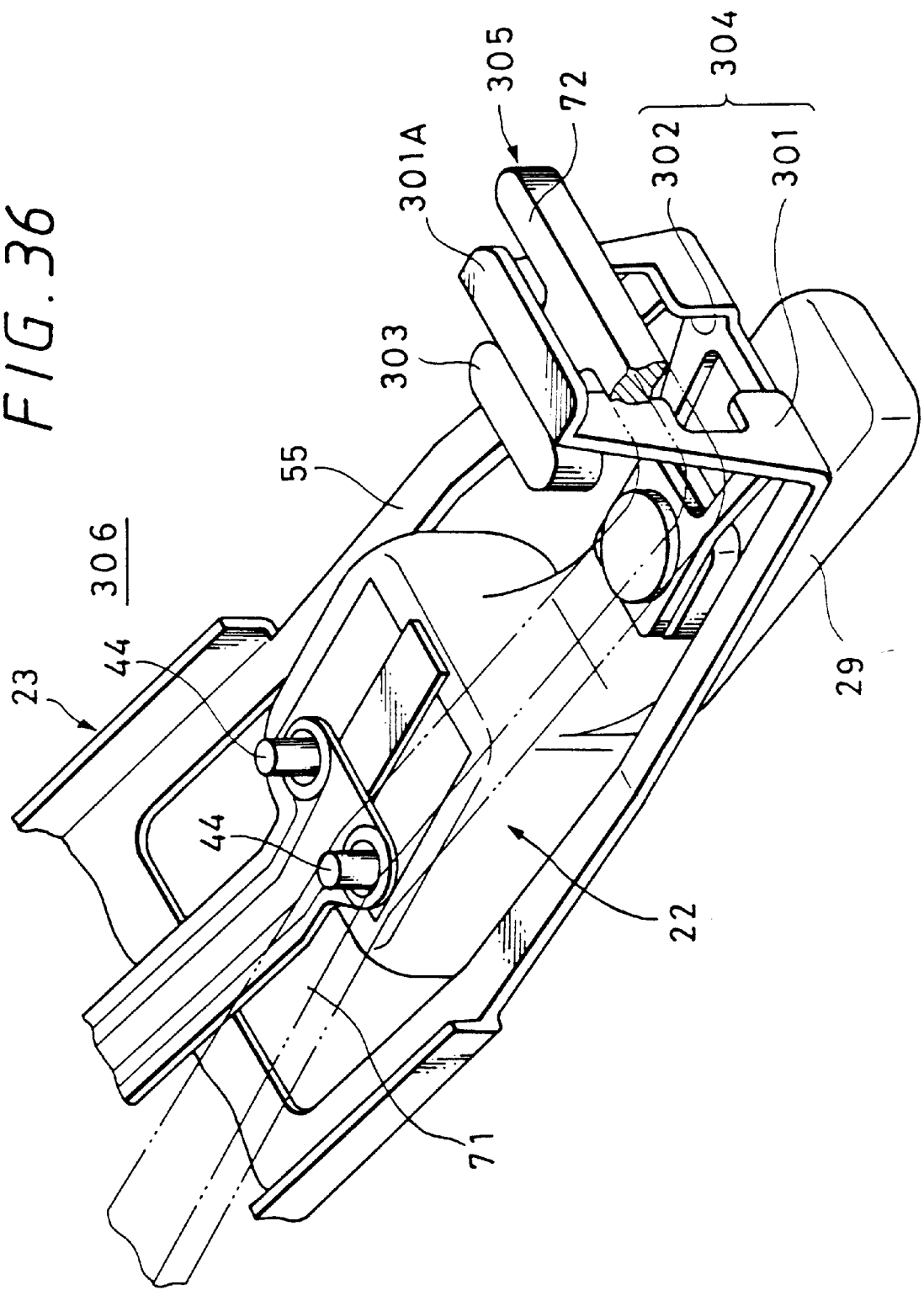
FIG. 36 is an enlarged fragmentary perspective view of the magnetic head shown in FIG. 35.

FIGS. 35 and 36 show a sliding-type magnetic head 306 according to a further embodiment of the present invention.

As shown in FIGS. 35 and 36, a bent extension 301 extends upwardly at a substantially right angle or a similar angle from the distal end of a second spring system 55 of a leaf spring 23. The bent extension 301 has a crisscross hole 302 (see FIG. 38A) composed of a vertically elongate hole 302A and a horizontally elongate hole 302B. The bent extension 301 has a hook end 301A bent outwardly at a substantially right angle or a similar angle from the upper end of thereof, the hook end 301A serving to reinforce the bent extension 301.

Figure 37:
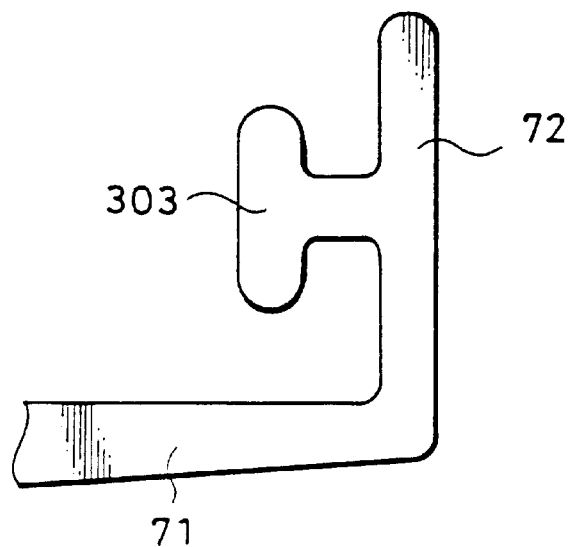
FIG. 37 is a fragmentary plan view of a stop and a T-shaped member of the magnetic head shown in FIG. 35.

A stop 72 bent perpendicularly from the distal end of an arm 71 that extends from the support member 24 has a T-shaped member 303 (see FIG. 37) on an inner surface thereof which faces the attachment base 70. The T-shaped member 303 is inserted through the crisscross hole 302 in the bent extension 301, and engaged by an upper edge of the hole 302.

The other structural details of the magnetic head 306 are identical to those of the magnetic heads according to the previous embodiments, and denoted by identical reference numerals. More specifically, the leaf spring 23 comprises a joint 52 to be attached to the support member 24, a first spring system 53, an inclined portion 54 having ribs, a second spring system 55, a third spring system 56 extending from the second spring system 55 back toward the joint 52. A locking hook 304 composed of the bent extension 301 with the crisscross hole 302 is formed on the distal end of the second spring system 55.

The support member 24 has an attachment base 70 to which the joint 52 of the leaf spring 23 is to be attached, and a stopper 305 extending from one side of the attachment base 70 in an asymmetrical fashion. More specifically, the support member 24 includes an arm 71 extending from one side of the attachment base 70, which is a radially inner side with respect to the magnetooptical disk 1, and inclined at an angle $\theta_4$ from the position corresponding to the second spring system 55 over a length up to the locking hook 304 of the leaf spring 23, a stop 72 bent at a right angle from the distal end of the arm 71 in confronting relationship to the attachment base 70, and the T-shaped member 303 integrally formed with the inner surface of the stop 72. The arm 71, the stop 72, and the T-shaped member 303 jointly make up the stopper 305.

As with the embodiment shown in FIG. 26, the sliding sole 29 is inclined radially inwardly an angle $\phi$ into alignment with the direction in which the sliding sole 29 actually slides on the magnetooptical disk 1, with respect to the direction in which the magnetic head element runs with respect to the magnetooptical disk 1.

A flexible wire cable 81 extends from the support member 24 on and along leaf spring 23, and is connected to terminal pins 44 of the head body 22.

Figures 38A, 38B:
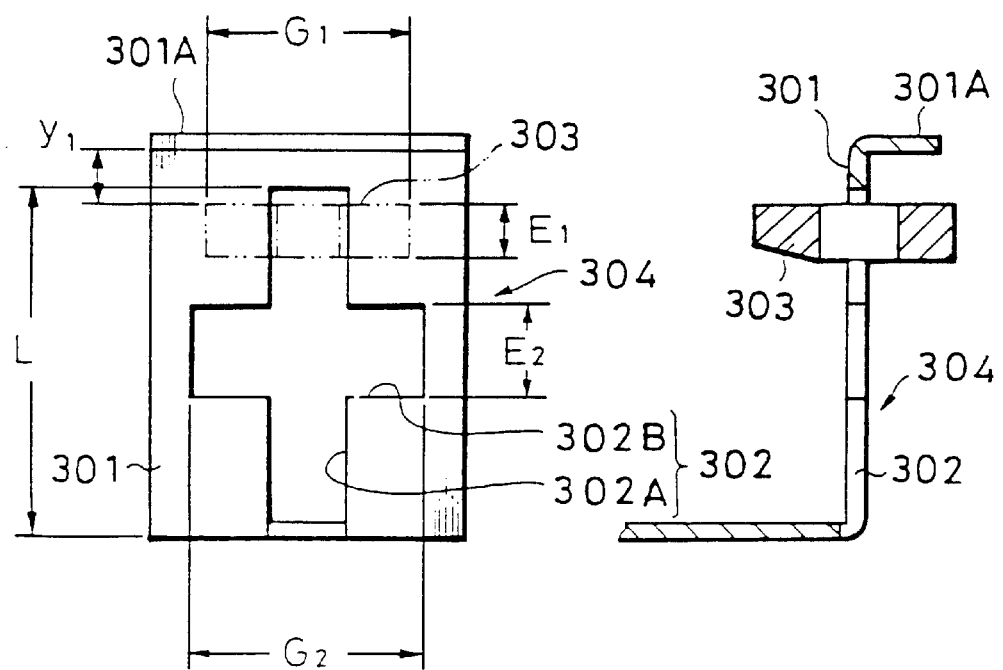
FIG. 38A is a front elevational view of a locking hook of the magnetic head shown in FIG. 35.
FIG. 38B is a cross-sectional view of the locking hook shown in FIG. 38A.

As shown in FIG. 38A, the vertical length L of the vertical hole 302A of the crisscross hole 302 is selected in view of the thickness $E_1$ of the T-shaped member 303, an allowable range of surface displacements of the magnetooptical disk 1, an assembling tolerance of the head body and a magnetooptical disk recording and reproducing apparatus incorporating the magnetic head, and a tolerance of their parts, such that the sliding sole 29 of the head body 22 can follow surface displacements of the magnetooptical disk 1 in any case.

The horizontal hole 302B of the crisscross hole 302 has a horizontal width $G_2$ which is larger than the horizontal width $G_1$ of the T-shaped member 303 and a vertical length $E_2$ which is larger than the thickness $E_1$ of the T-shaped member 303.

If the vertical length $E_2$ were excessively larger than the thickness $E_1$, then the T-shaped member 303 would easily be displaced out of the crisscross hole 302. Therefore, the vertical length $E_2$ should preferably be slightly larger than the thickness $E_1$.

When the T-shaped member 303 is inserted into the crisscross hole 302 as shown in FIG. 38B, the bent extension 301 is sandwiched between the T-shaped member 303 and the stop 72. Therefore, even when subjected to a strong external shock or force $F_1$ as shown in FIG. 34, the bent extension 301 is prevented from disengaging from the stop 72 because it abuts against the T-shaped member 303. Upon ejection of the disk cartridge 91, the magnetic head 306 can safely be lifted out of the disk cartridge window without getting damaged.

As shown in FIG. 38A, the upper edge of the hole 302 is spaced downwardly from the bent hook end 301A by a distance $y_1$. The locked position of the leaf spring 23 is determined by the upper edge of the hole 302, resulting in high accuracy of the vertical distance from the head body 22 to the T-shaped member 303.

Figure 39:
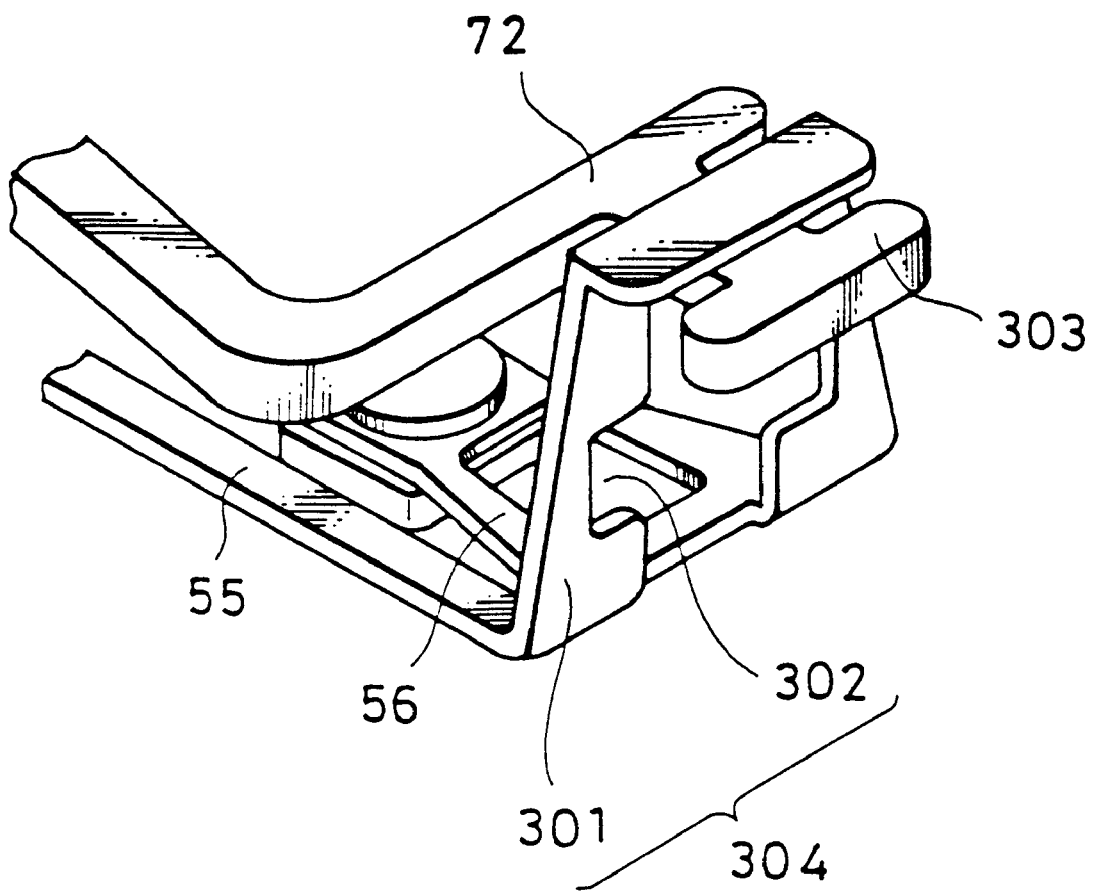
FIG. 39 is a fragmentary perspective view of another locking structure.

In the embodiment shown in FIG. 36, the T-shaped member 303 is formed on the inner surface of the stop 72. However, as shown in FIG. 39, a T-shaped member 303 may be formed on an outer surface of the stop 72 remote from the attachment base 70, and may be inserted in the crisscross hole 302 in the leaf spring 23. In FIG. 39, the locking hook 304 of the leaf spring 23 is also effectively prevented from coming off the stop 72 by the T-shaped member 303 even when subjected to external shocks.

Figure 49:
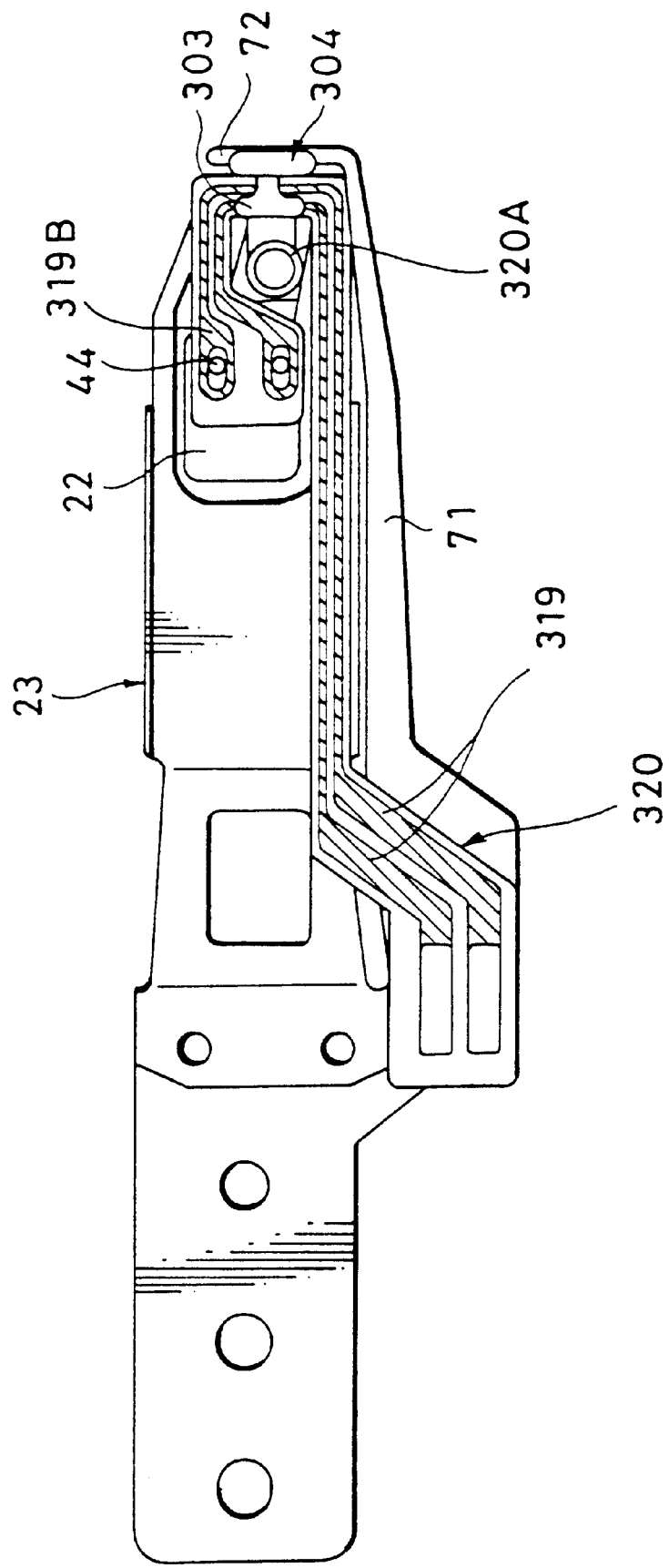
FIG. 49 is a plan view of a sliding-type magnetic head according to a yet further embodiment of the present invention.

In FIG. 49, a flexible wire cable 320 comprises a pair of wires 319 extending from a support member 24 on and along one side of a leaf spring 23. The flexible wire cable 320 is folded back around the distal end of a second spring system 55 and has a cable end 320A fixed to an attachment 48 of a head body 22. The wires 319 have respective wire terminals 319B extending from a side of the fixed cable end 320A and connected to the respective terminal pins 44 of the head body 22. In the arrangement shown in FIG. 49, a T-shaped member 303 is formed on the inner surface of a stop 72 to facilitate the attachment of the flexible wire cable 320. With the flexible wire cable 320 used, since no undue forces due to the rigidity thereof are applied to the head body 22, the head body 22 is allowed to operate stably.

In the embodiments shown in FIGS. 35 and 39, the locking hook 304 has the crisscross hole 302 for receiving the T-shaped member 303. However, as shown in FIG. 40A, a locking hook 304 may have a T-shaped hole 308 for receiving a T-shaped member 303, or as shown in FIG. 40B, a locking hook 304 may have a crisscross hole 309 for receiving a T-shaped member 303. The T-shaped hole 308 shown in FIG. 40A is better than the crisscross hole 309 shown in FIG. 40B in preventing the T-shaped member 303 from being dislodged from the locking hook 304. Alternatively, a locking hook 304 may have a T-shaped hole 322 as shown in FIG. 41.

When the T-shaped member 303 is positioned in the horizontal hole 302B of the crisscross hole 302 at the time the magnetic head undergoes an external shock, the locking hook 304 may disengage from the T-shaped member 303.

Figure 42:
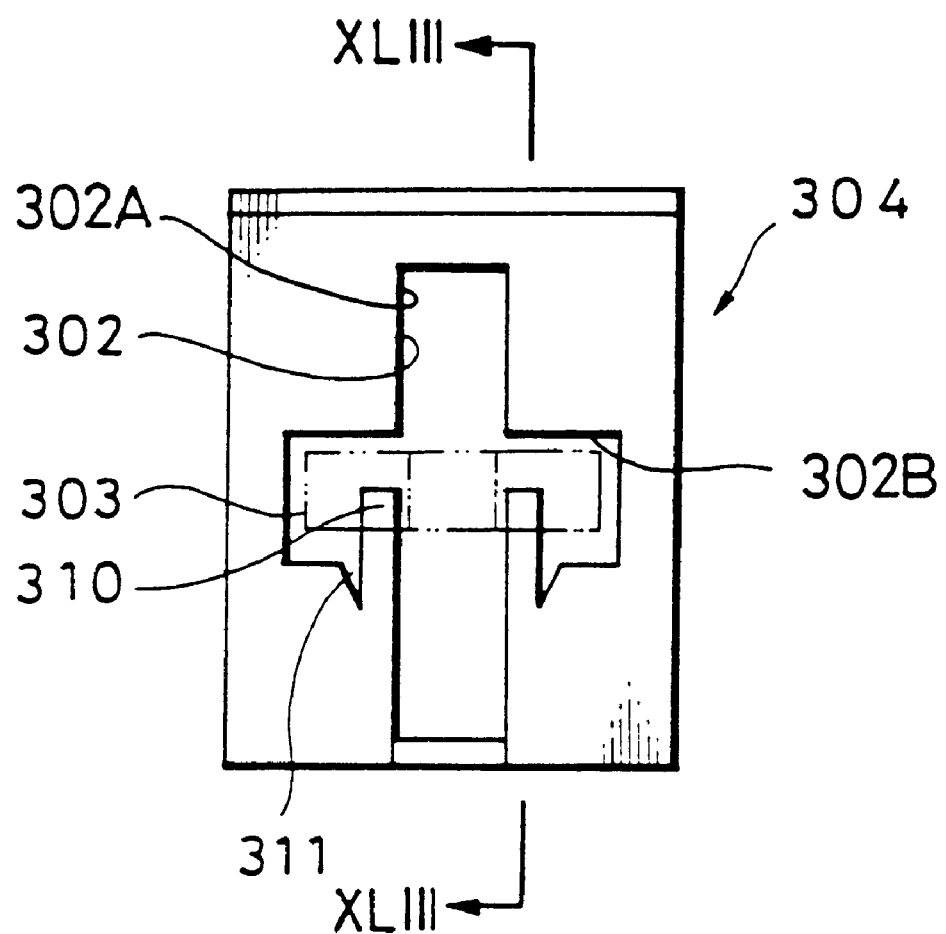
FIG. 42 is a front elevational view of still another locking structure.
Figure 43A:
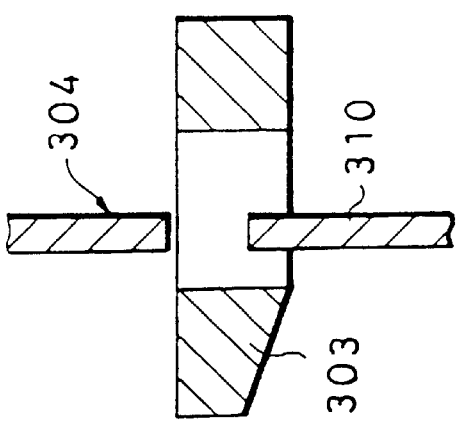
FIGS. 43A, 43B, and 43C are cross-sectional views taken along line XLIII—XLIII of FIG. 42, showing the manner in which the locking structure shown in FIG. 42 operates.
Figure 43B:
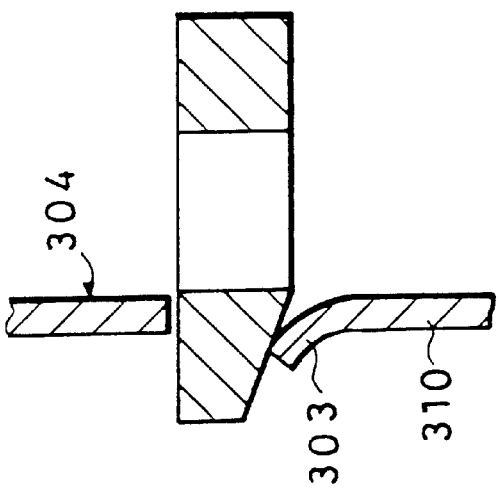
Figure 43C:
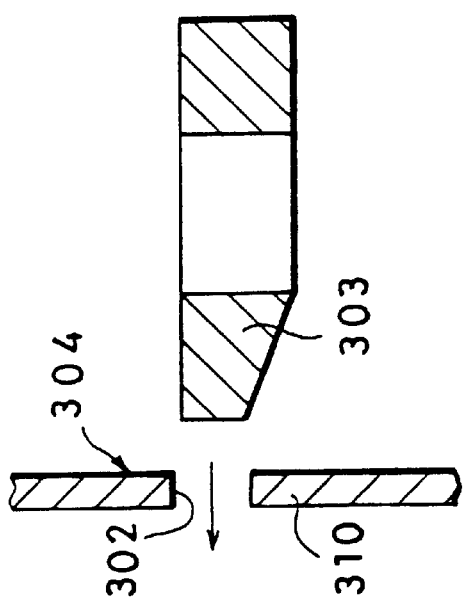

Such a problem can be solved by a locking structure shown in FIG. 42. In FIG. 42, a locking hook 304 of a leaf spring 23 has a crisscross hole 302 and a pair of laterally fingers 310 projecting from a lower edge of a horizontal hole 302B of the crisscross hole 302 upwardly into the horizontal hole 302B. The fingers 310 are positioned one on each side of a vertical hole 302A of the crisscross hole 302. When a T-shaped member 303 is inserted from a position shown in FIG. 43A into the horizontal hole 302B, the fingers 310 are resiliently curved by the T-shaped member 303 as shown in FIG. 43B. After the T-shaped member 303 is fully inserted in the horizontal hole 302B, the fingers 310 spring back to their original upright position as shown in FIG. 43C. To reduce the extent of projection of the fingers 310 into the horizontal hole 302B and make the fingers 310 resilient, the locking hook 304 has a pair of notches 311 defined alongside of the lower ends of the fingers 310 as shown in FIG. 42. The fingers 310 may be positioned in another location in the horizontal hole 302B. As shown in FIG. 43A, the T-shaped member 303 has a tapered leading end for easy insertion into the horizontal hole 302B.

After the T-shaped member 303 is fully inserted into the crisscross hole 302, the fingers 310 are resiliently moved back into the horizontal hole 302B, thus preventing the T-shaped member 303 from being displaced out of the crisscross hole 302 even when the T-shaped member 303 is aligned with the horizontal hole 302B and subjected to external shocks.

Figure 44:
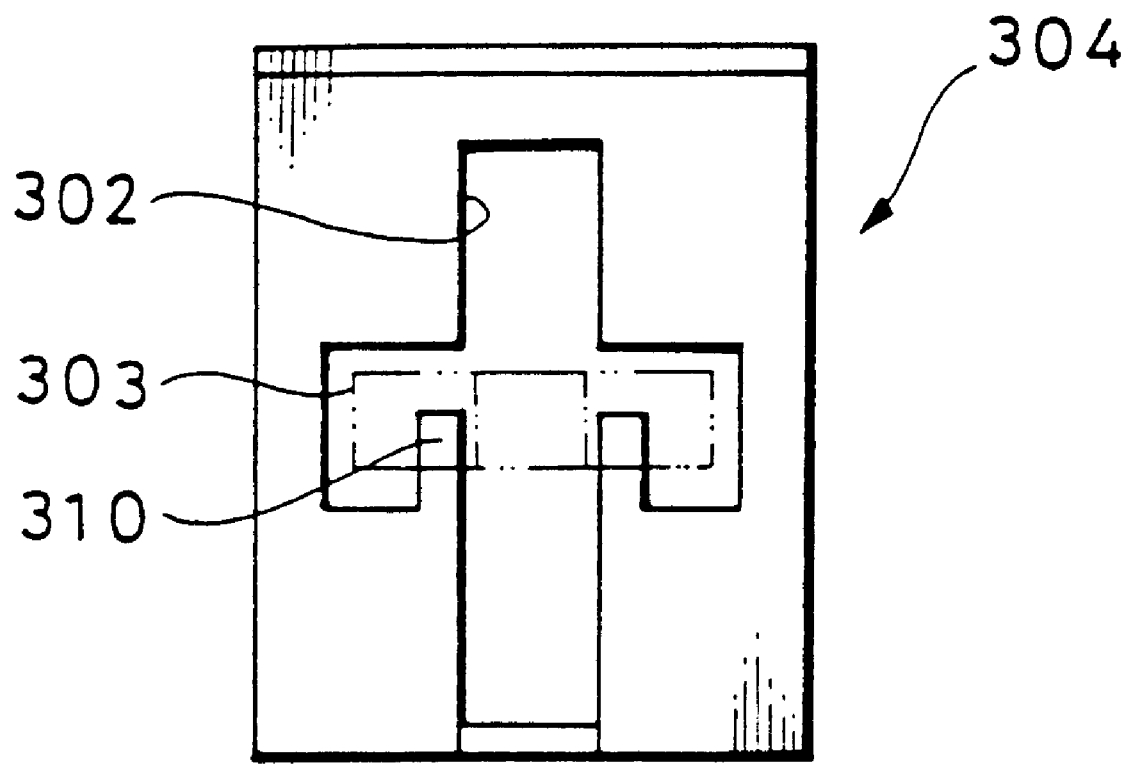
FIG. 44 is a front elevational view of yet another locking structure.

FIG. 44 shows yet still another locking structure which is a modification of the locking structure shown in FIG. 42. In FIG. 44, no notches are defined alongside of lower ends of fingers 310 which project into a criss-cross hole 302.

Figure 45:
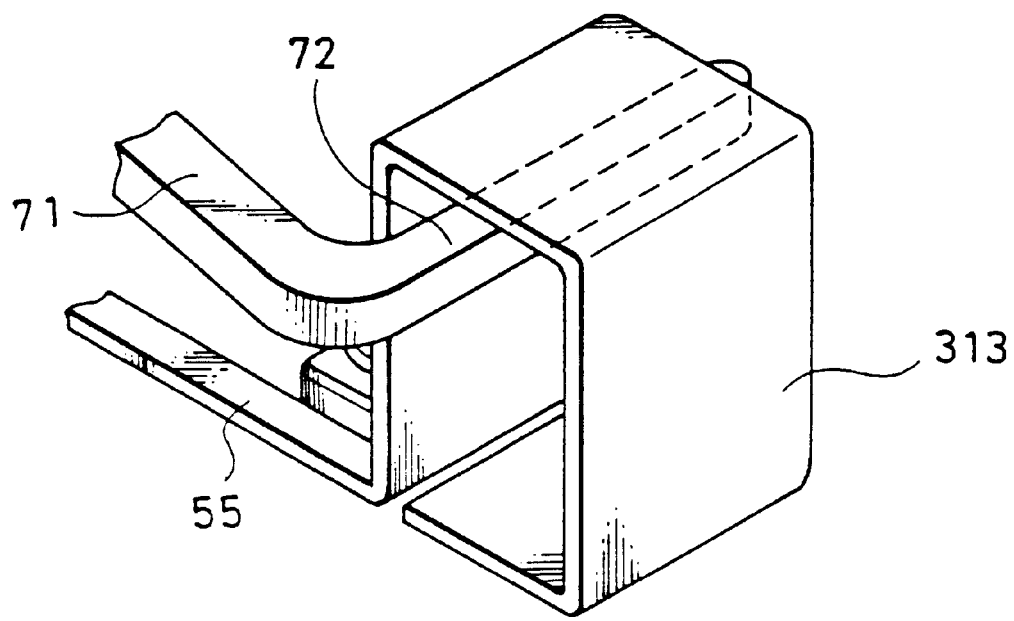
FIG. 45 is a perspective view of a further locking structure.

A further locking structure shown in FIG. 45 has a tubular locking hook 313 bent upwardly at a substantially right angle or a similar angle from the distal end of a second spring system 55 of a leaf spring 23 and folded back in surrounding relationship to a stop 72. The stop 72 has no T-shaped member. The stop 72 is inserted in the tubular locking hook 313 in engagement therewith.

The locking hook 313 is prevented from being dislodged from the stop 72 when subjected to external shocks irrespective of the position of the stop 72 within the locking hook 313.

Figure 46:
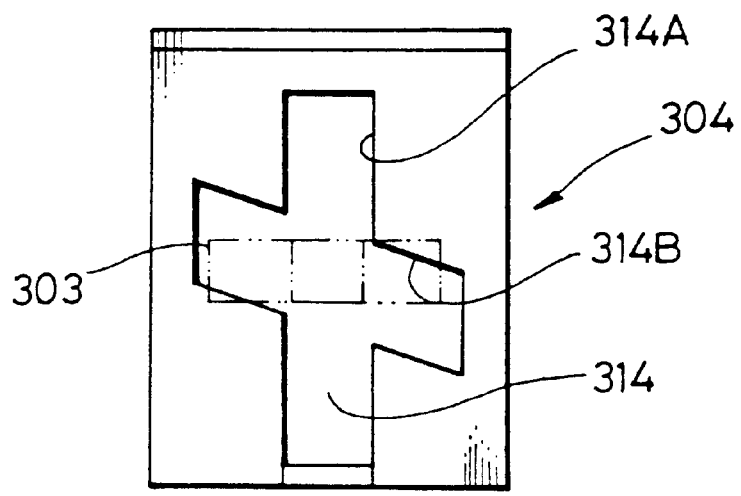
FIG. 46 is a front elevational view of a still further locking structure.

FIG. 46 shows a still further locking structure. In FIG. 46, a locking hook 304 has a modified crisscross hole 314 including a hole 314B that is inclined from the horizontal direction with respect to a vertical hole 314A. When a T-shaped member 303 is to be inserted into the crisscross hole 314, the locking hook 304 is resiliently deformed to allow the T-shaped member 303 to be easily inserted into the hole 314B. After the T-shaped member 303 is fully inserted, the locking hook 304 is released to cause the hole 314B to restore its inclined shape, so that the hole 314B is out of registry with the T-shaped member 303. Even when the T-shaped member 303 is positioned at the hole 314B, therefore, the T-shaped member 303 is prevented from getting out of the hole 314B under external shocks.

Figure 47:
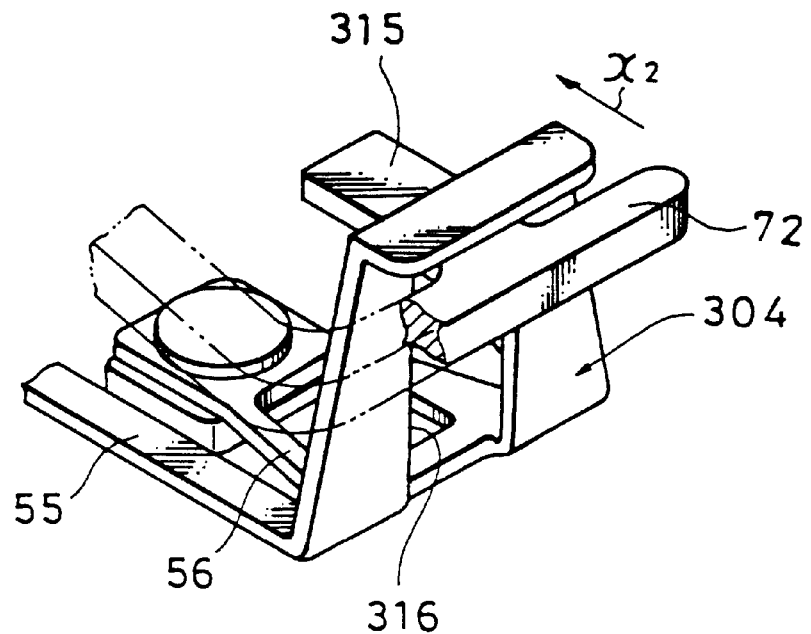
FIG. 47 is a perspective view of a yet further locking structure.

FIG. 47 illustrates a yet further locking structure. In FIG. 47, a straight bar 315 is integrally formed with and extends inwardly from a stop 72 of a stopper, and a locking hook 304 of a leaf spring 23 has a vertically elongate hole 316 defined therein. The straight bar 315 is inserted in the vertical hole 316, thus holding the locking hook 304 in locking engagement with the stopper. Even when the locking hook 304 is displaced in the direction indicated by the arrow $x_2$ under external shocks, the straight bar 315 prevents the locking hook 304 from disengaging from the stopper. The straight bar 315 may be formed on an inner surface or an outer surface of the stop 72.

Figure 48:
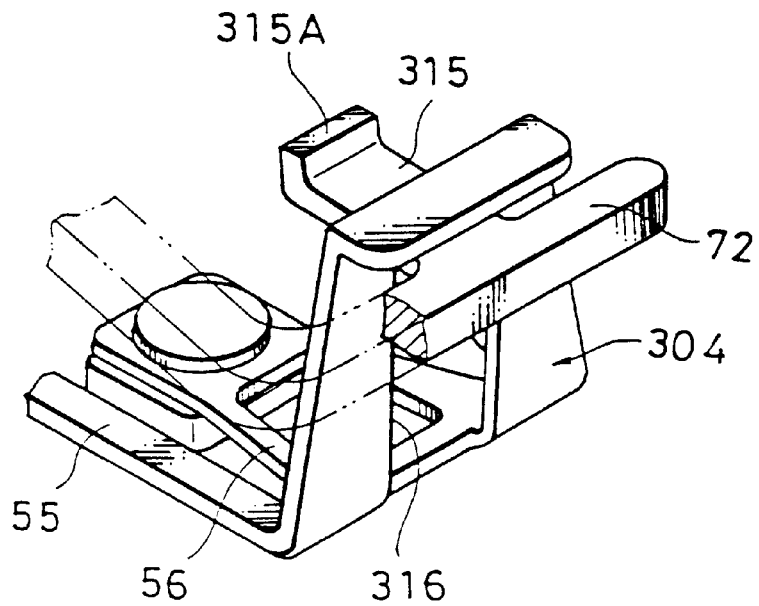
FIG. 48 is a perspective view of a yet still further locking structure.

FIG. 48 shows a yet still further locking structure. The locking structure shown in FIG. 48 is similar to the locking structure shown in FIG. 47 except that a straight bar 315 has a distal end 315A bent upwardly for reliably preventing the locking hook 304 from being displaced off the straight bar 315.

The horizontal distal end of the T-shaped member 303 shown in each of FIGS. 36 and 39 may also be bent upwardly.

Figure 50:
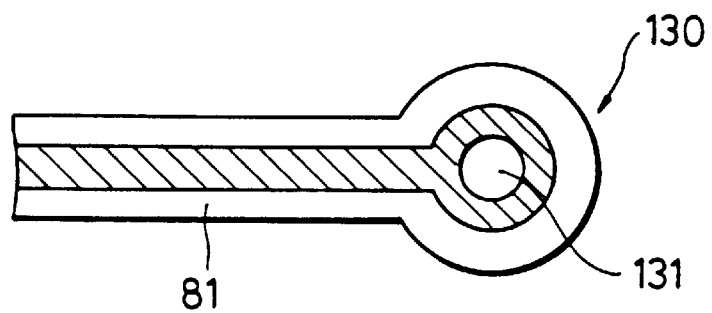
FIG. 50 is a plan view of a connector of an ordinary flexible wire cable.

As shown in FIG. 50, an ordinary flexible wire cable 81 has a round connector 130 with a round hole 131 of constant radius being defined therein. A terminal pin 44 (see FIG. 6, for example) is inserted in the round hole 131, and the round connector 130 is soldered to the terminal pin 44. At this time, it is necessary that the distance between the terminal pin 44 and an attachment 48 (see FIG. 6) on the sliding sole 29 of the head body 22 to which the flexible wire cable 81 is fixed be equal to the length of the flexible wire cable 81 in this region. However, it is difficult to satisfy such a requirement because of an assembling error of the head body 22 and a manufacturing error of the flexible wire cable 81. To meet the above requirement, the assembling accuracy of the head body 22 should be increased, and also the manufacturing accuracy of the flexible wire cable 81 should be increased.

If the length of the flexible wire cable 81 is smaller than the distance between the terminal pin 44 and the attachment 48, then since the round connector 131 is positioned short of the terminal pin 44, the length of the flexible wire cable 81 may be increased. However, after the round connector 131 is joined to the terminal pin 44, the flexible wire cable 81 would be flexed, imposing a reactive force on the terminal pin 44 and the attachment 48. Inasmuch as the flexible wire cable 81 extends directly from the head body 22 to the terminal pin 44, the reactive force would be liable to act directly on the head body 22, lowering sliding characteristics of the head body 22 on the magnetooptical disk 1.

The round hole 131 cannot stably be fitted over the terminal pin 44 unless the surface of the base of the terminal pin 44 lies parallel to the lower surface of the flexible wire cable 81. If there is an assembling error, then the flexible wire cable 81 would have to be flexed, giving rise to the above shortcoming.

Figure 51A:
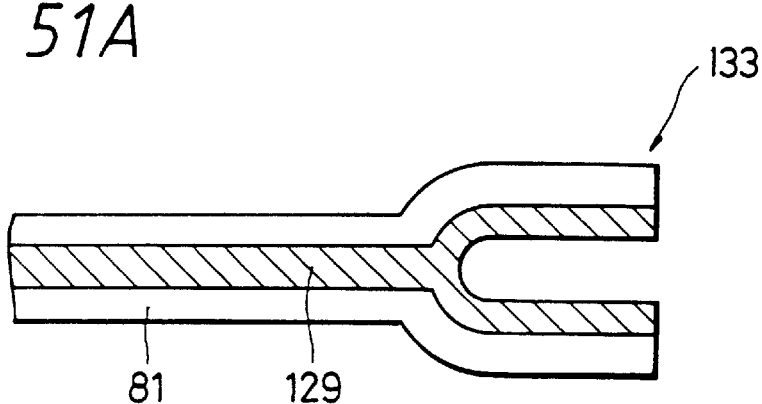
FIGS. 51A and 51B are plan views of connectors of flexible wire cables according to other embodiments of the present invention.
Figure 51B:
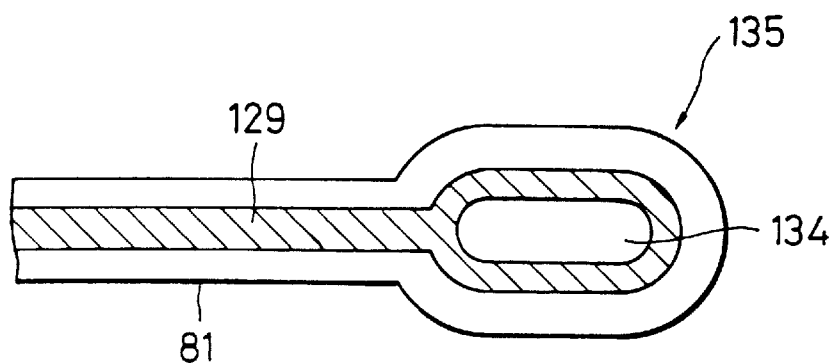
Figure 52:
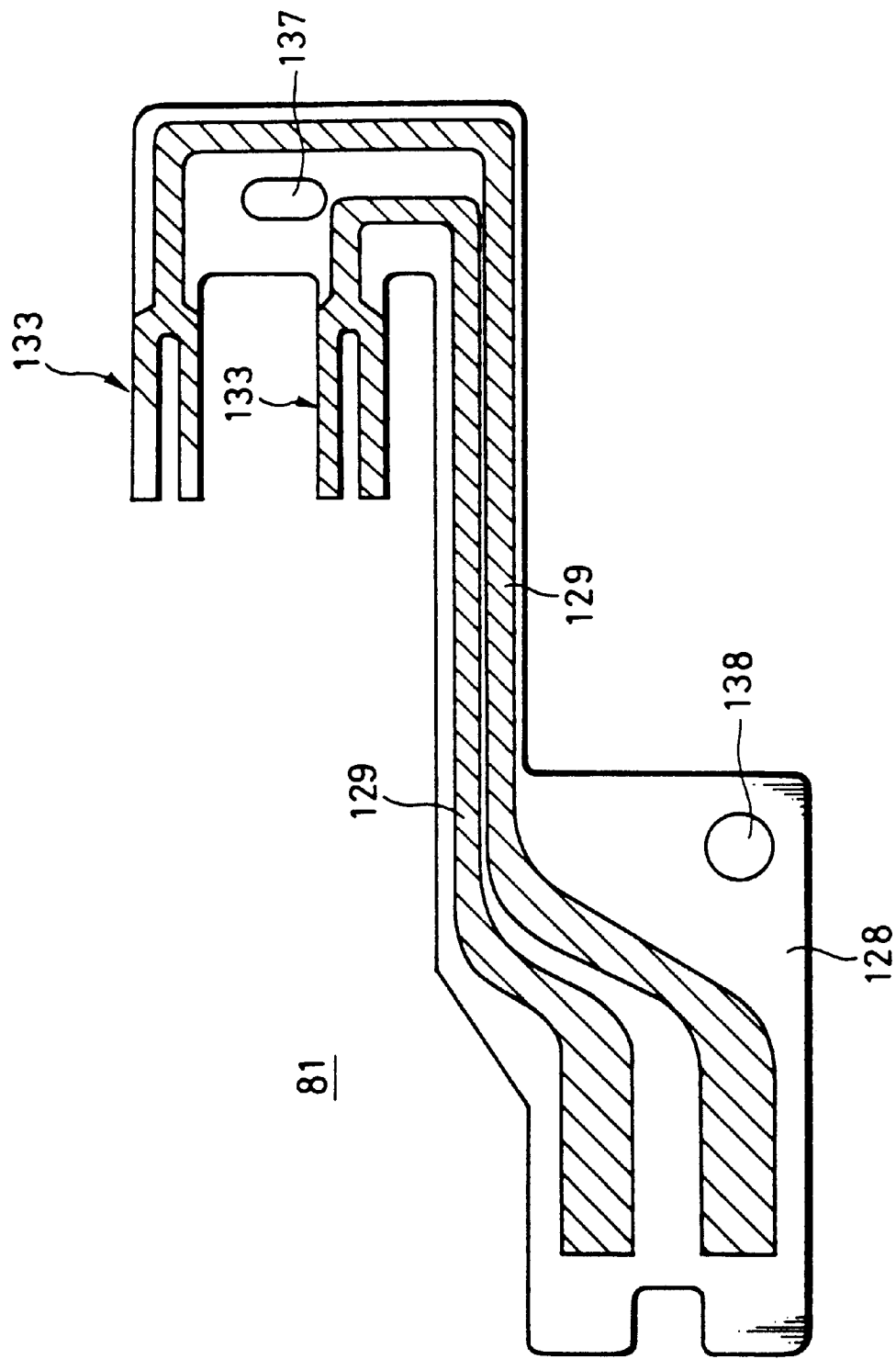
FIG. 52 is a plan view of a flexible wire cable according to still another embodiment of the present invention.

FIGS. 51A, 51B, and 52 show flexible wire cables 81 according to other embodiments of the present invention. A flexible wire cable 81 shown in FIG. 51A has a bifurcated or U-shaped connector 133 for connection to a terminal pin on a head body. A flexible wire cable 81 shown in FIG. 51B has a round connector 135 with an oblong hole 134 for connection to a terminal pin on a head body. Each of the flexible wire cables 81 has a wire pattern 129 of Cu foil, for example, which is shown hatched.

A flexible wire cable 81 shown in FIG. 52 has a pair of parallel wire patterns 129 disposed on a flexible insulation base 128 and each having a bifurcated connector 133 to be connected to a terminal pin. The flexible wire cable 81 also has an attachment hole 137 for insertion therein of the attachment 48 of the head body 22, and an engaging hole 138 for insertion therein of the engaging pin 82 of the support member 24.

Figure 53:
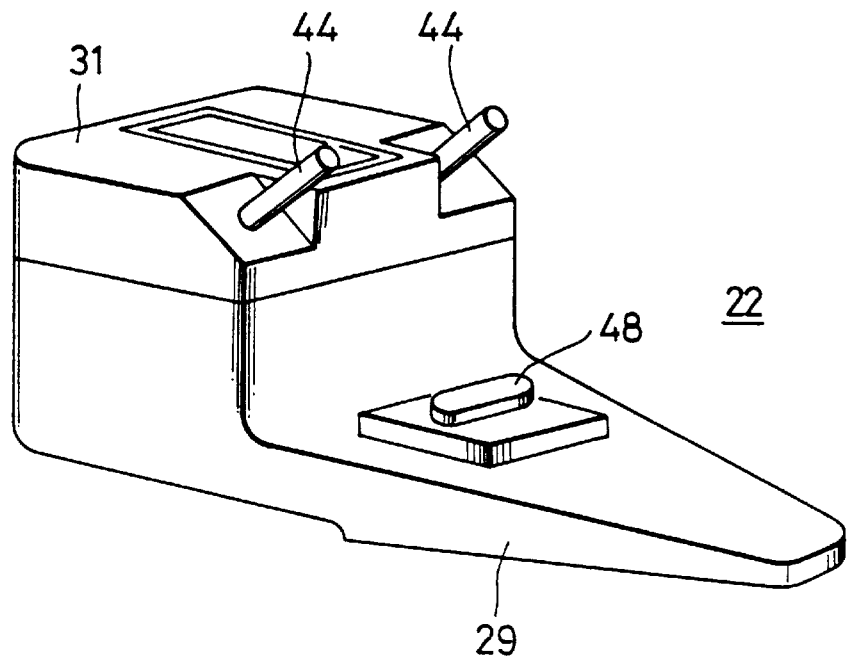
FIG. 53 is a perspective view of a head body according to another embodiment of the present invention.
Figure 54:
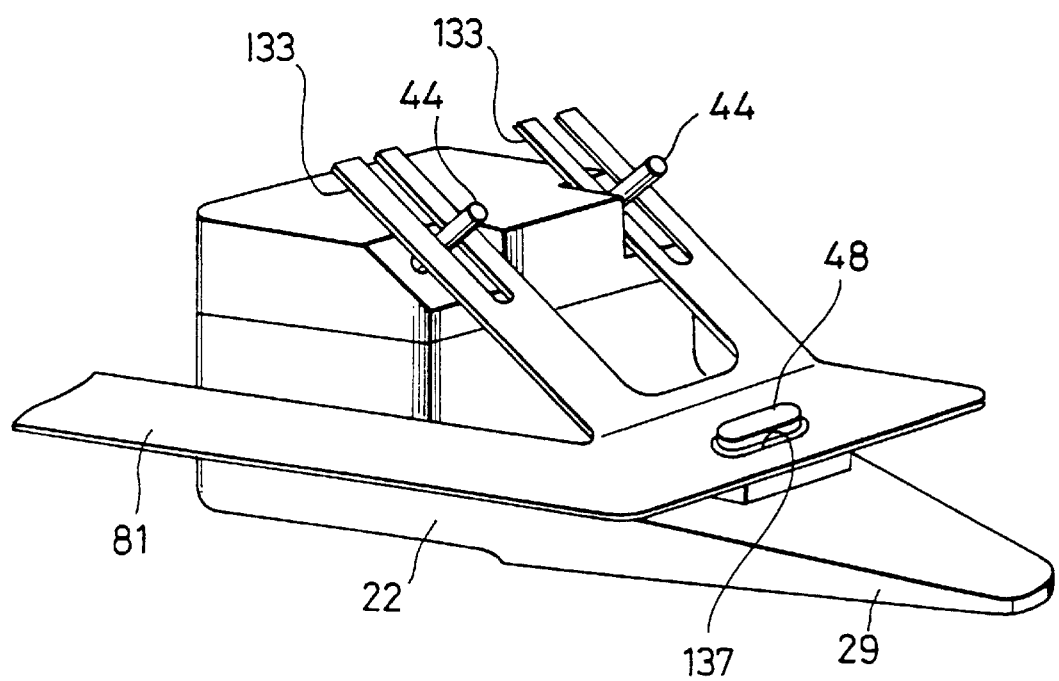
FIG. 54 is a perspective view of the head body shown in FIG. 53 with the flexible wire cable shown in FIG. 52 being connected thereto.

For connecting the flexible wire cable 81 to the terminal pins 44 of a head body 22 shown in FIG. 53, which extend obliquely from the end surface of a mount 31, the attachment hole 137 is fitted over and securely positioned on the attachment 48 as shown in FIG. 54, and the bifurcated connectors 133 are placed over the respective terminal pins 44 so that the terminal pins 44 are sandwiched and inserted in the bifurcated connectors 133. The bifurcated connectors 133 are then soldered to the terminal pins 44.

Even if the length of the flexible wire cable 81 between the attachment hole 137 and the bifurcated connectors 133 is relatively large, the flexible wire cable 81 may be connected to the terminal pins 44 without being flexed because the bifurcated connectors 133 can be adjusted in their positions connected to the terminal pins 44.

Figure 55:
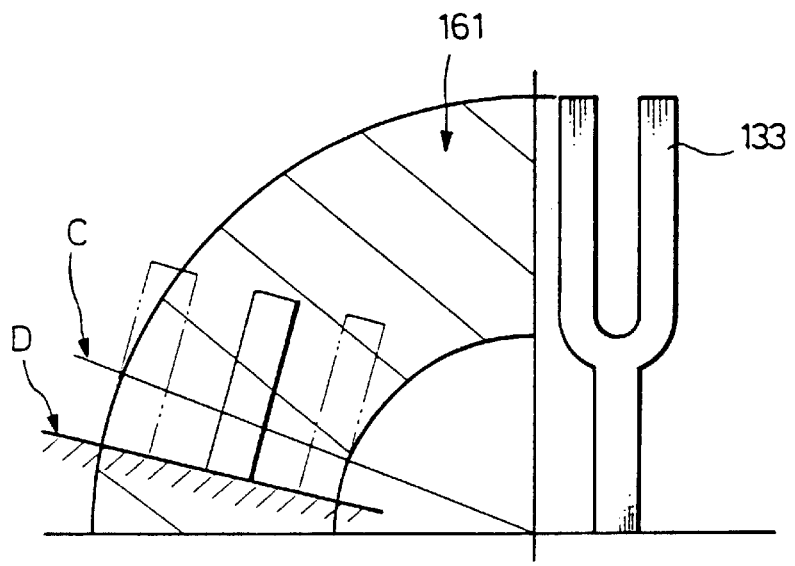
FIG. 55 is a diagram showing the positional relationship between the flexible wire cable shown in FIG. 52 and a terminal pin.

FIG. 55 shows the positional relationship between the flexible wire cable 81 with the bifurcated connectors 133 shown in FIG. 52 and the terminal pin 44 of the head body 22 at the time the flexible wire cable 81 can be connected to the terminal pin 44. A hatched area 161 indicates a spatial range of the opening of the connector 133 for accommodating the terminal pin 44.

Figure 56:
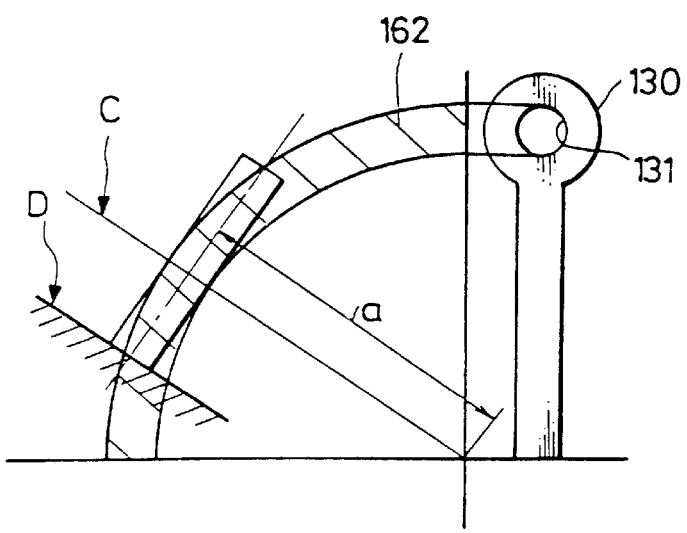
FIG. 56 is a diagram showing the positional relationship between the flexible wire cable shown in FIG. 50 and a terminal pin.

FIG. 56 shows the positional relationship between the ordinary flexible wire cable 81 with the round hole 131 shown in FIG. 50 and the terminal pin 44 of the head body 22 at the time the flexible wire cable 81 can be connected to the terminal pin 44. A hatched area 162 indicates a spatial range of the opening 131 of the connector 130 for accommodating the terminal pin 44.

More specifically, when the flexible wire cable 81 is turned about its fixed end for connection to the inclined terminal pin 44, if the flexible wire cable 81 with the round hole 131 is longer or shorter than a distance a (see FIG. 56) between the center of the terminal pin 44 and the fixed end of the flexible wire cable 81, or the terminal pin 44 is displaced in position upon assembly, then the flexible wire cable 81 cannot be connected to the terminal pin 44.

However, the flexible wire cable 81 with the bifurcated or U-shaped connector 133 has a wider range of connectability with respect to the terminal pin 44 as indicated by the hatched area 161 in FIG. 55. Therefore, even if the terminal pin 44 is positionally displaced as indicated by the broke lines or the flexible wire cable 81 has dimensional irregularities, the flexible wire cable 81 can be connected to the terminal pin 44 insofar as the terminal pin 44 is positioned in the hatched range 161. Furthermore, the plane C of the flexible wire cable 81 is not required to lie parallel to the surface D of the base of the terminal pin 44. The flexible wire cable 81 is connected to the terminal pin 44 with an optimum cable length, i.e., without any undue flexing, between the terminal pin 44 and the fixed end of the flexible wire cable 81. This advantage is also offered by the connector 135 with the oblong hole 134 shown in FIG. 51B.

The connectors 133, 134 shown in FIGS. 51A and 51B may be used to connect flexible wire cables in applications where the positional relationship between terminal pins or a terminal pin and the fixed end of a flexible wire cable is three-dimensional and the linear distance therebetween is unknown.

As described above, when a sliding-type magnetic head according to the present invention slides on a magnetooptical disk 1, the sliding sole of the magnetic head impinges upon a surface irregularity or a bump 16 which may exist on the protective film 5 of the magnetooptical disk 1. If the optical pickup for recording information on and reproducing information from the magnetooptical disk 1 cannot follow or respond to vibrations of the magnetooptical disk 1 caused by shocks produced upon such a collision, then the optical system of the optical pickup undergoes a focus error, causing the optical pickup to be displaced out of a desired track on the magnetooptical disk 1. Such a focus error is one of the most serious problems that may happen when the magnetic head slides on the magnetooptical disk 1.

Figure 57:
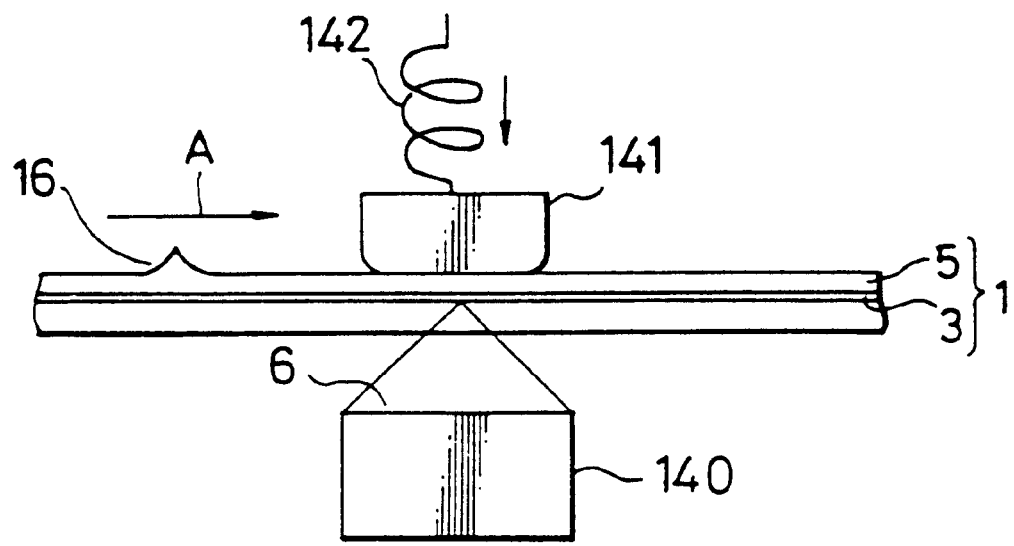
FIG. 57 is a schematic elevational view of a sliding-type magnetooptical disk drive.

FIG. 57 schematically shows a magnetooptical disk drive which comprises a sliding-type magnetic head of the field modulating type. The magnetooptical disk drive has a head slider 141, which corresponds to the head body 22 with the sliding sole 29, is pressed into sliding contact with the protective film 5 of the magnetooptical disk 1 under a predetermined load exerted by a spring 142. The focus of a laser beam 6 emitted from a recording and reproducing optical pickup 140 is adjusted by a servo mechanism depending on surface displacements or vibrations of the magnetooptical disk 1. In the event that the magnetooptical disk 1 is displaced beyond a certain distance due to a collision between the head slider 141 and the bump 16 on the magnetooptical disk 1, then the servo mechanism is unable to control the focus of the laser beam 6, which is defocused resulting in a focus error. The displacement of the magnetooptical disk 1 upon such a collision is substantially proportional to the force acting on the magnetooptical disk 1.

Figure 58:
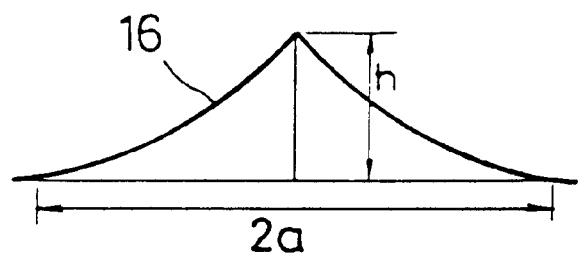
FIG. 58 is a schematic elevational view of a bump on a magnetooptical disk.

The force acting on the magnetooptical disk 1 upon a collision of the head slider 141 and the bump 16 will be estimated below. It is assumed that as shown in FIG. 58, the head slider 141 runs over a bump 16 having a height h, the bump 16 having a parabolic profile, and that no frictional force is applied to the head slider 141.

When the slider 141, which has a mass M, moves at a constant peripheral speed Vx on the magnetooptical disk 1, the period of time $t_0$ required for the head slider 141 to reach the crest of the bump 16 after it has started to climb the bump 16 is expressed as follows:

$$t_0 = a/Vx \quad (1).$$

Assuming that the speed of the head slider 141 on the crest of the bump 16 in a direction normal to the magnetooptical disk 1 is indicated by Vy, the force F acting on the magnetooptical disk 1 is expressed according to the relationship between the impulse and the momentum as follows:

$$F = MVy/t_0 \quad (2).$$

The head slider 141 is accelerated by the constant force F, and reaches the height h after elapse of the time $t_0$. The height h is given as follows:

$$h = (1/2) \cdot (F/M)/t_0^2 \quad (3)$$
$$= (1/2) \cdot (Vy/t_0)/t_0^2$$
$$\therefore Vy = 2h/t_0.$$

From the equations (1), (2), and (3), the force F is determined as follows:

$$F = 2(MVx) \cdot (h/a) \cdot (Vx/a) \quad (4).$$

The values (h/a) and (Vx/a) are parameters of the magnetooptical disk 1, with Vx being constant. Therefore, in order to reduce the force F using the magnetic head, it is necessary to reduce the mass M of the head slider 141. With respect to the magnetic head 21 described above, in order to reduce any displacement of the magnetooptical disk 1 that occurs when the head body 22 hits the bump 16 on the magnetooptical disk 1, it is necessary to reduce the weight of the slider 28. One way of reducing the weight of the slider 28 is to change the configuration and dimensions of the slider 28 including the sliding sole 29 and select a light material for the slider 28.

Tables 1 and 2 below show the densities of major materials.

TABLE 1

| | Materials | Density (g/cm³) |
|---|---|---|
| | Low-density PE (polyethylene) | 0.92 |
| | High-density PE | 0.93 |
| | Ultra-high-molecular-weight PE | 0.93 |
| P | PP (polypropylene) | 0.91 |
| | PS (polystyrene) | 1.04 |
| l | PET (polyethylene terephthalate) | 1.03 |
| | PBT (polybutylene terephthalate) | 1.31 |
| a | PA66 (polyamide, nylon 66) | 1.14 |
| | PA6 (polyimide, nylon 6) | 1.13 |
| s | PA12 (polyamide) | 1.01 |
| | PA46 (polyamide) | 1.18 |
| t | POM (polyacetal) | 1.42 |
| | PC (polycarbonate) | 1.20 |
| i | PAR (polyarylate) | 1.21 |
| | PPS (polyphenylene sulfite) | 1.66 |
| c | PES (polyether sulfone) | 1.37 |
| | PEEK (polyether ether ketone) | 1.32 |
| s | PEI (polyether imide) | 1.27 |
| | ABS | 1.05 |
| | PTFE (polytetrafluoroethylene) | 2.17 |
| | PI (polyimide) | 1.36 |

TABLE 2

| | Materials | Density (g/cm³) |
|---|---|---|
| Metals | Aluminum | 2.69 |
| | Titanium | 4.54 |
| | Iron | 7.80 |
| | Copper | 8.93 |
| Ceramics | Glass | 2.32 |
| | Graphite (C) | 2.35 |
| | Alumina (Al₂O₃) | 3.99 |
| | Quartz | 2.65 |
| | Diamond (C) | 3.51 |

It can be seen from Tables 1 and 2 that if the head body 22 is of the same configuration and dimensions, then the weight of the head body 22 with the slider 28 being made of a plastic material is reduced to half or less of the weight of the head body 22 with the slider 28 being made of any of the other materials.

In the embodiments of the present invention, the slider 28 of the head body 22 is made of a plastic material.

The plastic material of the slider 28 may be one of the materials listed in Table 1, polyphenylene sulfide (PPS), or the like, or may be on of those materials with a carbon content, e.g., in the range of from 8 weight % to 30 weight %.

Figure 59:
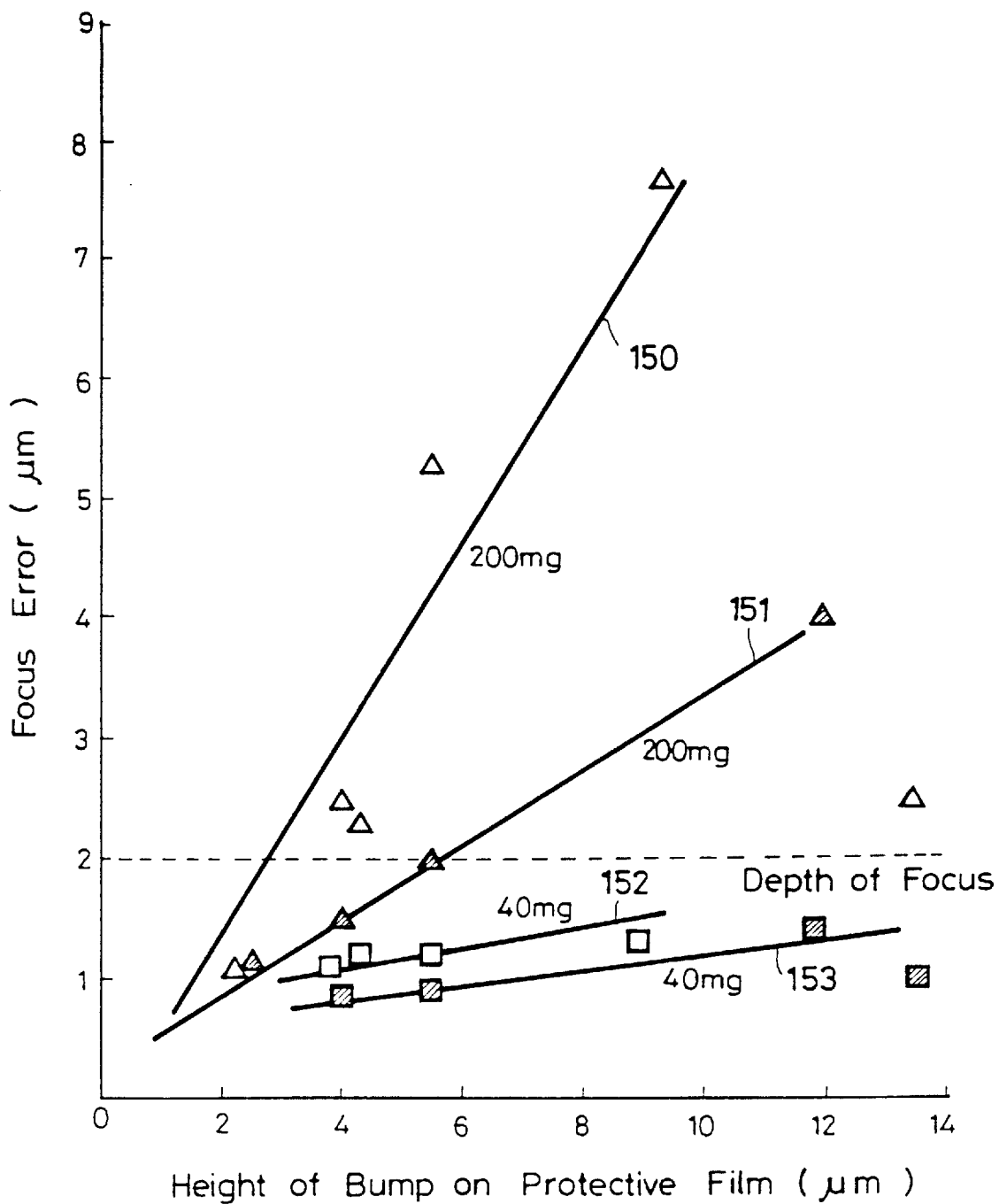
FIG. 59 is a graph showing the relationship between the height of a bump on the protective film of the magnetooptical disk and the amount of a focus error of the optical pickup for different masses of the head body.

FIG. 59 shows the relationship between the height of a bump on the protective film of the magnetooptical disk 1 and the amount of a focus error of the optical pickup for different masses of the head body 22. The amount of a focus error represents an amount by which the optical pickup is defocused due to a servo failure when the signal surface, i.e., the recording layer 3, of the magnetooptical disk 1 vibrates upon collision between the head body 22 and the bump 16 on the magnetooptical disk 1.

At present, an optical pickup can read signals recorded on the magnetooptical disk 1 even when the optical pickup is subjected to a focus error of up to 2 μm. However, it fails to read recorded signals when the optical pickup is subjected to a focus error beyond 2 μm. Bumps 16 on the magnetooptical disk 1 are allowed to have a height of up to 10 μm.

In FIG. 59, a straight line 150 plotted along marks Δ represents a head body 22 having a mass of 200 mg and located in an inner circumferential region (r=24 mm~28 mm) of the magnetooptical disk 1. A straight line 151 plotted along marks ▲ represents a head body 22 having a mass of 200 mg and located in another inner circumferential region (r=17 mm~18 mm) of the magnetooptical disk 1. A straight line 152 plotted along marks represents a head body 22 having a mass of 40 mg and located in an outer circumferential region of the magnetooptical disk 1. A straight line 153 plotted along marks □ represents a head body 22 having a mass of 40 mg and located in an inner circumferential region of the magnetooptical disk 1. The outer circumferential regions of the magnetooptical disk 1 are more likely to oscillate causing a greater focus error as they are remoter from the portion of the magnetooptical disk 1 that is supported by the disk drive. Since data is read from and recorded in those outer circumferential regions of the magnetooptical disk 1, any focus error in the inner circumferential regions of the magnetooptical disk 1 should be held to 2 μm or less. The mass of the head body 22 ranges from about 30 to 40 mg if the slider is made of a plastic material, from about 60 to 140 mg if the slider is made of a metallic material, and from 60 to 80 mg if the slider is made of a ceramic material. To ensure a focus error of up to 2 μm upon collision with a bump 16 having a height of 10 μm in outer circumferential regions of the magnetooptical disk 1, the slider 28 should be made of a plastic material.

The mass of the head body 22 is thus reduced if the slider 28 is made of a plastic material whose density is half the densities of metallic and ceramic materials or smaller.

With the lighter head body 22, shocks caused when the head body 22 collides with the bump 16 on the magnetooptical disk 1 are reduced, resulting in a reduction in any vibration of the magnetooptical disk 1 thereby to prevent the optical pickup from undergoing an undue focus error due to a servo failure.

Since any damage arising from collision between the head body 22 and the bump 16 is reduced, the service life of the disk drive is extended. The plastic materials are better than the metallic and ceramic materials with respect to their formability and mass-producibility.

In the case where the slider 28 is made of a plastic material, it is possible to develop a practical sliding-type magnetooptical recording system with no magnetic head servo mechanism, and also to provide magnetic heads that are less costly than magnetic heads with sliders made of other materials.

In the above embodiments, the principles of the invention are applied to magnetic head bodies with the slider 29 located on one side of the magnetic head element 27. However, the present invention is also applicable to a magnetic head having a sliding sole integrally molded with a bobbin with a coil wound therearound and a magnetic core of ferrite, the bobbin being mounted on the magnetic core, the magnetic core having a distal end retracted from a sliding surface of the sliding sole. In such a magnetic head, the sliding sole and the bobbin may be made of a plastic material.

In the magnetic head shown in FIGS. 3 and 5, the head body 22 is supported on the third spring system 56 of the leaf spring 23. When the magnetic head is in use, the head body 22 is pressed against the surface of the magnetooptical disk 1 under a predetermined load by the leaf spring 23, and borne by the leaf spring 23 and the magnetooptical disk 1.

When the magnetic head is not in use, it is spaced from the surface of the magnetooptical disk 1, and hung from the third spring system 56 of the leaf spring 23. If vibrations or shocks are imposed on the magnetic head at this time, the head body 22 is vibrated possibly causing the third spring system 56, which is low in rigidity and has a gimbal function, to be bent, damaged, or colliding with surrounding parts.

Figure 60:
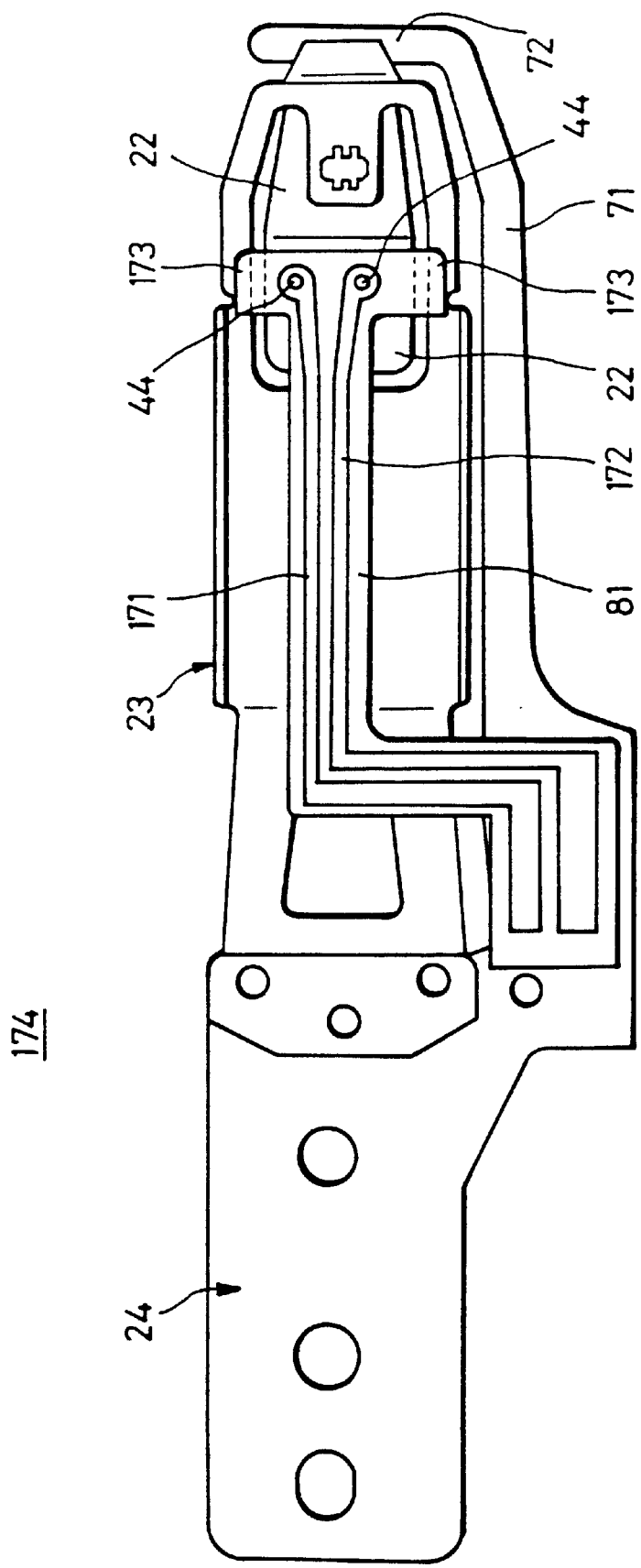
FIG. 60 is a plan view of a sliding-type magnetic head according to another embodiment of the present invention.
Figure 61:
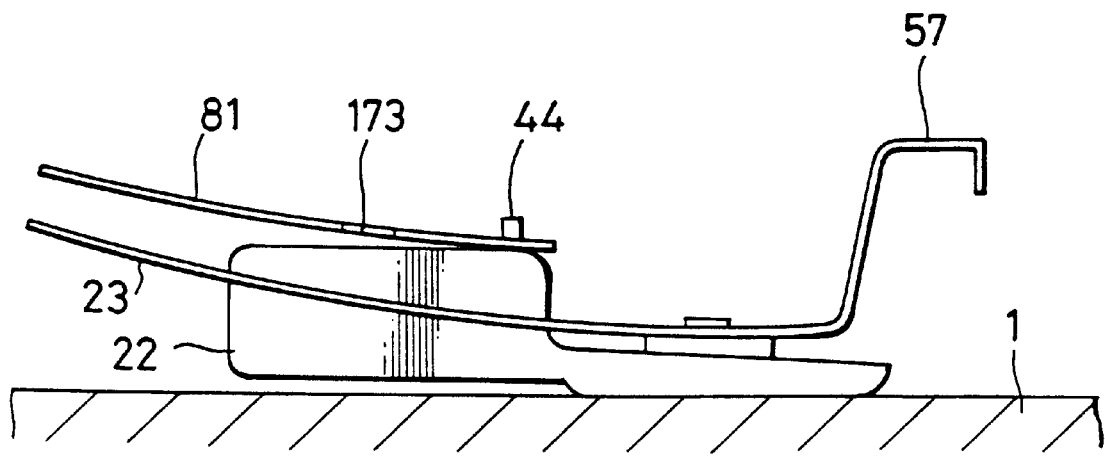
FIG. 61 is a side elevational view of the head body and associated parts of the magnetic head shown in FIG. 60, the head body and the associated parts being positioned when the magnetic head is in use.
Figure 62:
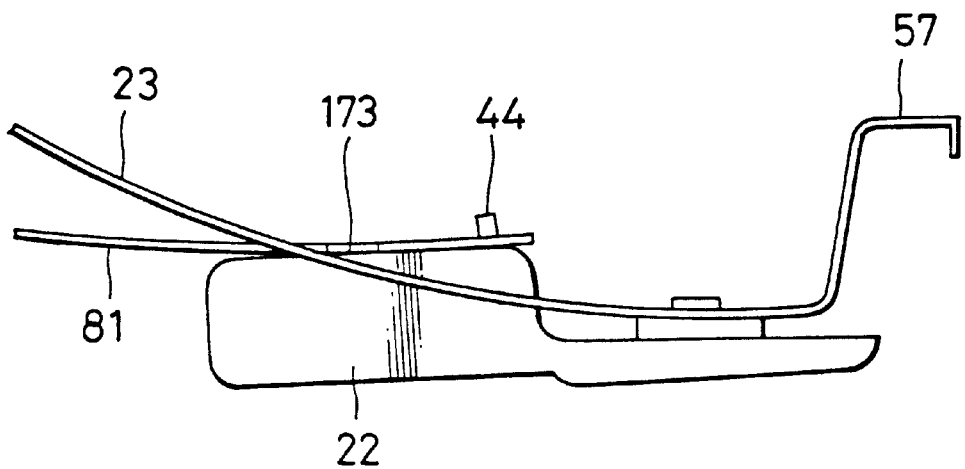
FIG. 62 is a side elevational view of the head body and associated parts of the magnetic head shown in FIG. 60, the head body and the associated parts being positioned when the magnetic head is not in use.

FIGS. 60 through 62 show a magnetic head 174 according to another embodiment of the present invention, which magnetic head is designed to solve the above problem. In this embodiment, the magnetic head has a vibroisolating mechanism for preventing the head body 22 from vibrating even if vibrations or shocks are applied thereto while the magnetic head is spaced from the disk surface when not in use.

As shown in FIG. 60, the magnetic head 174 includes a head body 22 having a sliding sole 29 for sliding contact with a magnetooptical disk, a leaf spring 23 supporting the head body 22, and a support member 24 to which one end of the leaf spring 23 is fixed. A flexible wire cable 81 with two wires 171, 172 is disposed on and extends along the leaf spring 23. The flexible wire cable 81 has a connector on one end which is fitted over and connected to bobbin terminals 44 projecting upwardly from the slider of the head body 22. The other end of the flexible wire cable 81 is located on the proximal end of an arm 71.

The flexible wire cable 81 has a lateral extension 173 near the connector which serves as a stopper that confronts the leaf spring 23. The extension 173 extends symmetrically laterally from a region near the connector in confronting relationship to the springy arms 55A, 55B of the second spring system 55 such that the extension 173 can contact the springy arms 55A, 55B.

The head body 22, the leaf spring 23, and the support member 24 are identical to those of the magnetic head shown in FIG. 3, and will not be described in detail below.

When the magnetic head 174 is in use, the extension 173 of the flexible wire cable 81 is spaced from the springy arms 55A, 55B of the second spring system 55 as shown in FIG. 61. When the magnetic head 174 is not in use, the head body 22 tends to fall due to gravity, and is prevented from falling excessively by the extension 173 that abuts against the springy arms 55A, 55B, as shown in FIG. 62. When vibrations or shocks are applied to the magnetic head 174 at this time, any forces tending to move the head body 22 downwardly owing to the applied vibrations or shocks are prevented from being transmitted to the head body 22 by the extension 173 held in contact with the spring arms 55A, 55B. Therefore, the head body 22 is held against downward movement. The extension 173 also serves as a cushion to absorb the energy of the applied vibrations or shocks. Any vibrations of the head body 22 therefore do not last for a long period of time.

Figure 63:
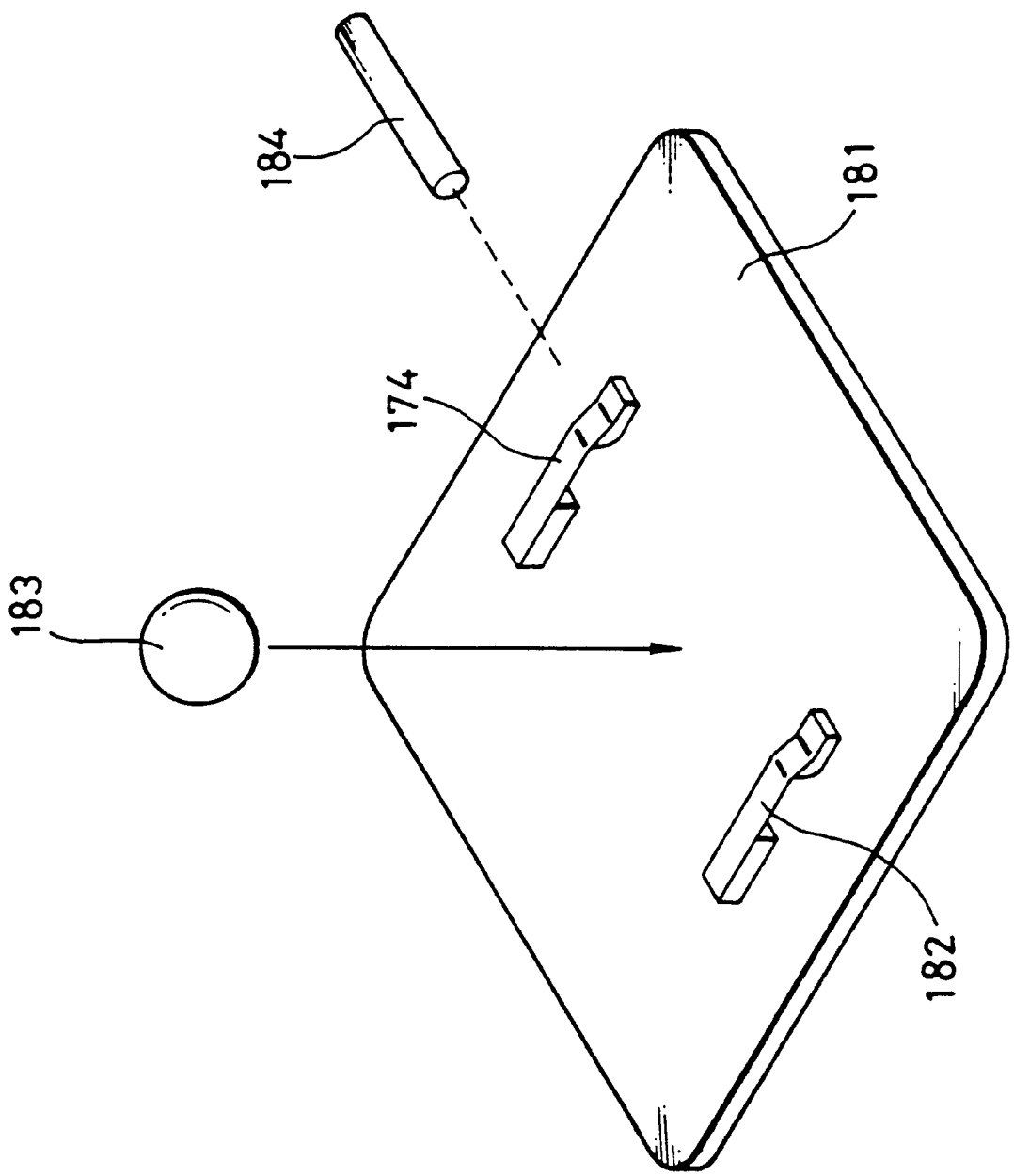
FIG. 63 is a perspective view of an arrangement used in a test for evaluating vibration resistance and shock resistance of magnetic heads.

A test was conducted to evaluate vibration resistance and shock resistance of the magnetic head 174 shown in FIG. 60 and a magnetic head with no extension 173. In the test, as shown in FIG. 63, the magnetic head 174 and a magnetic head 182 with no extension 173, hereinafter also referred to as a comparative magnetic head, were fixedly mounted on a table 181 with their head bodies 22 spaced from the table 181. A weight 183 having a weight of 1 kg dropped from a height of 30 cm onto the table 181 at a position intermediate between the magnetic heads 174, 182. At this time, vibrations of the magnetic heads 174, 182 were observed using a stereomicroscope 184.

In the test, the head body 22 of the magnetic head 174 moved upwardly by about 2 mm, then returned to its initial position, but did not move further downwardly. Subsequently, the head body 22 of the magnetic head 174 made no vibratory movement. On the other hand, the head body 22 of the comparative magnetic head 182 vibrates with an amplitude of 4~5 mm for 1~2 seconds, and then converged to its initial position.

Insofar as the leaf spring 23 and the head body 22 are of the same design, the head body 22 is better isolated from vibration by the extension 173 of the flexible wire cable 81 which contacts the leaf spring 23 when the head body 22 is not in contact with the magnetooptical disk 1 than would be if the flexible wire cable 81 had no extension 173. Since any margin for wobbling movement of the head body 22 may be small, the recording and reproducing apparatus with the magnetic head according to the present invention may be lower in profile.

The extension 173 may be provided on the flexible wire cable 81 shown in FIG. 5. A stiffener may be attached to the extension 173.

Figure 64:
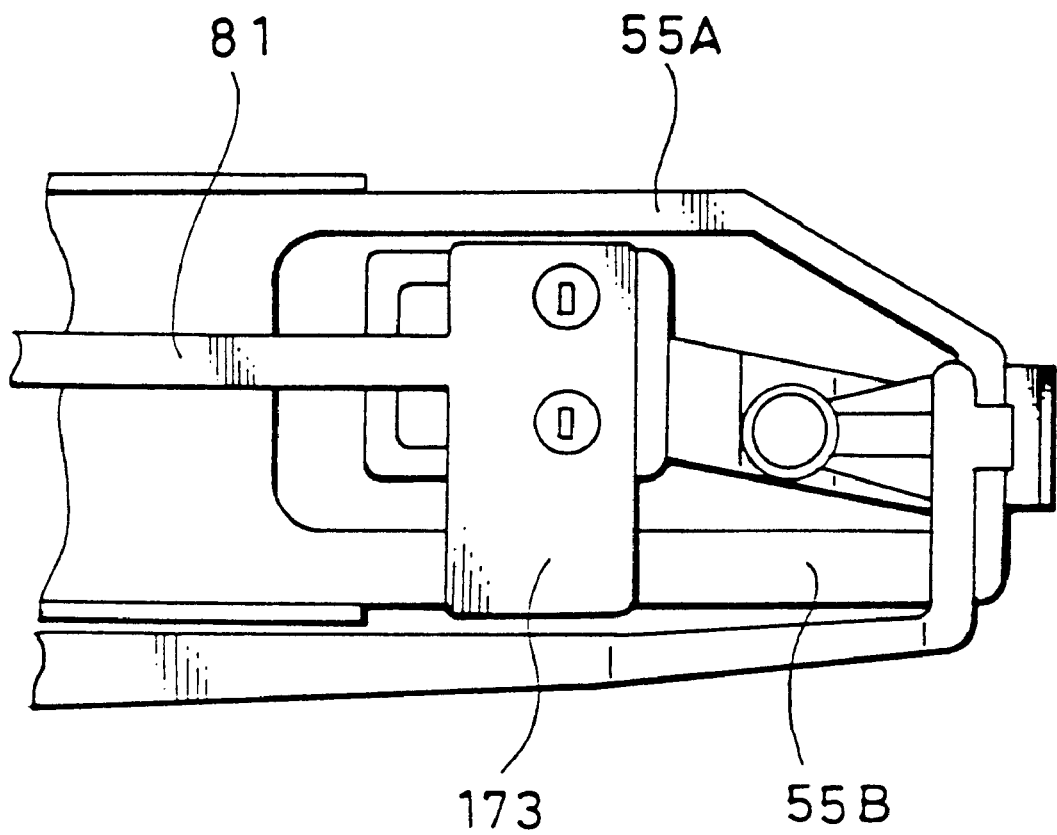
FIG. 64 is a fragmentary plan view of a sliding-type magnetic head according to still another embodiment of the present invention.

In the embodiment shown in FIG. 60, the extension 173 extends symmetrically laterally from in confronting relationship to the springy arms 55A, 55B of the second spring system 55 such that the extension 173 can contact the springy arms 55A, 55B. FIG. 64 shows a magnetic head 176 according to still another embodiment of the present invention. In FIG. 64, the magnetic head 176 has a flexible wire cable 81 including a lateral extension 173 extending toward one side in confronting relationship to the springy arm 55B of the second spring system 55 such that the extension 173 can contact the springy arm 55B.

The vibroisolating mechanisms shown in FIGS. 60 and 64, i.e., the flexible wire cable 81 with the extension 173, may be incorporated in the magnetic heads shown in FIGS. 35 through 48, and 3.

Figure 65:
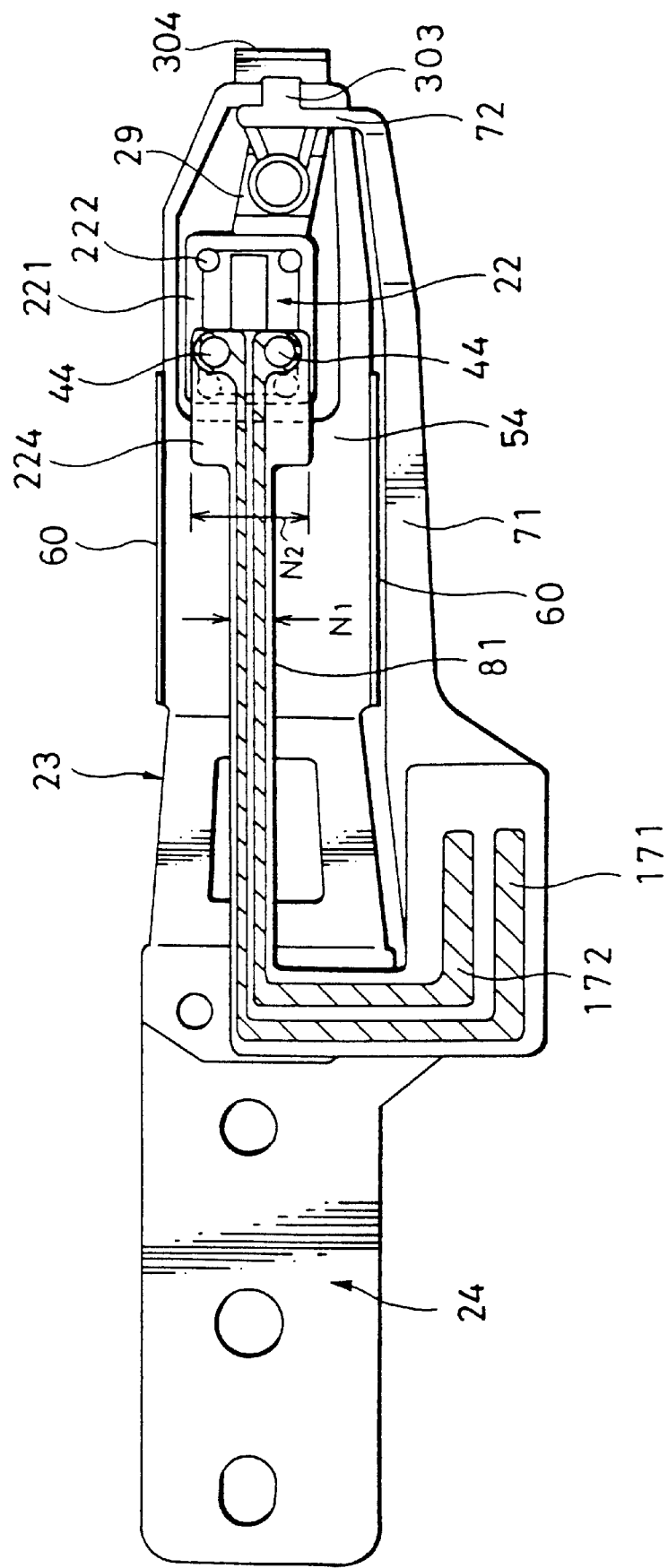
FIG. 65 is a plan view of a sliding-type magnetic head according to yet another embodiment of the present invention.
Figure 66:
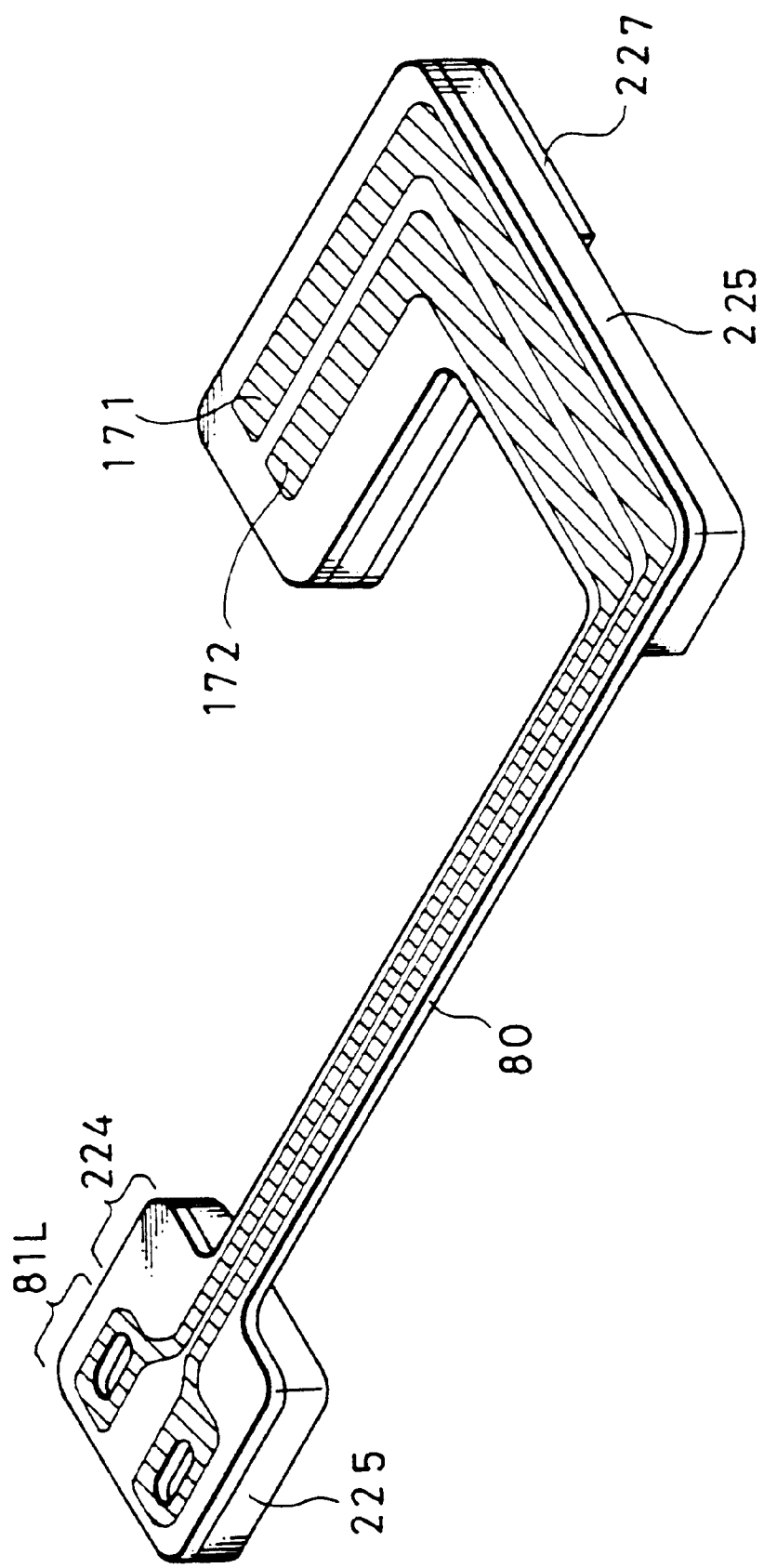
FIG. 66 is a perspective view of another flexible wire cable.

FIGS. 65 and 66 show a magnetic head with a vibroisolating mechanism for the head body 22 according to yet another embodiment of the present invention.

As shown in FIG. 65, a magnetic head 226 comprises a head body 22 having a sliding sole 29 for sliding contact with a magnetooptical disk, a leaf spring 23 supporting the head body 22, and a support member 24 to which one end of the leaf spring 23 is fixed. A flexible wire cable 81 with two wires 171, 172 is disposed on and extends along a central area of the leaf spring 23. The flexible wire cable 81 has a connector 81L (see FIG. 66) on one end which is fitted over and connected to bobbin terminals 44 projecting upwardly from the slider of the head body 22. The other end of the flexible wire cable 81 is located on the proximal end of an arm 71.

As with the embodiment shown in FIG. 39, a T-shaped member 303 is joined to an outer surface of a stop 72 on the distal end of an arm 71 extending from the support member 24. The T-shaped member 303 is inserted in a crisscross hole (not shown) defined in a locking hook 304 of the leaf spring 23, thus locking the arm 71 on the leaf spring 23.

A shield ring-shaped conductor 221, e.g., a shield ring of Cu, for blocking an electromagnetic noise radiation from the coil is disposed around the mount of the head body 22 in which the magnetic head element is inserted. The shield ring 221 is fixed by fused members 222 positioned on the respective four corners of the mount. The fused members 222 comprise projections integral with the mount which are softened to secure the shield ring 221 in position on the mount.

The head body 22, the leaf spring 23, and the support member 24 are identical to those of the magnetic heads shown in FIG. 35 and 39, and will not be described in detail below.

In this embodiment, the flexible wire cable 81 has an extension 224 integrally extending from the connector 81L toward a non-spring portion of the leaf spring 23, i.e., an inclined portion 54, and serving as a stopper in confronting relationship to the inclined portion 54. The extension 224 has a width $N_2$ that is larger than the width $N_1$ ($N_2 > N_1$) of a portion of the flexible wire cable 81 on which the wires 171, 172 extend. The width $N_2$ may be the same as the width of the connector 81L, for example.

As shown in FIG. 66, a stiffener 225 made of fire-retardant PET (polyethylene terephthalate) or glass epoxy resin is attached to both the extension 224 and the connector 81L to increase the mechanical strength of the extension 224 for preventing the extension 224 from being broken when it impinges upon the inclined portion 54 of the leaf spring 23.

A similar stiffener 225 is attached to a portion of the flexible wire cable 81 which is mounted on the proximal end of the arm 71. A pressure-sensitive adhesive 227 is applied to a lower surface of the stiffener 225.

The flexible wire cable 81 comprises a flexible insulation film 80 which may be in the form of a polyimide film, for example.

The inclined portion 54 of the leaf spring 23 which is engageable with the extension 224 of the flexible wire cable 81 has ribs 60 on its opposite sides such that the inclined portion 54 is rigid enough not to be bent over.

When the magnetic head 226 is in use, the extension 224 of the flexible wire cable 81 is spaced from the inclined portion 54 of the leaf spring 23. When the magnetic head 226 is not in use with the head body 22 spaced from the magnetooptical disk 1, the head body 22 tends to fall due to gravity, and is prevented from falling excessively by the extension 224 that abuts against the inclined portion 54. When vibrations or shocks are applied to the magnetic head 226 at this time, any forces tending to move the head body 22 downwardly owing to the applied vibrations or shocks are prevented from being transmitted to the head body 22 by the extension 224 held in contact with the inclined portion 54. Therefore, the head body 22 is held against downward movement. The extension 224 also serves as a cushion to absorb the energy of the applied vibrations or shocks. Any vibrations of the head body 22 therefore do not last for a long period of time.

Upon being subjected to repeated vibrations or shocks, the extension 173 of the flexible wire cable 81 of the magnetic head 176 shown in FIG. 64, for example, engages and tends to deform the second spring system 55 until its spring characteristics will be lost. With the magnetic head 226, however, since the extension 224 of the flexible wire cable 81 engages the rigid inclined portion 54, the second spring system 55 is prevented from being deformed even when subjected to repeated vibrations or shocks, and from losing its spring characteristics.

The magnetic head 226 shown in FIG. 65 which has the flexible wire cable 81 shown in FIG. 66 and the magnetic head 176 shown in FIG. 64 were compared in a shock test in which they were subjected to a shock of 2000 m/s$^2$ (200 G [gravitational force]). In the test, both the magnetic heads 226, 176 were effective to suppress vibrations of the head body 22. The second spring systems 55 of the magnetic heads 226, 176 were checked for deformation and characteristic change. The results are given in the following Table 3:

TABLE 3

|  | Deformation | Characteristic change |
| --- | --- | --- |
| Magnetic head 226 | No | 0% |
| Magnetic head 176 | Yes | about 20% |

It can be confirmed from Table 3 that with the magnetic head 226 shown in FIG. 65, the head body 22 is prevented from vibrating, and the second spring system 55 is also prevented from being deformed and changing its characteristics.

In the embodiment shown in FIG. 65, the extension 224 as the stopper of the flexible wire cable 81 is relatively wide. It is however possible to equalize the width of the stopper to the width $N_1$ and attach a stiffener 225 to the stopper and the connector 81L, the stopper being engageable with the inclined portion 54 of the leaf spring 23 for isolating vibrations.

The stiffener 225 shown in FIG. 66 may be dispensed with, and the material and thickness of the flexible insulation film 80 of the flexible wire cable 81 integral with the wide extension 224 may be selected to make the flexible wire cable 81 itself hard for enabling the extension 224 to perform a vibroisolating function.

The extension 224 of the flexible wire cable 81 may be incorporated in the magnetic heads 21, 96 shown in FIGS. 3 and 20.

Figure 67:
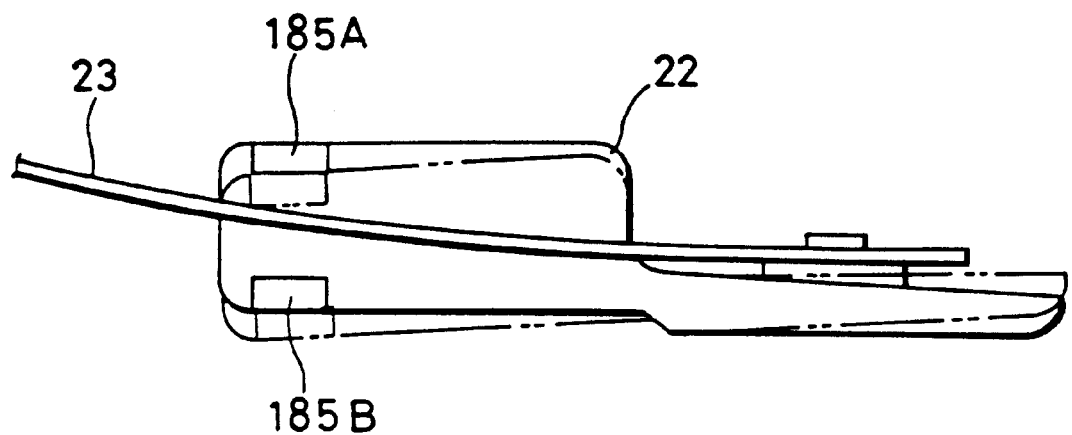
FIG. 67 is a side elevational view of a head body according to another embodiment of the present invention.
Figure 68:
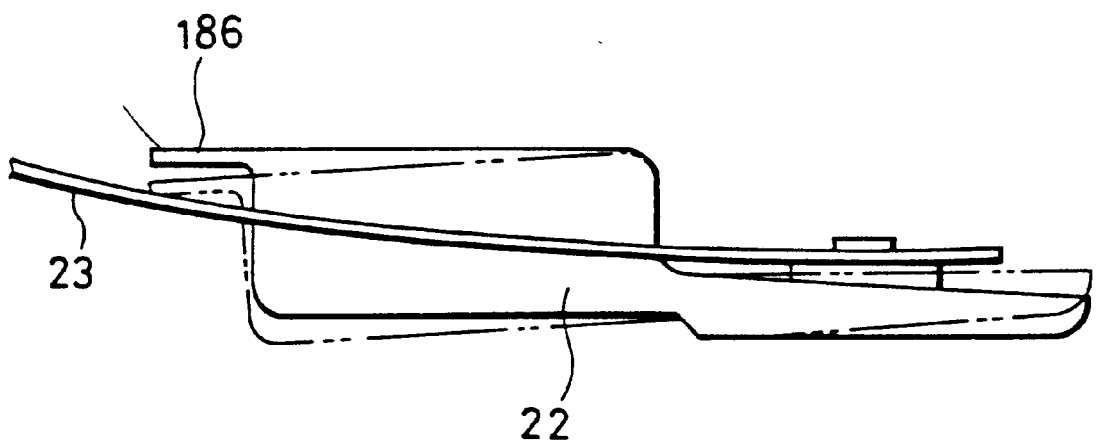
FIG. 68 is a side elevational view of a head body according to still another embodiment of the present invention.

FIGS. 67 and 68 show head bodies with other vibroisolating mechanisms according to other embodiments of the present invention.

In FIG. 67, upper and lower wing-like stoppers 185A, 185B project laterally from each of opposite sides of a mount 31 on which a magnetic head element is supported, the upper and lower wing-like stoppers 185A, 185B being positioned in sandwiching relationship to springy arms 55A, 55B of a second spring system 55. When not in use, the upper stoppers 185A engage the springy arms 55A, 55B to prevent a head body 22 from being lowered.

In FIG. 68, a stopper 186 is integrally formed with a rear end of a mount 31 on which a magnetic head element is supported. When not in use, the stopper 186 engages an inclined portion 54 of a leaf spring 23 to prevent a head body 22 from being lowered. The head body 22 is thus prevented from wobbling when it is spaced from the magnetooptical disk 1.

When the magnetic head is in use with the head body 22 in sliding contact with the magnetooptical disk 1, the head body 22 is pressed against the disk surface under a predetermined load by the leaf spring 23. At the time an excessive shock is applied to the magnetic head, the leaf spring 23 temporarily vibrates and may possibly be deformed. As a result, the spacing between the magnetooptical disk 1 and the magnetic head element 27 may be increased to the extent that the magnetic field generated by the magnetic head and acting on the magnetooptical disk 1 is lower than a desired value of $8 \times 10^3$ A/m, failing to record desired data on the magnetooptical disk 1.

Figure 69:
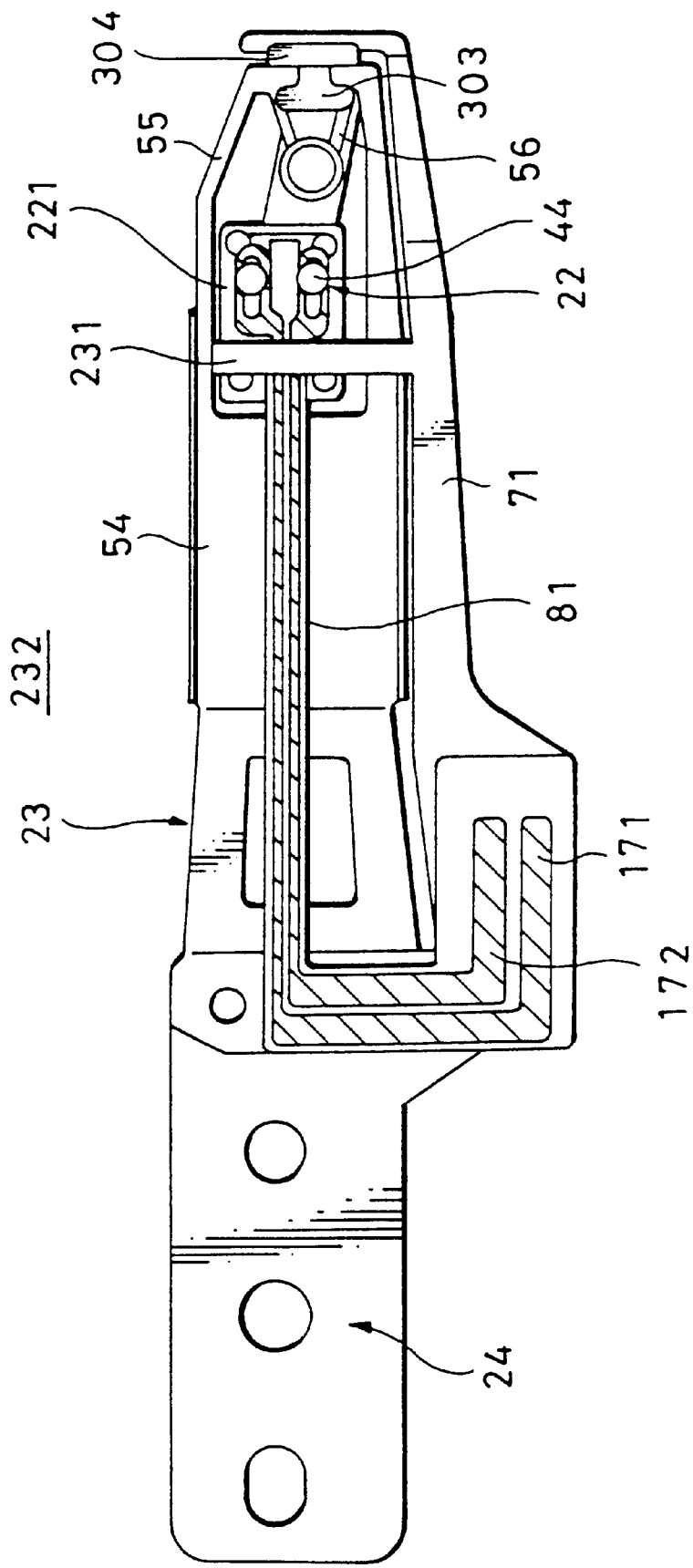
FIG. 69 is a plan view of a sliding-type magnetic head according to a further embodiment of the present invention.
Figure 70:
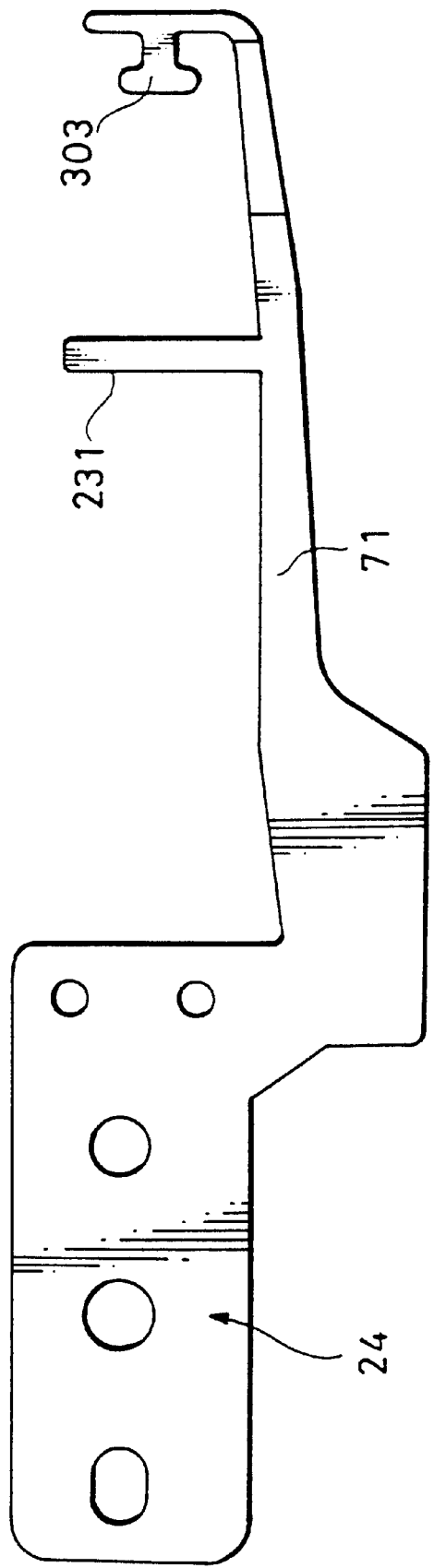
FIG. 70 is a plan view of a support member of the magnetic head shown in FIG. 69.
Figure 71:
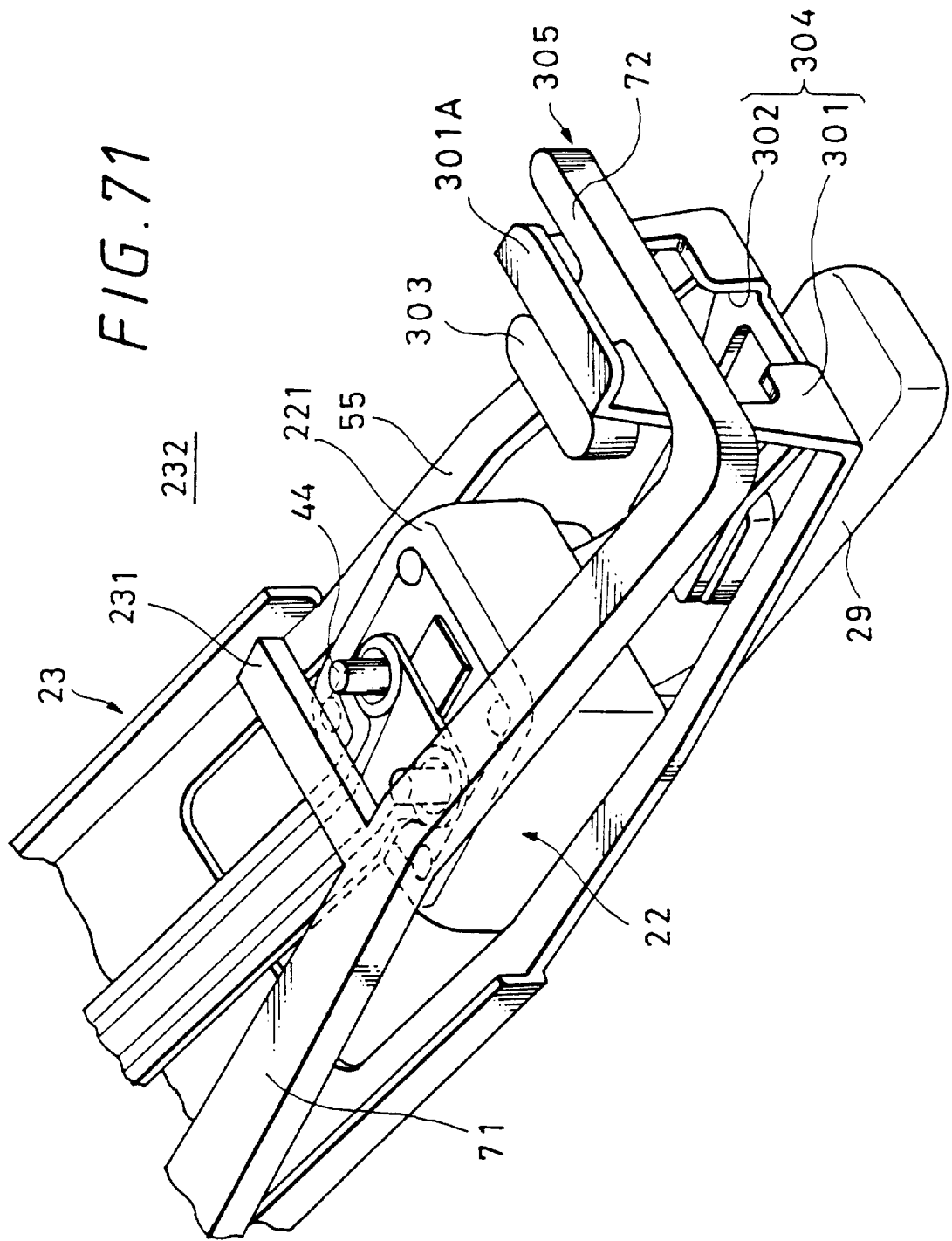
FIG. 71 is a fragmentary perspective view of the magnetic head shown in FIG. 69.

FIGS. 69 through 71 show a magnetic head 232 according to a further embodiment of the present invention, which magnetic head is designed to alleviate the above shortcoming. Specifically, the magnetic head 232 has a vibroisolating mechanism for preventing a head body 22 from vibrating even when the magnetic head suffers excessive vibrations or shocks while it is held in sliding contact with the disk surface.

As shown in FIG. 69, the magnetic head 232 comprises a head body 22 having a sliding sole 29 for sliding contact with a magnetooptical disk, a leaf spring 23 supporting the head body 22, a support member 24 to which one end of the leaf spring 23 is fixed, and a flexible wire cable 81.

As with the embodiment shown in FIG. 36, a T-shaped member 303 is joined to an inner surface of a stop 72 on the distal end of an arm 71 extending from the support member 24. The T-shaped member 303 is inserted in a crisscross hole 302 (see FIG. 71) defined in a locking hook 304 of the leaf spring 23, thus locking the arm 71 on the leaf spring 23.

As with the embodiment shown in FIG. 65, a Cu shield or a shield ring 221 is disposed around the mount of the head body 22 in which the magnetic head element is inserted.

The arm 71 extending from the support member 24 has an integral extension 231 in an intermediate position thereof which serves as a stopper in confronting relationship to the head body 22. The extension 231 faces an upper surface of the head body 22 near the magnetic head element, i.e., a surface remote from the sliding surface of the sliding sole 29, in a position out of alignment with the soldered joint between a flexible wire cable 81 and terminals 44. When being subjected to vibrations or shocks, the extension 231 is brought into abutment against the upper surface of the head body 22.

When the magnetic head 232 undergoes excessive vibrations or shocks while it is in use with the head body 22 in contact with a magnetooptical disk 1, the upper surface of the head body 22 engages the extension (stopper) 231 extending from the arm 71, preventing the head body 22 from moving or jumping further upwardly to avoid its vibrations. Accordingly, the leaf spring 23 is not deformed, and the spacing between the magnetooptical disk 1 and the magnetic head element 27 is not increased, so that the magnetic head 232 does not suffer a recording failure.

More specifically, when the magnetic head 232 is subjected to shocks in a direction normal to the disk surface while the magnetic head 232 is in use, the head body 22 is not displaced away from the magnetooptical disk 1 until the shocks reach a value which is determined by:

the load of the leaf spring 23/the mass of the head body 22.

Even if the magnetic head 232 is constructed to withstand a force of 10 G [gravitational force], when it undergoes undue shocks in excess of 10 G, the head body 22 vibrates vertically and is turned about the proximal end of a third spring system 56, tending to deform the leaf spring 23, particularly the third spring system 56 thereof. In this embodiment, however, the extension 231 is effective in withstanding external shocks in excess of 10 G, for example, and preventing the third spring system 56 from being deformed.

The extension 231 of the arm 71 malt be incorporated in the magnetic heads 21, 96 shown in FIGS. 3 and 20.

Figure 72:
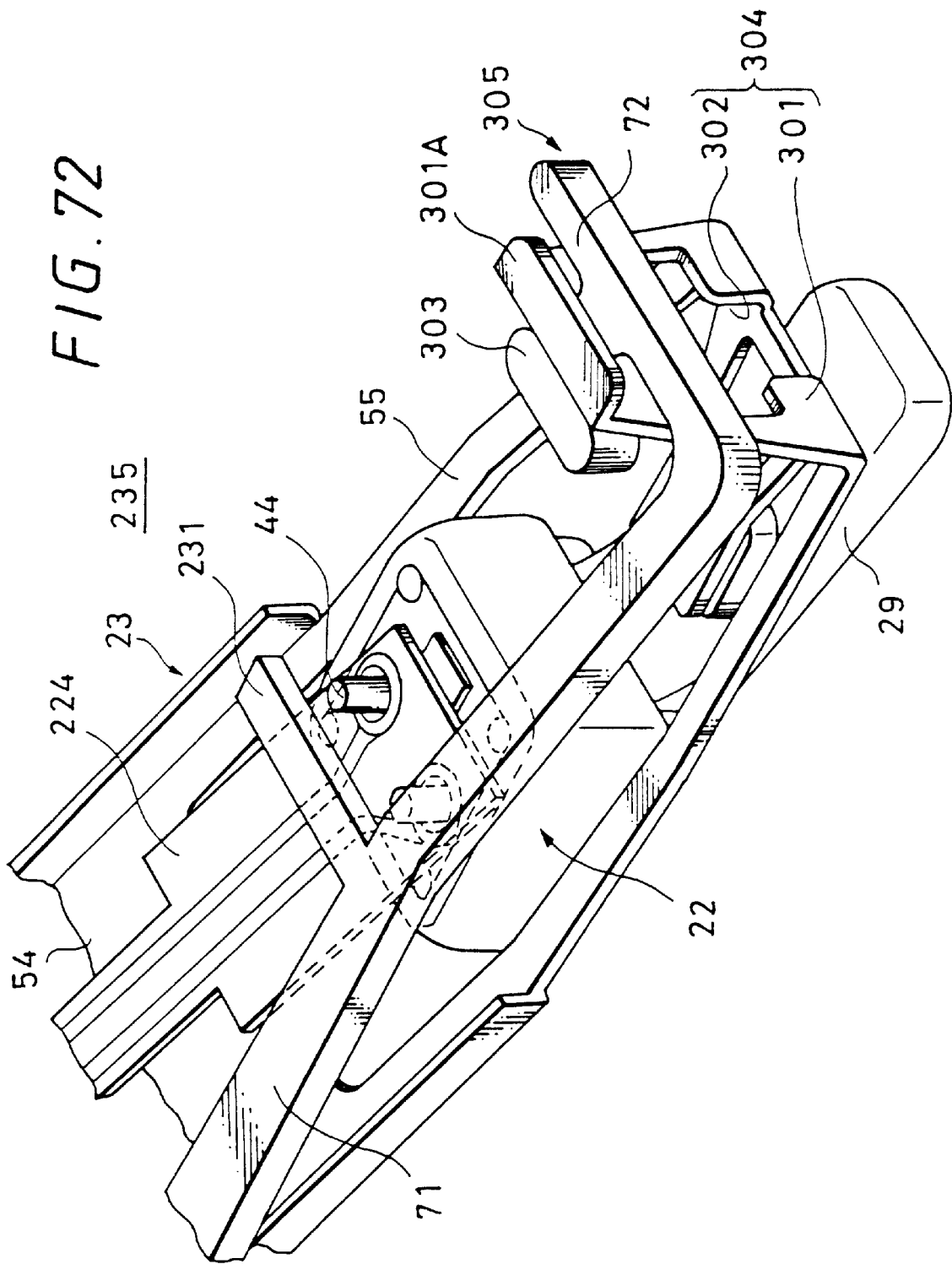
FIG. 72 is a fragmentary perspective view of a sliding-type magnetic head according to a still further embodiment of the present invention.

A sliding-type magnetic head 235 according to a still further embodiment of the present invention, which is shown in FIG. 72, has an extension or stopper 231 integral with an arm 71 extending from a support member 24, and another extension or stopper 224 integral with a flexible wire cable 81. When external vibrations or shocks are applied to the magnetic head 235 that is in use or not in use, its head body 22 is prevented from vibrating by the extensions 231, 224.

In FIG. 72, the flexible wire cable 81 with the extension 224 may be replaced with the flexible wire cable 81 with the extension 173 shown in FIGS. 60 and 64.

The flexible wire cable 81 which is connected to terminal pins 44 of the head body 22 is positioned and fixed by the support member 24 preferably by way of adhesive bonding, not using a jig.

Various embodiments with respect to positioning and fixing of the flexible wire cable 81 will be described below with reference to FIGS. 73 through 84.

Figure 73:
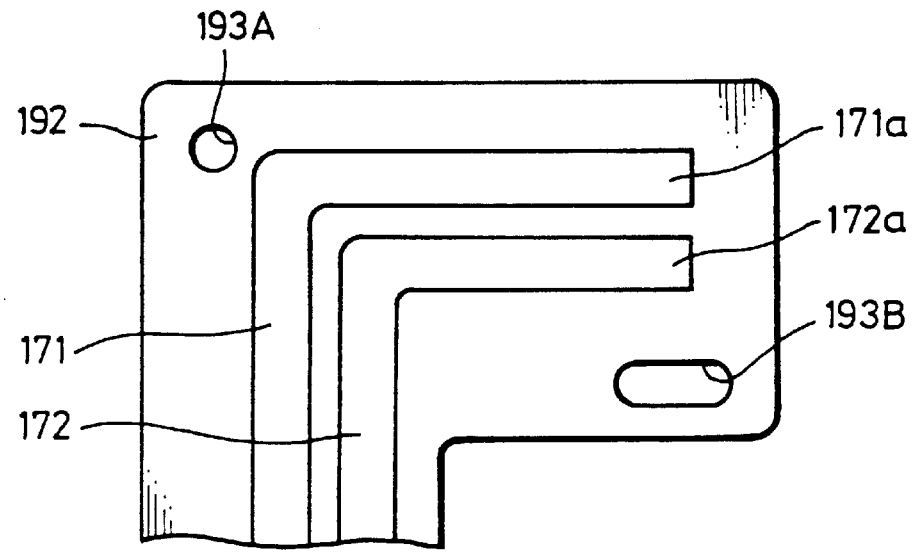
FIG. 73 is a plan view of a connector of a flexible wire cable.
Figure 74:
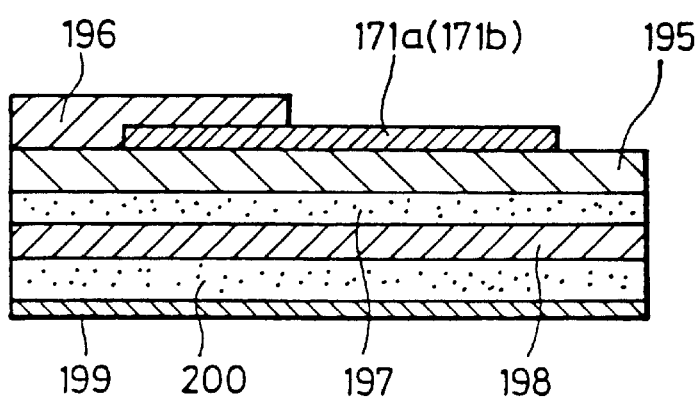
FIG. 74 is a cross-sectional view of the connector shown in FIG. 73.
Figure 75:
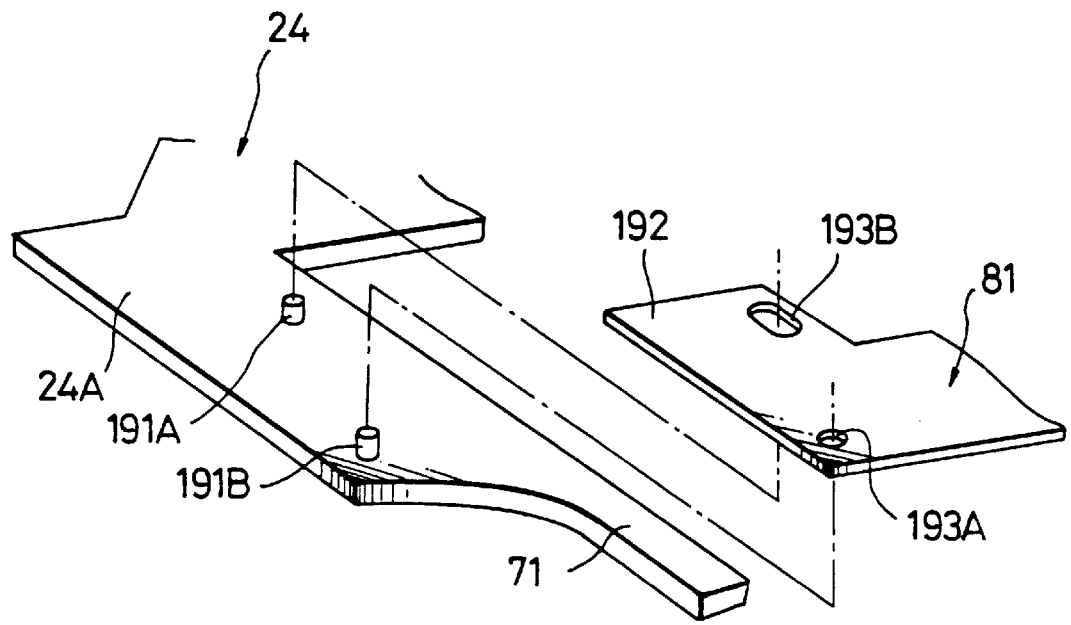
FIG. 75 is an exploded fragmentary perspective view of the connector shown in FIG. 73 and a support member to which the connector is fixed.

In an embodiment shown in FIGS. 73 through 75, a pair of spaced positioning pins 191A, 191B of circular cross section is mounted on a cable fixing region 24A integral with the proximal end of an arm 71 of a support member 24, and a pair of holes 193A, 193B is defined in a connector 192 of a flexible wire cable 81 which supports wire terminals 171a, 172a thereon, for receiving the respective positioning pins 191A, 191B. The hole 193A is of a circular shape for fitting over the positioning pin 191A, whereas the hole 193B is of an oblong shape for absorbing an assembling error and a part tolerance. The with of the oblong hole 193B is the same as the diameter of the circular hole 193A.

If the support member 24 is made of metal, the positioning pins 191A, 191B may be punched out so that they project from the surface of the support member 24 when it is pressed to shape. If the support member 24 is molded of synthetic resin, the positioning pins 191A, 191B may be formed simultaneously with the molding of the support member 24. The positioning pins 191A, 191B may be formed by any of various other methods.

As shown in FIG. 74, the wire terminals 171a, 172a, which are part of wires 171, 172 in the form of electrically conductive layers such as copper foil, for example, are disposed on an insulation base film 195, and a cover film 196 is also disposed thereon except for the wire terminals 171a, 172a. On the connector 192, a stiffener 198 which is lined with a peel-off paper 199 by a pressure-sensitive adhesive 200 is attached to the reverse side of the base film 195 by an adhesive 197.

To fix the flexible wire cable 81 to the cable fixing region 24A, the peel-off paper 199 is peeled off the connector 192, and the holes 193A, 193B are fitted over the respective positioning pins 191A, 191B. At this time, any assembling error and part tolerance are absorbed by the oblong hole 193B. At the same time, the flexible wire cable 81 is pressed against the cable fixing region 24A, bonding the connector 192 to the cable fixing region 24A through the pressure-sensitive adhesive 200 under pressure.

After the connector 192 is thus bonded, the terminals 171a, 172a are connected and soldered to other terminals with pressure and heat. If the connector 192 were positioned only by the adhesive, then it would possibly be displaced in position. Since the connector 192 is fixedly positioned on the cable fixing region 24A by the positioning pins 191A, 191B, the connector 192 is held in position against displacement.

With this arrangement, the connector 192 is positioned with respect to the cable fixing region 24A by engagement of the positioning pins 191A, 191B in the holes 193A, 193B, and fixed thereto by the pressure-sensitive adhesive 200. Consequently, no jig for positioning the connector 192 is required, and the number of steps for fixing the connector 192 is reduced. As the connector 192 is fixed in position by the adhesive, the flexible wire cable 81 is prevented from being positionally displaced over a long period of time even when subjected to external force and heat.

There are as many holes 193A, 193B as the number of positioning pins 191A, 191B in the illustrated embodiment. However, the number of the holes 193A, 193B may be greater than the number of positioning pins 191A, 191B for a selection of various positions in which to locate the flexible wire cable 81.

Figure 76:
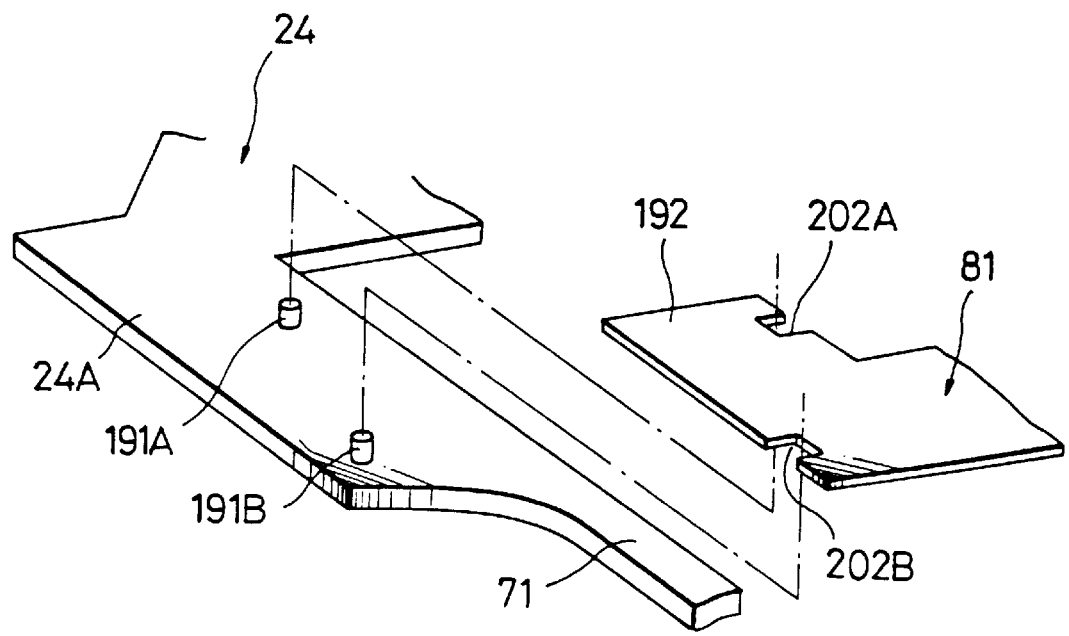
FIG. 76 is an exploded fragmentary perspective view of a connector of a flexible wire cable and a support member to which the connector is fixed, according to another embodiment of the present invention.

In another embodiment shown in FIG. 76, a connector 192 of a flexible wire cable 81 has recesses 202A, 202B defined therein for receiving respective positioning pins 191A, 191B on a cable fixing region 24A of a support member 24. The recesses 202A, 202B are defined in opposite edges such that they are open away from each other. The number of recesses 202A, 202B may be the same as or greater than the number of positioning pins 191A, 191B. To fix the connector 192 to the cable fixing region 24A, the positioning pins 191A, 191B are positioned in the respective recesses 202A, 202B, and the connector 192 is bonded to the cable fixing region 24A.

Figure 77:
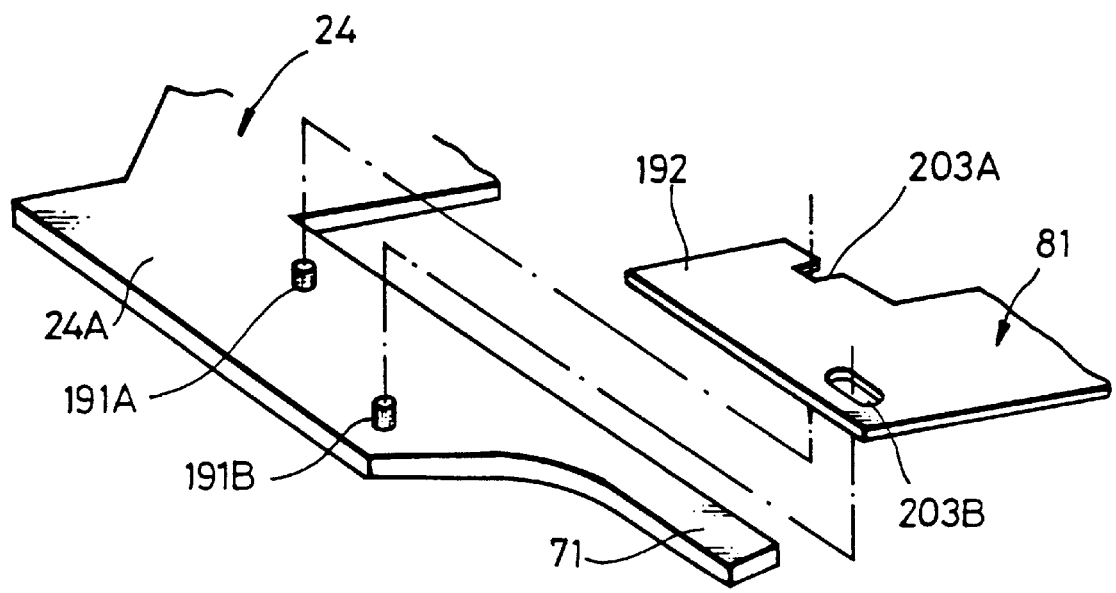
FIG. 77 is an exploded fragmentary perspective view of a connector of a flexible wire cable and a support member to which the connector is fixed, according to still another embodiment of the present invention.

FIG. 77 shows still another embodiment in which a connector 192 of a flexible wire cable 81 has a recess 203A and an oblong hole 203B defined therein for receiving respective positioning pins 191A, 191B on a cable fixing region 24A of a support member 24. The number of a recess 203A and a hole 203B may be the same as or greater than the number of positioning pins 191A, 191B. To fix the connector 192 to the cable fixing region 24A, the positioning pins 191A, 191B are positioned in the recess 203A and the hole 203B, respectively, and the connector 192 is bonded to the cable fixing region 24A.

Figure 78:
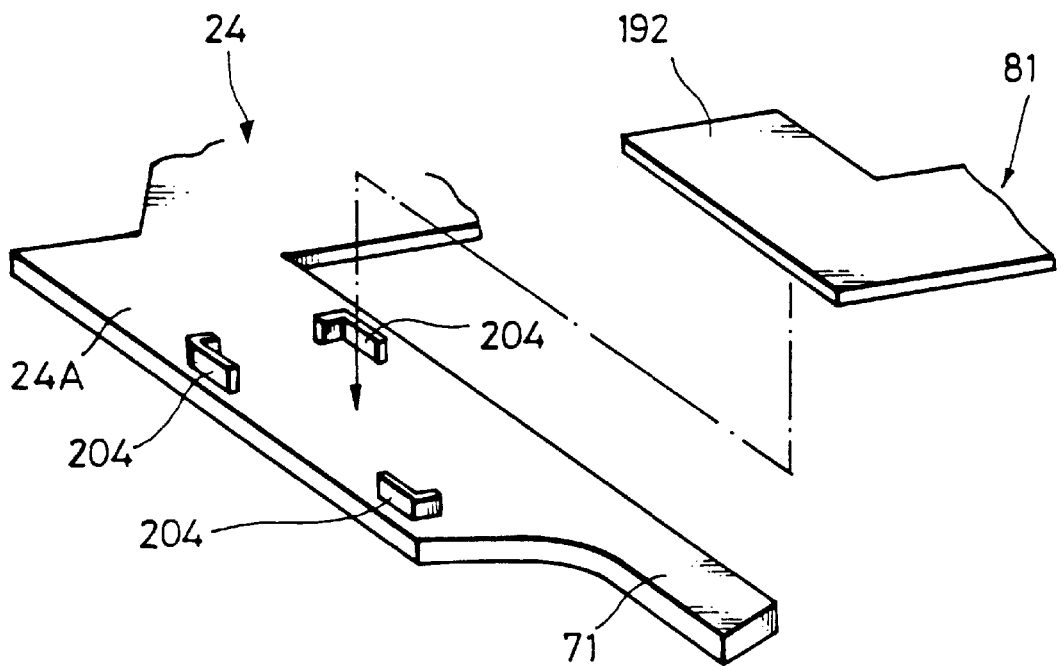
FIG. 78 is an exploded fragmentary perspective view of a connector of a flexible wire cable and a support member to which the connector is fixed, according to yet another embodiment of the present invention.

According to yet another embodiment shown in FIG. 78, engaging walls 204 project upwardly from a cable fixing region 24A of a support member 24 for engaging and surrounding respective three corners of a connector 192 of a flexible wire cable 81. To fix the connector 192 to the cable fixing region 24A, the corners of the connector 192 are engaged by the respective engaging walls 204, and the connector 192 is bonded to the cable fixing region 24A.

Figure 79:
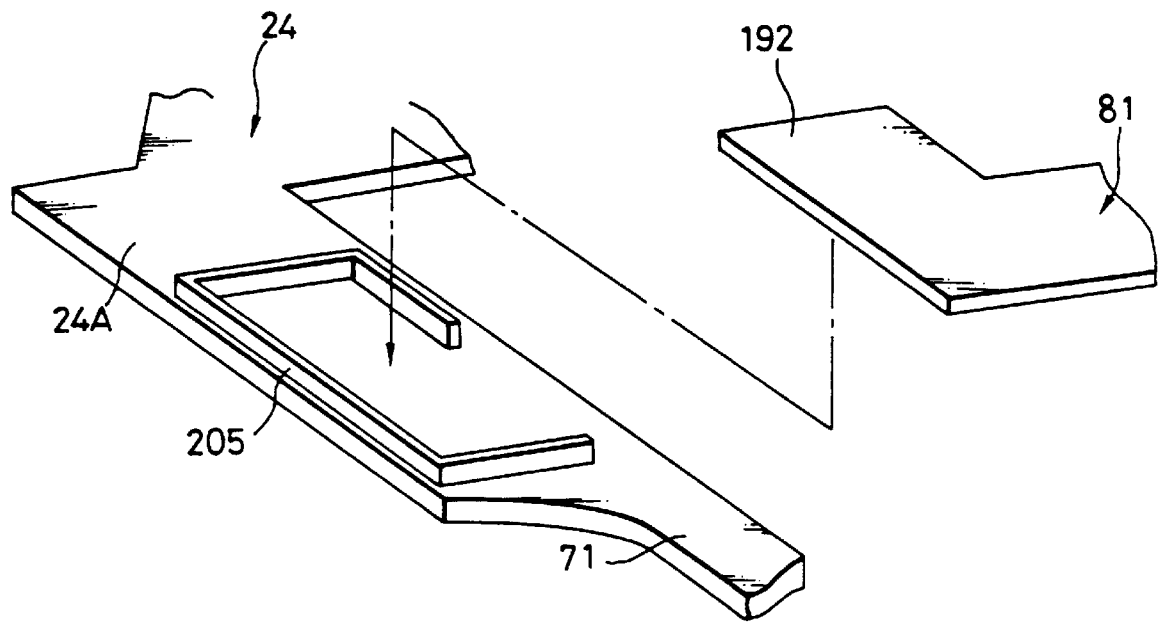
FIG. 79 is an exploded fragmentary perspective view of a connector of a flexible wire cable and a support member to which the connector is fixed, according to yet still another embodiment of the present invention.

FIG. 79 shows yet still another embodiment of the present invention. In FIG. 79, an engaging wall 205 projects upwardly from a cable fixing region 24A of a support member 24 for engaging and surrounding peripheral edges of a connector 192 of a flexible wire cable 81. To fix the connector 192 to the cable fixing region 24A, the peripheral edges of the connector 192 are engaged by the engaging wall 205, and the connector 192 is bonded to the cable fixing region 24A.

The embodiments shown in FIGS. 78 and 79 are effective in the case where neither holes nor recesses are defined in the connector 192.

Figure 80:
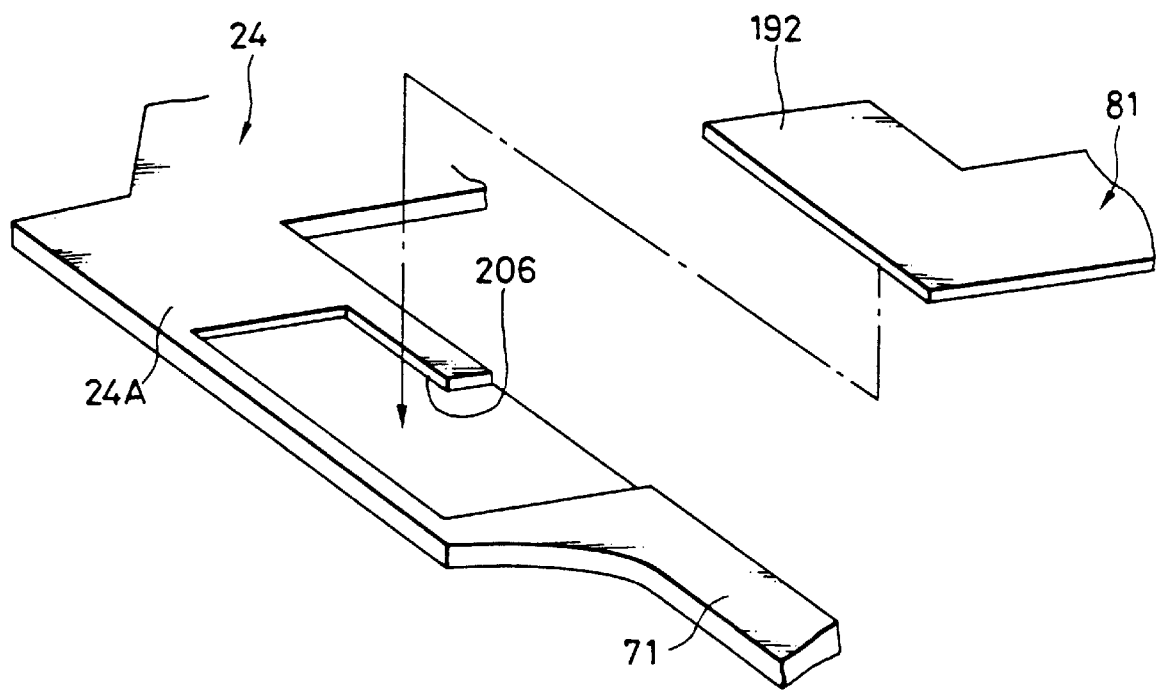
FIG. 80 is an exploded fragmentary perspective view of a connector of a flexible wire cable and a support member to which the connector is fixed, according to a further embodiment of the present invention.

In a further embodiment illustrated in FIG. 80, a cavity 206 which is complementary in shape to a connector 192 of a flexible wire cable 81 is defined in a cable fixing region 24A of a support member 24 for receiving the connector 192. To fix the connector 192 to the cable fixing region 24A, the connector 192 is fitted in the cavity 206, and the connector 192 is bonded to the cable fixing region 24A.

In the embodiments shown in FIGS. 76 through 80, no positioning jig is necessary to position the connector 192 with respect to the cable fixing region 24A, and the number of steps of fixing the connector 192 to the cable fixing region 24A is reduced as the connector 192 is bonded to the cable fixing region 24A at the same time it is positioned. The connector 192 is prevented from being positionally displaced with pressure and heat over a long period of time.

Although not shown, the cable fixing region 24A and the connector 192 may have projections and recesses, be positioned relatively to each other by interfitting engagement thereof, and fixed to each other.

While the two positioning pins 191A, 191B and a plurality of holes, recesses, or their combination are illustrated in the embodiments shown in FIGS. 75, 76, and 77, the connector 192 may be positioned with respect to the cable fixing region 24A by a single positioning pin or projection of noncircular cross section.

Figure 81:
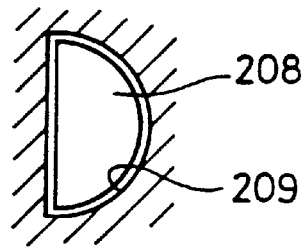
FIG. 81 is a cross-sectional view of a projection and a hole used to position a connector of a flexible wire cable with respect to a support member, according to an embodiment of the present invention.

FIG. 81 shows an embodiment in which a projection 208 of semicircular cross section is disposed on a cable fixing region 24A, and a semicircular hole 209 is defined in a connector 192 of a flexible wire cable 81. The semicircular projection 208 is fitted in the semicircular hole 209 when the connector 192 is positioned relatively to the cable fixing region 24A.

Figure 82:
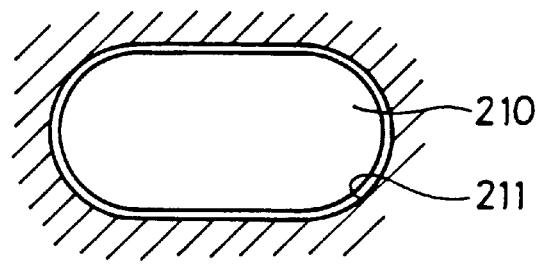
FIG. 82 is a cross-sectional view of a projection and a hole used to position a connector of a flexible wire cable with respect to a support member, according to another embodiment of the present invention.

FIG. 82 shows another embodiment in which a projection 210 of oblong cross section is disposed on a cable fixing region 24A, and an oblong hole 211 is defined in a connector 192 of a flexible wire cable 81. The oblong projection 210 is fitted in the oblong hole 211 when the connector 192 is positioned relatively to the cable fixing region 24A.

Figure 83:
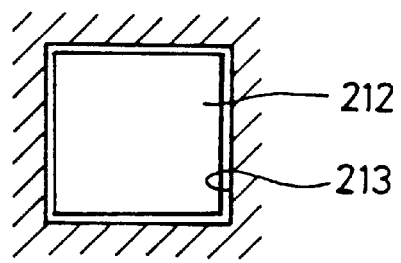
FIG. 83 is a cross-sectional view of a projection and a hole used to position a connector of a flexible wire cable with respect to a support member, according to still another embodiment of the present invention.

According to still another embodiment shown in FIG. 83, a projection 212 of square cross section is disposed on a cable fixing region 24A, and a square hole 211 is defined in a connector 192 of a flexible wire cable 81. The square projection 212 is fitted in the square hole 213 when the connector 192 is positioned relatively to the cable fixing region 24A.

Figure 84:
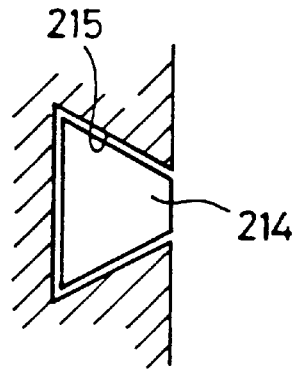
FIG. 84 is a cross-sectional view of a projection and a hole used to position a connector of a flexible wire cable with respect to a support member, according to yet still another embodiment of the present invention.

In yet still another embodiment shown in FIG. 84, a projection 214 of trapezoidal cross section is disposed on a cable fixing region 24A, and a trapezoidal hole 215 is defined in a connector 192 of a flexible wire cable 81. The trapezoidal projection 214 is fitted in the trapezoidal hole 215 when the connector 192 is positioned relatively to the cable fixing region 24A.

Also in the embodiments shown in FIGS. 81 through 84, no positioning jig is necessary to position the connector 192 with respect to the cable fixing region 24A, and the connector 192 is bonded to the cable fixing region 24A at the same time it is positioned. The connector 192 is prevented from being positionally displaced over a long period of time.

The present invention has been described as being embodied in a magnetic head for use with an ultrasmall magnetooptical disk. However, the principles of the present invention are also applicable to a sliding-type magnetic head for recording information on and reproducing information from an ordinary magnetooptical disk.

The magnetic head according to the present invention may be used to record information on magnetooptical disks according to the field- or beam-modulating recording process.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A magnetic head for magneto-optically recording information on a magneto-optical recording medium in sliding contact therewith comprising:

a head body having a magnetic head element with a sliding sole for sliding contact with a magneto-optical recording medium, said magnetic head element including a coil having terminals;

a leaf spring, said head body being supported by said leaf spring;

a support member, said leaf spring having an end fixed to said support member; and a flexible wire cable having one end connected to said terminals of the coil and an opposite end fixed to said support member;

wherein, said leaf spring having a first spring system joined to said support member, an incline portion extending in a direction from said first spring system to said magneto-optical recording medium, a second spring system extending from said incline portion said second spring system having two spring means, and a third spring system extending from a distal end of said second spring system back toward said support member and arranged between said two springs, said head body being supported by said third spring system;

said support member having a stopper which holds the distal end of said second spring system in a position to store a predetermined amount of recovery energy in said leaf spring, and said stopper including a stopper arm with a protrusion which extends from said head body and said stopper arm running along side said head body and said leaf spring and a substantially perpendicular angle between said stopper arm and a stop which engages a locking hook;

said support member has positioning means with a first configuration and said opposite end of said flexible wire cable has a second mating configuration which mates with said first configuration for positioning said opposite end in registry with said support member;

said opposite end of said flexible wire cable has a self-adhesive portion for bonding said opposite end of said flexible cable to said support member.

2. The magnetic head according to claim 1, wherein said first configuration comprises a recess for receiving said second mating configuration of the flexible wire cable, and said second mating configuration has a planar portion which is complimentary to a periphery of said first configuration.

3. A magnetic head according to claim 1, wherein said first configuration comprises a plurality of cylindrical pins displaced in a predetermined pattern and said second mating configuration comprises a plurality of openings for receiving said cylindrical pins therein.

4. A magnetic head according to claim 1, wherein said first configuration comprises a pair of cylindrical pins, said second mating configuration having a circular hole for receiving one of said cylindrical pins and an oblong hole for receiving the other of said cylindrical pins, said oblong hole having a width equal to the diameter of said circular hole.

5. A magnetic head according to claim 1, wherein said first configuration has a first post and a second post, said first and second posts being displaced in two directions relative to each other on a plane of said support member, and said second mating configuration includes a first notch on a first edge of said flexible wire cable and a second notch on a second edge of said flexible wire cable in registry with said first and second posts, respectively.

6. A magnetic head according to claim 5, wherein each of said first and second posts have a circular planar portion.

7. A magnetic head according to claim 5, wherein each of said first and second notches have a rectangular planar portion and adapted to receive said first and second posts.

8. A magnetic head for magneto-optically recording information on a magneto-optical recording medium and sliding contact therewith comprising:

a head body having a magnetic head element with a sliding sole for sliding contact with a magneto-optical recording medium, said magnetic head element including a coil having terminals;

a leaf spring, said head body being supported by said leaf spring;

a support member, said leaf spring having an end fixed to said support member and extending in the same direction as said support member;

a stopper mounted on said support member and holding said leaf spring in a position to store a predetermined amount of recovery energy in said leaf spring;

said leaf spring having a locking member, wherein said stopper is inserted in and engaged by said locking member; and a flexible wire cable having one end connected to said terminals of the coil and an opposite end fixed to said support member;

wherein,
said stopper has a T-shaped member, and said hole is criss-cross shape and further wherein for inserting said T-shaped member extends through said hole;
said support member has positioning means with a first configuration and said opposite end of said flexible wire cable has a second meeting configuration which mates with said first configuration for positioning said opposite end in registry with said support member;
said opposite end of said flexible wire cable has a self-adhesive portion for bonding said opposite end of said flexible cable to said support member.

9. A magnetic head for magnetooptically recording information on a magnetooptical recording medium in sliding contact therewith comprising:
a head body having a magnetic head element for sliding contact with a magnetooptical recording medium, said magnetic head element including a coil having terminals;
a leaf spring, said head body being supported by said leaf spring;
a support member, said leaf spring having an end fixed to said support member and extending in the same direction as said support member;
a flexible wire cable having one end connected to said terminals of the coil and an opposite end fixed to said support member; and
a stopper mounted on said support member and holding said leaf spring in a position to store a predetermined amount of recovery energy in said leaf spring;
wherein,
said leaf spring having a locking member wherein said stopper is inserted in an engaged by said locking member wherein said locking member has a hole defined therein and further wherein said stopper extends through said hole with fingers projecting into said hole wherein said fingers are resiliently bendable such that said stopper forces any fingers to bend upon insertion into said hole and after full insertion of said stopper in said hole;
said support member has positioning means with a first configuration and said opposite end of said flexible wire cable has a second mating configuration which mates with said first configuration for positioning said opposite end in registry with said support member;
said opposite end of said flexible wire cable has a self-adhesive portion for bonding said opposite end of said flexible cable to said support member.

10. A magnetic head for magnetooptically recording information on a magnetooptical recording medium in sliding contact therewith, comprising:
a head body having a magnetic head element with a sliding sole for sliding contact with a magnetooptical recording medium, said magnetic head element including a coil having terminals;
a leaf spring, said head body being supported by said leaf spring;
a support member, said leaf spring having an end fixed to said support member; and
a flexible wire cable having one end connected to said terminals of the coil and an opposite end fixed to said support member;
said leaf spring comprising a first spring system joined to said support member, an inclined portion extending in the direction from said first spring system to said magnetooptical recording medium, a second spring system extending from said inclined portion, said second spring system having two spring means, and a third spring system extending from a distal end of said second spring system back toward said support member and arranged between said two spring means, said head body being supported by said third spring system;
said support member having a stopper which holds said third spring system in a position to store a predetermined amount of recovery energy in said leaf spring, and said stopper including a stopper arm with a protrusion which extends from said head body and said stopper arm running alongside said head body and said leaf spring and a substantially perpendicular angle between said stopper arm and a stop which engages a locking hook;
said support member has positioning means with a first configuration and said opposite end of said flexible wire cable has a second mating configuration which mates with said first configuration for positioning said opposite end in registry with said support member;
said opposite end of said flexible wire cable has a self-adhesive portion for bonding said opposite end of said flexible cable to said support member.

11. A magnetic head for magnetooptically recording information on a magnetooptical recording medium in sliding contact therewith, comprising:
a head body having a magnetic head element with a sliding sole for sliding contact with a magnetooptical recording medium, said magnetic head element including a coil having terminals;
a leaf spring, said head body being supported by said leaf spring;
a support member, said leaf spring having an end fixed to said support member;
a flexible wire cable having one end connected to said terminals of the coil and an opposite end fixed to said support member; and
a stopper mounted on said support member and holding said leaf spring in a position to store a predetermined amount of recovery energy in said leaf spring;
wherein,
said leaf spring comprising a first spring system joined to said support member, an inclined portion extending in the direction from said first spring system to said magnetooptical recording medium, a second spring system extending from said inclined portion, said second spring system having two spring means, a third spring system extending from a distal end of said second spring system back toward said support member and arranged between said two spring means, and a locking member, said stopper being inserted in and engaged by said locking member, and said stopper including a stopper arm with a protrusion which extends from said head body and said stopper arm running alongside said head body and said leaf spring and a substantially perpendicular angle between said stopper arm and a stop which engages a locking hook;
said support member has positioning means with a first configuration and said opposite end of said flexible wire cable has a second mating configuration which mates with said first configuration for positioning said opposite end in registry with said support member;

said opposite end of said flexible wire cable has a self-adhesive portion for bonding said opposite end of said flexible cable to said support member.

12. A magnetic head for magnetooptically recording information on a magnetooptical recording medium in sliding contact therewith, comprising:
- a head body having a magnetic head element with a coil with two terminals and a sliding sole for sliding contact with a magnetooptical recording medium;
- a leaf spring, said head body arm portion being supported by said leaf spring;
- a support member, said leaf spring having an end fixed to said support member; and
- a flexible wire cable having one end connected to said terminals of the coil and an opposite end fixed to said support member;
- said leaf spring comprising a first spring system joined to said support member, an inclined portion extending in the direction from said first spring system to said magnetooptical recording medium, a second spring system extending from said inclined portion, said second spring system having two spring means, a third spring system extending from a distal end of said second spring system back toward said support member and arranged between said two spring means, and a locking member, said support member having positioning means for positioning said opposite end of the flexible wire cable, and said stopper including a stopper arm with a protrusion which extends from said head body and said stopper arm running along side said head body and said leaf spring and a substantially perpendicular angle between said stopper arm and a stop which engages a locking hook;
- said support member has positioning means with a first configuration and said opposite end of said flexible wire cable has a second mating configuration which mates with said first configuration for positioning said opposite end in registry with said support member;
- said opposite end of said flexible wire cable has a self-adhesive portion for bonding said opposite end of said flexible cable to said support member.

* * * * *